(12) United States Patent
Suzuki et al.

(10) Patent No.: US 6,614,760 B1
(45) Date of Patent: Sep. 2, 2003

(54) ATM TRANSMISSION EQUIPMENT

(75) Inventors: Muneyuki Suzuki, Inagi (JP); Yutaka Seki, Hino (JP); Hidetaka Yoshikawa, Hino (JP); Kiyotaka Tsuji, Tokyo (JP); Atsushi Nakagawa, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/288,663

(22) Filed: Apr. 9, 1999

(30) Foreign Application Priority Data

| Apr. 10, 1998 | (JP) | 10-099366 |
| Apr. 21, 1998 | (JP) | 10-110778 |
| Apr. 24, 1998 | (JP) | 10-115804 |
| Jul. 2, 1998 | (JP) | 10-187699 |

(51) Int. Cl.[7] .......................... H04L 12/24; H04L 12/26
(52) U.S. Cl. .................. 370/244; 370/250; 370/395.1; 370/466
(58) Field of Search .................. 370/244, 352–356, 370/358, 359, 360, 395.1–395.6, 395.12, 397, 395.31, 419

(56) References Cited

U.S. PATENT DOCUMENTS

| 4,841,550 A | * | 6/1989 | George et al. ............. 370/505 |
| 5,343,462 A | * | 8/1994 | Sekihata et al. ............ 370/244 |
| 5,541,926 A | * | 7/1996 | Saito et al. ................ 370/474 |
| 5,581,577 A | * | 12/1996 | Abe ........................... 375/225 |
| 5,675,574 A | * | 10/1997 | Norizuki et al. ........... 370/230 |
| 5,737,338 A | * | 4/1998 | Eguchi et al. ............. 370/249 |
| 5,784,558 A | * | 7/1998 | Emerson et al. ........... 370/249 |
| 5,805,568 A | * | 9/1998 | Shinbashi .................. 370/223 |
| 5,917,824 A | * | 6/1999 | Brueckheimer et al. .... 370/397 |
| 5,953,344 A | * | 9/1999 | Dail et al. .................. 370/443 |
| 5,982,767 A | * | 11/1999 | McIntosh .................. 370/352 |
| 5,982,772 A | * | 11/1999 | Oskouy .................. 370/395.7 |
| 5,999,528 A | * | 12/1999 | Chow et al. ............... 370/365 |
| 6,081,525 A | * | 6/2000 | Christie et al. ............ 370/392 |
| 6,084,889 A | * | 7/2000 | Murakami ................. 370/474 |
| 6,141,326 A | * | 10/2000 | Minami .................... 370/229 |
| 6,188,693 B1 | * | 2/2001 | Murakami ............. 370/395.62 |

FOREIGN PATENT DOCUMENTS

| CA | 2124610 | 12/1995 |
| JP | 5-63761 | 12/1993 |

* cited by examiner

Primary Examiner—Hassan Kizou
Assistant Examiner—David Odland
(74) Attorney, Agent, or Firm—Finnegan, Henderson, Farabow, Garrett & Dunner, L.L.P.

(57) ABSTRACT

ATM transmission equipment provided between existing exchange or terminals of carrier equipment that, for example, can emulate existing transmission paths, and also implement T point interfaces for an in-home unit. The ATM transmission equipment detects communication anomalies or extracts maintenance/operation information from data strings on STM lines, such as high-speed digital lines or ISDN lines, and replaces only the necessary information resulting from those extractions or detections with alarm signals. The alarm signals are then transmitted together with information channels to the ATM network via a cell assembler/dissembler. The information channels and alarm information that arrive from the ATM network are rearranged into STM line data strings and output to LT units, DSUs, or terminals.

19 Claims, 54 Drawing Sheets

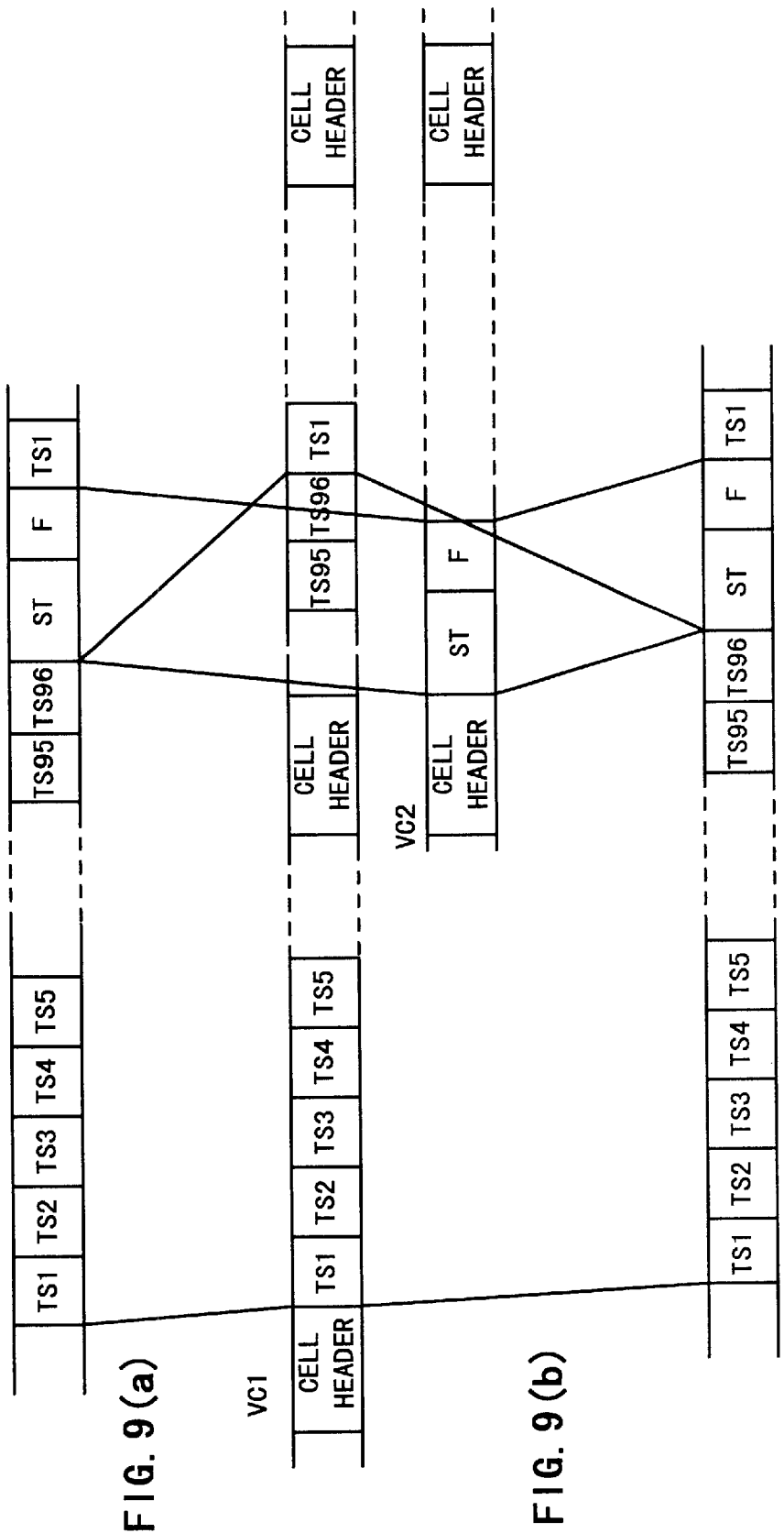

FIG. 15 ALARM TRANSFER II (BETWEEN 1.5M ISDN LINE INTERFACE UNI-LI)

FIG. 17 ALARM TRANSFER IV
(BETWEEN 6.3M/1.5M SD LINE INTERFACE UNI. L1-L1)

FIG. 18 ALARM TRANSFER V
(BETWEEN 6.3M/1.5M SD LINE INTERFACE UNI-LI)

FIG. 19 ALARM TRANSFER VI (BETWEEN 6.3M/1.5M SD LINE INTERFACE UNI. VIRTUAL L1-L1)

NORMAL STATUS

WHEN A TRANSMISSION PATH MALFUNCTION OCCURS

WHEN A NODE MALFUNCTION OCCURS

NODE-RELATED INFORMATION : NODE1-NODE2-NODE3-NODE4

| | CROSS-CONNECTION TYPE INFORMATION | SQUELCH INFORMATION | | | | WORK LINE INFORMATION | |
|---|---|---|---|---|---|---|---|
| | | ADD NODE(1) | ADD NODE(2) | DROP NODE(1) | DROP NODE(2) | WORK Line(1) | WORK Line(2) |
| WEST(WORK) −1 | — | — | — | — | — | — | — |
| −2 | — | — | — | — | — | — | — |
| −3 | — | — | — | — | — | — | — |
| WEST(STBY) −1 | — | — | — | — | — | — | — |
| −2 | — | — | — | — | — | — | — |
| −3 | — | — | — | — | — | — | — |
| WEST(STBY) −1 | 2WAY | NODE1 | — | NODE3 | NODE2 | — | — |
| −2 | 2WAY | NODE1 | — | NODE3 | NODE2 | — | — |
| −3 | 2WAY | WORK1 | — | NODE2 | — | — | — |
| WEST(STBY) −1 | — | — | — | — | — | — | — |
| −2 | — | — | — | — | — | — | — |
| −3 | — | — | — | — | — | — | — |

FIG. 50(a) NODE 1

NODE-RELATED INFORMATION : NODE2-NODE3-NODE4-NODE1

| | CROSS-CONNECTION TYPE INFORMATION | SQUELCH INFORMATION | | | | WORK LINE INFORMATION | |
|---|---|---|---|---|---|---|---|
| | | ADD NODE(1) | ADD NODE(2) | DROP NODE(1) | DROP NODE(2) | WORK Line(1) | WORK Line(2) |
| WEST(WORK) -1 | 2WAY | NODE3 | NODE3 | NODE3 | — | — | — |
| -2 | — | — | — | — | — | — | — |
| -3 | — | — | — | — | — | — | — |
| WEST(STBY) -1 | 2WAYBR | NODE3 | NODE2 | NODE1 | — | NODE1 | NODE3 |
| -2 | PS | — | — | — | — | — | — |
| -3 | — | — | — | — | — | — | — |
| EAST(WORK) -1 | — | — | — | — | — | — | — |
| -2 | — | — | — | — | — | — | — |
| -3 | — | — | — | — | — | — | — |
| EAST(STBY) -1 | — | — | — | — | — | — | — |
| -2 | — | — | — | — | — | — | — |
| -3 | — | — | — | — | — | — | — |

FIG. 50(b)   NODE 2

NODE-RELATED INFORMATION : NODE3-NODE4-NODE1-NODE2

| | CROSS-CONNECTION TYPE INFORMATION | SQUELCH INFORMATION | | | | WORK LINE INFORMATION | |
|---|---|---|---|---|---|---|---|
| | | ADD NODE(1) | ADD NODE(2) | DROP NODE(1) | DROP NODE(2) | WORK Line(1) | WORK Line(2) |
| WEST(WORK) −1 | 2WAYYBR | NODE3 | NODE2 | NODE1 | — | — | — |
| −2 | 2WAYYBRP | NODE3 | NODE2 | NODE1 | — | — | — |
| −3 | — | — | — | — | — | — | — |
| WEST(STBY) −1 | — | — | — | — | — | — | — |
| −2 | — | — | — | — | — | — | — |
| −3 | — | — | — | — | — | — | — |
| EAST(WORK) −1 | 2WAYYBR | NODE3 | — | NODE3 | NODE2 | — | — |
| −2 | — | — | — | — | — | — | — |
| −3 | 1WAY | NODE1 | — | NODE2 | — | — | — |
| EAST(STBY) −1 | — | — | — | — | — | — | — |
| −2 | 2WAYYBRPP | NODE1 | — | NODE3 | NODE2 | NODE1 | NODE3 |
| −3 | — | — | — | — | — | — | — |

FIG. 50(c)  NODE 3

NODE-RELATED INFRMATION:
NODE1-NODE2-NODE3-NODE4

| To ch | SQUELCH INFORMATION | |
|---|---|---|
| | ADD NODE | DROP NODE |
| WEST(WORK) −1 | — | — |
| −2 | — | — |
| −3 | — | — |
| EAST(STBY) −1 | NODE1 | NODE3 |
| −2 | — | — |
| −3 | — | — |

FIG. 51(a) NODE 1

NODE-RELATED INFORMATION:
NODE2-NODE3-NODE4-NODE1

| To ch | SQUELCH INFORMATION | |
|---|---|---|
| | ADD NODE | DROP NODE |
| WEST(WORK) −1 | NODE2 | NODE3 |
| −2 | — | — |
| −3 | — | — |
| EAST(STBY) −1 | — | — |
| −2 | — | — |
| −3 | — | — |

FIG. 51(b) NODE 2

NODE-RELATED INFORMATION:
NODE3-NODE4-NODE1-NODE2

| To ch | SQUELCH INFORMATION | |
|---|---|---|
| | ADD NODE | DROP NODE |
| WEST(WORK) −1 | NODE3 | NODE1 |
| −2 | — | — |
| −3 | — | — |
| EAST(STBY) −1 | NODE3 | NODE2 |
| −2 | — | — |
| −3 | — | — |

FIG. 51(c) NODE 3

NODE-RELATED INFORMATION:
NODE4-NODE1-NODE2-NODE3

| To ch | SQUELCH INFORMATION | |
|---|---|---|
| | ADD NODE | DROP NODE |
| WEST(WORK) −1 | NODE3 | NODE1 |
| −2 | — | — |
| −3 | — | — |
| EAST(STBY) −1 | NODE1 | NODE3 |
| −2 | — | — |
| −3 | — | — |

FIG. 51(d) NODE 4

ATM TRANSMISSION EQUIPMENT

BACKGROUND OF THE INVENTION

1. Field of the Invention

This invention relates to ATM (asynchronous transfer mode) transmission apparatus used in communication networks wherein digital service units (DSUs) and exchange (LT unit) having STM (synchronous transfer mode) line interfaces are connected by ATM, and more specifically to ATM transmission equipment wherewith the transmission path portion of the line interface is replaced with an ATM network, LT unit, DSU, and terminal, etc., can be accommodated, and a T-point interface is provided in the interest of reducing DSU installation costs, so that 1.5M dedicated line service, for example, can be efficiently accommodated in the ATM network.

2. Description of the Related Art

Private networks are recently being widely developed by communication businesses (carriers), and for in-house communication, utilizing the statistical multiplexing benefits and flexible network operability of ATM technology. During the transition period while this type of networking using ATM technology is proliferating, however, there are existing networks, such as communication networks using high-speed digital lines or ISDN lines. Hence a scheme is needed for handling the equipment of these existing networks.

When a carrier is to expand its network, for example, one approach is to set up an ATM network beforehand to provide lines for connecting between the carrier equipment and in-home unit such as terminals, in preparation for the transition to the future ATM network. In such cases, it is important that the ATM network be configured so that it can accommodate the preexisting station exchange (LT unit) and digital service units (DSUs) that make up the carrier equipment and the in-home unit.

In FIG. 43 is given a simplified block diagram of an ordinary conventional communication network configured with STM lines.

Specifically, in FIG. 43, in-home unit. (user terminals) 12-1 and 12-2 are connected respectively through digital service units (DSUs) 11-1 and 11-2 to the station exchange (LT unit) 10 having an:STM line interface. In this diagram, U points configure the.subscriber line interfaces (hereinafter called U point interfaces). These U-point interfaces comprise metallic wire or optical fiber and connect between the LT unit 10 and remotely located DSUs 11-1 and 11-2. T points configure so-called T point interfaces.

Now, when an ATM network is set up beforehand to provide lines for connecting carrier equipment with terminals and other in-home unit with a view to transition to the future ATM network, as described in the foregoing, one possible configuration involves installing the ATM network at the U points configuring the line interfaces in FIG. 43. In this configuration, in the first place, it must be possible to emulate the existing transmission paths, and, in the second place, it must be possible to provide T point interfaces for the in-home unit. In the prior art, however, no suitable transmission apparatus exists that satisfies these requirements.

Furthermore, in a network wherein an ATM network is provided for the line interfaces in an StM network, what is ordinarily done is to perform cell assembly and cell disassembly on all data strings (including frame F bits) on the STM lines and to transmit these into the ATM network. When this is done, however, network resources are wasted because the ATM network becomes occupied by bands having the speeds of the STM lines.

In communication systems designed so that conventional video, audio, and text data, etc., are assembled into cells or packets of fixed length and then transmitted from the transmitting equipment to the receiving equipment, when some kind of trouble develops on a line or communication path on the way from the transmitting side to the receiving side, resulting in a situation wherein the desired transmission quality can no longer be guaranteed, the measure of interrupting that line must be taken so that line or communication path is not used.

One conventional method of detecting faults in lines or communication paths, for example, is that disclosed in Japanese Patent Laid-open No. H5-63761/1993 (gazette), whereby, when transmission data are transmitted, information on the time until the next transmission data is added at the beginning thereof. If the time information can be normally verified at the receiving end, a normal reception confirmation signal is returned to the transmitting end. When the time information cannot be normally verified, a retransmit request is transmitted back to the transmitting end, or a line fault state ensues and that fact is output to the outside.

In an ATM network system, on the other hand, when a line break or synchronization fault is detected at the receiving terminal, and alarm information indicating line fault is transmitted back to the opposite end, i.e. to the transmitting equipment, an OAM cell (operation and maintenance cell) is inserted in the ATM cell flow. This alarm information is inserted into the OAM cell and transmitted to the opposite ATM exchange, whereupon, in that opposing ATM exchange, that OAM cell is-resolved, the alarm information extracted, and the resulting data are transmitted to the receiving terminal line end.

There are also, however, systems wherein nodes that configure an ATM network are linked in a ring shape, as diagrammed in FIG. 44. In the system diagrammed here, multiple nodes 261–264 are connected by an outside ring transmission path 265 and by an inside ring transmission path 266. To each node are connected terminals A and B, i.e. 267 and 268, such as cameras or personal computers for inputting and outputting image;data, text data, and audio and video data, etc., so that, for example, image data or text data, etc., can be transmitted on the ATM network from terminal A 267 to terminal B 268. Each of the nodes here, 261–264, comprises ATM exchange with an existing STM line interface that can handle 64 Kbps, 1.5 Mbps, or 2 Mbps, etc.

In an ATM network linked by ring-shaped transmission paths such as this, ordinarily, when transmitting data from terminal A 267 to terminal B 268, one of the ring transmission paths (the outside ring transmission path 264 in the example diagrammed in FIG. 46) is used, as indicated by the broken lines in the drawing. In the event that a fault occurs in a relay transmission path or at the node 264 which is a relay node in the transmission path from the terminal A 267 to the terminal B 268, indicated by the "X" in FIG. 45, a loop-back is effected at the relay node 264, as indicated by the broken line in this figure, activating the transmission path to the terminal B along the stand-by inner ring transmission path 266, whereupon data can be transmitted from the terminal A to the terminal B.

However, in the event that a fault occurs at the node 261 to which the terminal B is connected, as indicated by the "X" in FIG. 46, loop-backs are effected at node 264 and node 262, as indicated by the broken line in FIG. 46, so that the data output by the terminal A are returned to that terminal A. Thus the fault at the terminal B 268 cannot be detected, and no alarm information is output to the terminal A. This constitutes a problem.

To deal with this problem, there is a method, called BLSR (bidirectional line switched ring), which uses loop-back switches to recover from transmission path faults that occur in ring-shaped network systems. With BLSR, line switching is performed using a so-called squelch table. This squelch table comprises node chaining information that indicates how the nodes are connected in the ring system, and squelch information indicating to which nodes signals ADDed or DROPped in line units are assigned.

FIGS. 50(a)–50(c) diagram the configuration of such a squelch table. This squelch table comprises node chaining information, cross-connect type information, squelch information, and WORK line information.

The node chaining information indicates how the nodes are connected in the ring system. The cross-connect type information indicates the channel, i.e. the type of line, used thereby. Unidirectional lines are indicated by 1WAY, bidirectional lines by 2WAY, interconnection primary nodes by 2WAYBR, interconnection (ON PROT) line primary nodes by 2WAYBRPP, and interconnection (ON PROT) line secondary nodes by 2WAYBRPS.

The squelch information indicates, in line units, ADD NODE and DROP NODE for those lines, and can set two nodes for each. When a unidirectional line (1WAY) is set, in particular, the setting is made in cognizance of the directionality of the ADD/DROP NODE lines. The WORK line information indicates which WORK line between which nodes is used by the ADDed or DROPped signal, in channel units. A protection channel (STBY) is also added as a TO channel in the configuring elements.

In the example squelch table given in FIGS. 50(a)–50(c), settings are made for the interconnection line in FIG. 48(a) using the transmission path channel 1, the interconnection (ON PROT) line in FIG. 48(b) using channel 2, and the broadcast line:in FIG. 48(c) using channel 3. This squelch table can also be used to make,settings for ordinary lines as diagrammed in FIG. 47(a).

This squelch table is indicated node by node, but the setting states are described in terms of the squelch table for node 4 represented in FIG. 51(d). In the squelch information for the TO channels 1 and 2 on the WEST side in the interconnection (ON PROT) line (channel 2), node 3 (NODE 3), a primary NODE, is set in ADDNODE (1), node 2 (NODE 2), a secondary NODE, is set in ADD NODE (2), and node 1 (NODE 1), a terminal, is set in DROP NODE 1. In the squelch information for the TO channels 1 and 2 on the EAST side, moreover, node 1 (NODE 1) is set in ADD NODE (1), node 3 (NODE 3) is set in DROP NODE (1), and node 2 (NODE 2) is set in DROP NODE (2).

The broadcast line is set in the squelch table as a combination of 1WAY lines. The purpose of this broadcast line is to prevent misconnection from occurring even when a node fault has occurred previously in node 3 or node 4, which are terminal nodes, and the DROP NODE in the squelch information sets node 2, which is the longest terminal node. Accordingly, the squelch table sets node 1 (NODE 1) in the ADD NODE (1) in the squelch information for the TO channel 3 on the EAST side, and node 2 (NODE 2), the longest terminal node, in DROP NODE (1).

As described earlier, FIGS. 48(a)–48(c) represent various line examples. The difference between the interconnection line in FIG. 48(a) and the interconnection (ON PROT) line is the difference between whether a WORK channel or a STBY channel is used for the line between node 3 and node 2. In the latter case, where node 2 does not need any particular protection, the WORK channel side is opened by using the STBY channel so that the WORK channel can be used for some other purpose, thereby enhancing line utilization efficiency. The service selector SS31 for node 3 is for selecting signals from the TORIPISUKURI and signals from the lines. The nodes line-split with this SS31 are called primary nodes, and the nodes at the end of the splits are called secondary nodes.

When a transmission path fault occurs, loop-back switching is performed on each line, but no misconnection will occur in this line example. For node faults, no misconnection will occur for one node fault, but a misconnection will occur when two nodes fault.

With reference to FIGS. 49(a)–49(c), a method for responding to a misconnection in this case is now described.

In FIGS. 49(a)–49(c), faults occur simultaneously in node 3 and node 2, whereupon a transmission path recovery process is begun using node 4 and node 1 adjacent to node 3 and node 2. Node 4 and node 1 recognize, by means of a conventional faulting node detection method, that node faults have occurred simultaneously in node 3 and node 2. Node 4 references the WORK channel squelch information in the squelch table, thereby ascertaining whether or not a path exists for communicating to the faulting node 3 and node 2. The STBY channel is used during transmission path recovery and so does not need to be retrieved.

As a consequence, in the squelch table, the TO channel discovers WEST (WORK) −1, WEST (WORK) −2, EAST (WORK) −1, EAST (WORK) −2, and EAST (WORK) −3. If either ADD NODE (1) and ADD NODE (2), or DROP NODE (1) and DROP NODE (2) are set simultaneously, that path is used for interconnection, wherefore, when it has been verified that either ADD NODE (1) and ADD NODE (2) or DROP NODE (1) and DROP NODE (2) have experienced simultaneous node faults, this is recognized as a channel on which there is a possibility that a misconnection will occur.

That being so, in this case, WEST (WORK) −1, WEST (WORK) −2, EAST (WORK) −1, and EAST (WORK) −2 meet the condition described above, wherefore a determination is made to insert PATH AIS in the channel.

EAST (WORK) −3 is a 1WAY path, even though node 2 is set in DROP NODE (1), so it does not become a channel subject to the insertion of PATH AIS. In terms of the actual method of PATH AIS insertion, when a faulting node is discovered in "ADD NODE," PATH AIS 201 is inserted for that WORK channel, and when a node fault is discovered in "DROP NODE," PATH AIS 202 is inserted for the STBY channel.

In this example, accordingly, in FIGS. 51(a)–51(d), PATH AIS 301 and 302 are inserted in WEST (WORK) −1 and WEST (WORK) −2 and in WEST (STBY) −1 and WEST (STBY) −2, respectively. After this misconnection prevention processing has been completed, loop-back switching is performed and the transmission path is restored.

With the methodology disclosed in Japanese Patent Laid-open No. H5-63761/1993 (gazette) recited above, however, a protocol is required for continually verifying whether or not time information has been normally received between the transmitting and receiving ends. For this reason, the protocol provided on the transmitting and receiving ends becomes complex, which constitutes a problem.

On the other hand, when it comes to methods for performing communication connection tests, performance tests, and alarm notifications between opposing ATM exchange facilities using OAM cells, it is only possible to detect line faults between the cell resolving and assembling unit in one ATM exchange facility and the cell resolving and assembling unit in the other ATM exchange facility, and it is not possible to broaden the range of detection in order to detect whether or not a line is normal between a portion of a communication path prior to cell assembly and a portion of a communication path after cell disassembly. This constitutes a problem.

Also, the OAM cells in alarm information received from a line are transferred in a form wherein they are multiplexed with the user data (payload data) cell flow. However, because these are always multiplexed and transferred with the user data, even when there is no change in the alarm content, user data transmission,efficiency is lowered, constituting a problem.

Also, in an ATM network system that uses a ring-shaped transmission path, when a fault occurs at an opposing node, the transmission path is looped back in front of the opposing node where the fault has occurred, wherefore two problems are encountered, namely, (1) data output from a node are transmitted back at the loop-back point and returned to that same node, wherefore the fault is not detected even when the opposing equipment is.cut off, and (2), as described in FIGS. 47(a)–47(c) to FIGS. 51(a)–51(d), with the method of outputting a P•AIS to a misconnection when a loop-back is being done, logic connections for ATM cells or packets, etc., cannot be coped with.

SUMMARY OF THE INVENTION

Thereupon, an object of the present invention is to provide ATM transmission equipment that is installed between existing exchange or terminals and other carrier facilities, wherewith existing transmission paths can be emulated, and wherewith T point interfaces can be provided for in-home unit.

Another object of the present invention is to provide ATM transmission equipment wherewith the transmission bands involved in communication within an ATM network provided for STM line interface portions can be reduced and network resources can be utilized more effectively.

Another object of the present invention is to provide a line fault detection method and apparatus designed so that line faults can be detected without employing complex protocols in equipment at the transmitting and receiving ends.

Another object of the present invention is to provide a line fault detection method and apparatus designed so that normal and abnormal line conditions can be detected over a range expanded to include communication path portions prior to cell assembly and communication path portions subsequent to cell disassembly.

Another object of the present invention is to provide a line fault detection method and apparatus designed so that alarm information can be transferred while minimizing declines in user data transmission efficiency.

Another object of the present invention is to provide a line fault detection method and apparatus designed so that, even when a fault occurs in an opposing apparatus in a ring-shaped network configuration, faults in the opposing apparatus can be detected at one node, at the ATM connection/packet connection level, and that fault information output to a terminal.

In order to attain the objects stated above, ATM transmission equipment for use in a communication network wherein an exchange having a line interface for STM line is connected to digital service units through an ATM network, comprises line interface means for connecting an STM line; cell assembling means for converting a fixed-bit-rate data string on the STM line into ATM cells; cell transmission control means for transmitting the ATM cells converted by the cell assembling means to the ATM network using at least one virtual connection; and cell disassembling means for converting the It ATM cells received from the ATM network to a data string having a fixed bit rate on the STM line.

In addition, the cell assembling means and the cell disassembling means may be implemented with ATM adaptation layer type 1.

The invention may further comprise fault detection means for detecting faults in the ATM network; and abnormal signal output means for outputting abnormal signals corresponding to the faults detected by the fault detection means, in place of the data string, to either the exchange or to the digital service units.

In addition, the invention may include the fault detection means for detecting faults in the ATM network; and abnormal signal output means for outputting abnormal signals corresponding to faults detected by the fault detection means, instead of the data strings, to either the exchange or to the digital service unit.

The data string may contain information portions, alarm signals, and other control frames on the STM line.

ATM transmission equipment for use in a communication network wherein an exchange having a line interface for STM line is connected to terminals having user network interfaces for an STM network through an ATM network, comprises line interface means for connecting an STM line; cell assembling means for converting a fixed-bit-rate data string on the STM line into ATM cells; cell transmission control means for transmitting the ATM cells converted by the cell assembling means to the ATM network using at least one virtual connection; and cell disassembling means for converting the ATM cells received from the ATM network to a data string having a fixed bit rate on the STM line.

The cell assembling means and the cell disassembling means may be implemented with ATM adaptation layer type 1.

In addition, the invention may include fault detection means for detecting faults in the ATM network; and abnormal signal output means for outputting abnormal signals corresponding to the faults detected by the fault detection means, in place of the data string, to either the exchange or to the terminals.

The fault detection means detects faults in the ATM network based on outputs from the cell disassembling means.

The data string may contain information portions, alarm signals, and other control frames on the STM line.

ATM transmission equipment installed in an ATM network in a communication network configured by inserting the ATM network between an exchange having an STM line interface and digital service units, comprising line interface means for connecting an STM line; cell assembly/disassembly means for performing process of converting a data string on the STM line to ATM cells and process of disassembling the ATM cells; alarm signal detection means for performing processing for either detecting communication anomalies or extracting maintenance operation information from the data string on the STM line; transmission means for replacing only necessary information resulting from detection or extraction by the alarm signal detection means with alarm signals, and transmitting that information together with information channels in the data string through the cell assembly/disassembly means; and data rearranging means for disassembling ATM cells formed from the information channels and the alarm information, rearranging those data into data string for the STM line, and outputting the data string either to the exchange or to the digital service unit.

In addition, the invention may include fault detection means for detecting faults in the ATM network; and fault information insertion means for inserting fault information indicating fault detection results in place of prescribed data in the data string when rearrangement to the data string is done by the data rearranging means.

The fault detection means detects faults in the ATM network either by anomalies in the cell disassembly process in the cell assembly/disassembly means or by anomalies in data on channels that transmit the alarm signals.

The cell assembly/disassembly means merges the alarm signals with the information channels and forms cells using the same virtual connection.

The cell assembly/disassembly means forms the alarm signals and the information channels, respectively, into cells using different virtual connections.

The cell assembly/disassembly means may perform the cell assembling and the cell disassembling in accordance with provisions of ATM adaptation layer type 1.

ATM transmission equipment installed in an ATM network in a communication network configured by inserting the ATM network between an exchange having an STM line interface and in-home unit having a user-network interface for the STM line, comprising line interface means for connecting the STM line; user-network interface means having a user-network interface corresponding to the STM line; cell assembly/disassembly means for performing process of converting data string on the STM line to ATM cells and process of disassembling the ATM cells; alarm signal detection means for performing processing for either detecting communication anomalies or extracting maintenance operation information from data string on the STM line; transmission means for replacing only necessary information resulting from detection or extraction by the alarm signal detection means with alarm signals, and transmitting that information together with information channels in the data string through the cell assembly/disassembly means; and data rearranging means for disassembling ATM cells formed from the information channels and the alarm information, rearranging these data into a data string for the STM line, and outputting the data string either to the exchange or to the digital service unit.

The invention may include fault detection means for detecting faults in the ATM network; and fault information insertion means for inserting fault information indicating fault detection results in place of prescribed data in the data strings when rearrangement to the data strings is done by the data rearranging means.

The fault detection means detects faults in the ATM network either by anomalies in cell disassembly process in the cell assembly/disassembly means or by anomalies in data on channels that transmit the alarm signals.

The cell assembly/disassembly means may merge the alarm signals with the information channels and form cells using same virtual connection.

The cell assembly/disassembly means may also form the alarm signals and the information channels, respectively, into cells using different virtual connections.

The cell assembly/disassembly means may perform the cell assembly and the cell disassembly in accordance with provisions of ATM adaptation layer type 1.

A method in a communication system that assembles data input from a line interface into data of fixed bit length or data of variable bit length and transmits the data thus assembled to a transmitting destination, comprising the steps of, in an apparatus at transmitting end, separating data input from the line interface into payload portions and alarm data portions; adding error detection codes to the alarm data portions; and assembling the alarm data portions having the added error detection codes and the payload portions into fixed-length data in the same transmitting unit and transmitting the data thus assembled to transmitting destination, and, in an apparatus at receiving end, separating the fixed-length data or the variable-length data received from the transmitting end into payload portions and alarm data portions; detecting whether or not errors are contained in the alarm data portions so separated by the error detection codes added to the alarm data portions; assembling the received payload portions and the alarm data portions are synthesized into a frame of a line interface, and the frame thus synthesized are transmitted to a line interface at the receiving end, if there are no errors in the alarm data portions; and determining that a line fault has developed, and transmitting line-break alarm data to the line interface at the receiving end, if there are errors in the alarm data portions.

When an error in an alarm data portion continues at or above some preset value, the line-break alarm data are transmitted, and when the preset value is not reached, last data wherein there was no error are transmitted to the line interface at the receiving end.

When underflows are detected in a receiving buffer that sequentially stores the fixed-length data or the variable-length data received from the transmitting end; and, when an underflow is detected that extends beyond a preset time, the line-break alarm data are transmitted to the line interface at the receiving end.

The alarm data portions and the payload portions transmitted from the apparatus at the transmitting end may be transmitted with different connections.

The alarm data portions may be transmitted to the line interface at the receiving end only when there is a change in alarm content.

The formula for calculating the error detection codes added to the alarm data portions is made to differ according to whether direction of bidirectional path for the payload portions is upstream or downstream.

An initial value of formula for calculating the error detection codes added to the alarm data portions is made to differ according to whether direction of bidirectional path for the payload portions is upstream or downstream.

A method in a communication system that assembles data input from a line interface into fixed-length data and transmits the data thus assembled toward a transmitting destination, comprising the steps of providing a test data generator and a test data comparator in a line terminal portion in a line interface unit; generating test data by the test data generator, either prior to starting operation of the communication system or when a fault occurs during operation thereof; transmitting the test data via an established line toward a line terminal portion in an opposing line interface unit; comparing the test data so transmitted against test data that return via the opposing line terminal portion by the test data comparator; and detecting presence or absence of anomalies in line leading to the line terminal portion in the opposing line interface unit according to whether or not those data agree.

The line interface unit is provided in an ATM exchange that input and outputs non-ATM data such as video and audio data.

An alarm information transfer method in a communication system that assembles data input from a line interface into fixed-length data and transmits the data thus assembling toward a transmitting destination, when transmitting alarm information indicating a line fault detected at receiving end to opposing apparatus, comprising the steps of assembling information into data of fixed bit length; and transmitted toward opposing transmitting destination, only when there is a change in alarm content.

BRIEF DESCRIPTION OF THE DRAWINGS

FIGS. 9(a)–9(c) are timing charts representing another example of cell conversion in the present invention;

FIGS. 10(a)–10(c) are timing charts representing yet another example of cell conversion in the present invention;

FIGS. 50(a)–50(c) are block diagrams of a conventional configuration for a squelch table; and FIGS. 51(a)–51(d) are block diagrams of another conventional configuration for a squelch table.

DESCRIPTION OF THE PREFERRED EMBODIMENTS

One embodiment of an ATM transmission system relating to the present invention is now described in detail with reference to the attached drawings.

Figure 1:
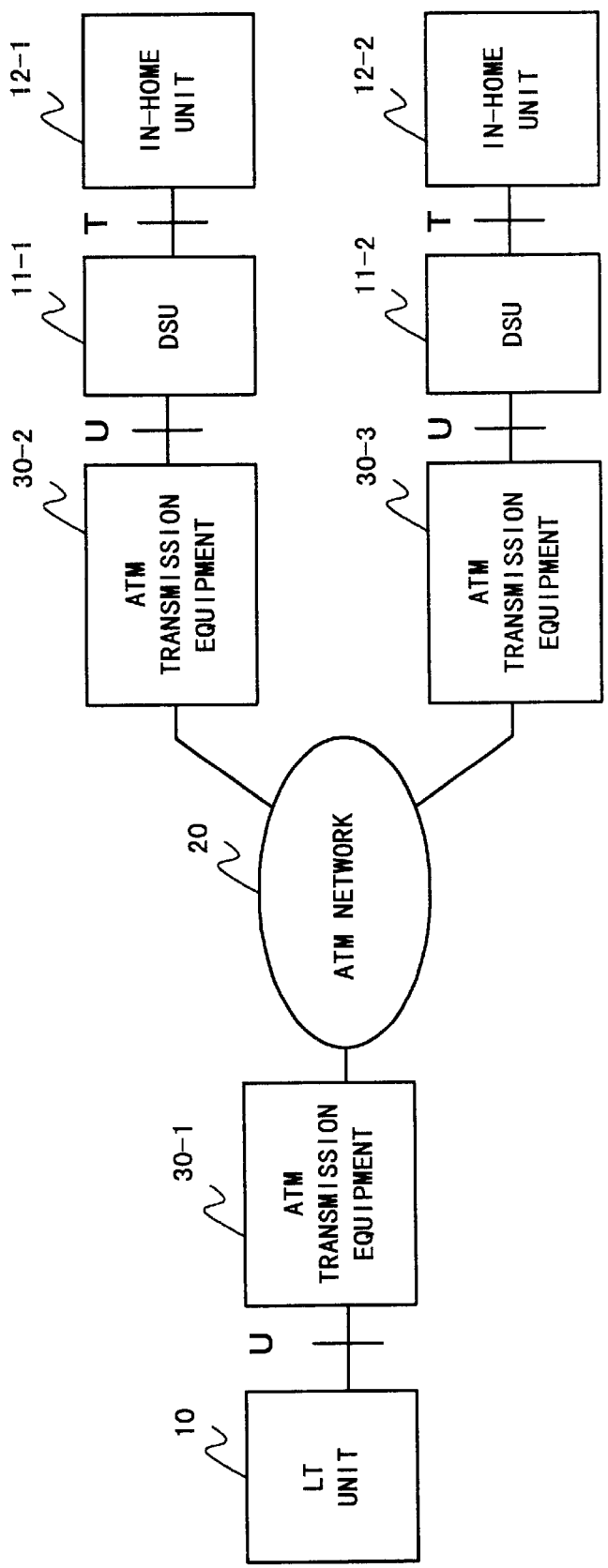
FIG. 1 is a block diagram of one embodiment of a communication network configured with ATM transmission equipment relating to the present invention.

FIG. 1 is a block diagram of one embodiment of a communication network configured with ATM transmission equipment relating to the present invention.

Figure 43:
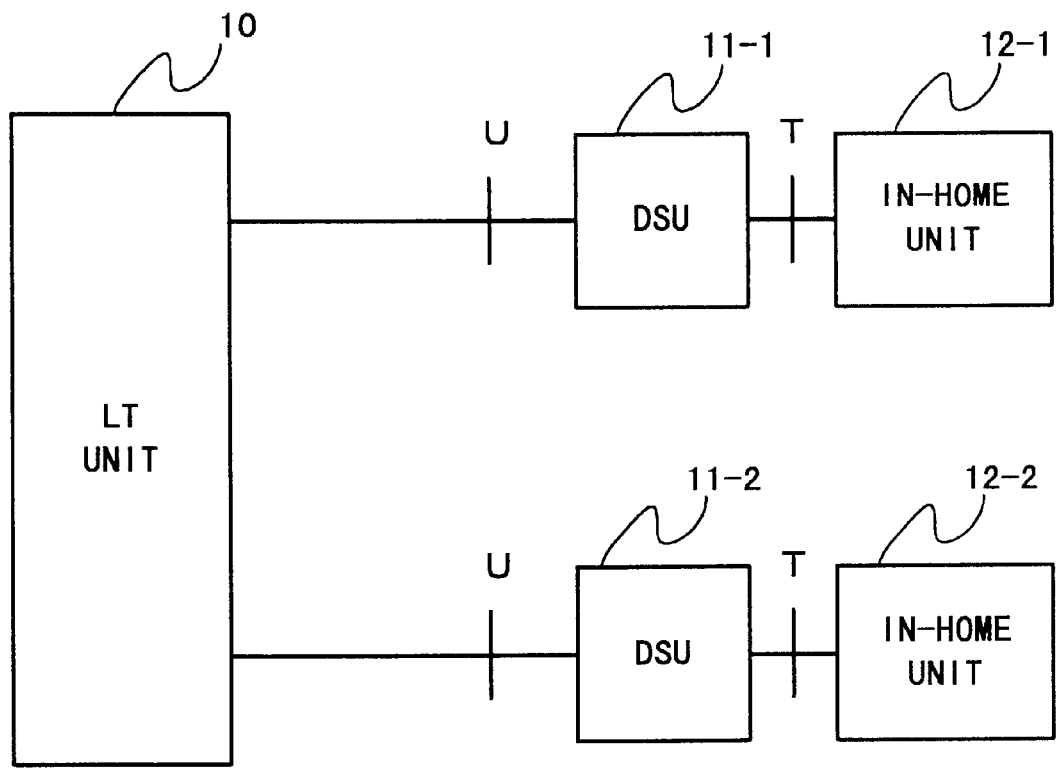
FIG. 43 is a detailed configurational diagram of an ordinary conventional communication network implemented with STM lines.
Figure 44:
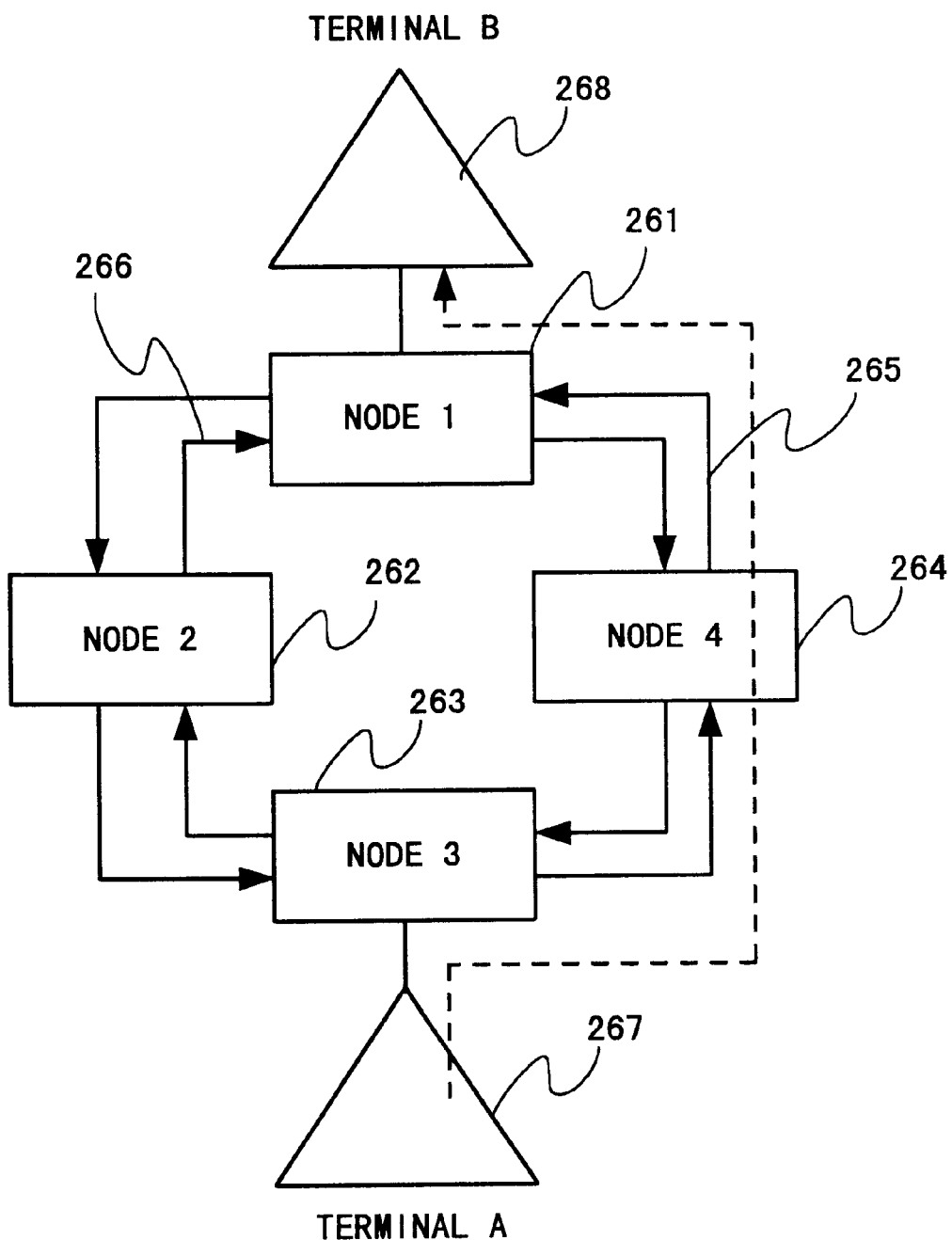
FIG. 44 is a diagram representing an example of a system wherein nodes are connected in a ring shape to configure an ATM network.
Figure 45:
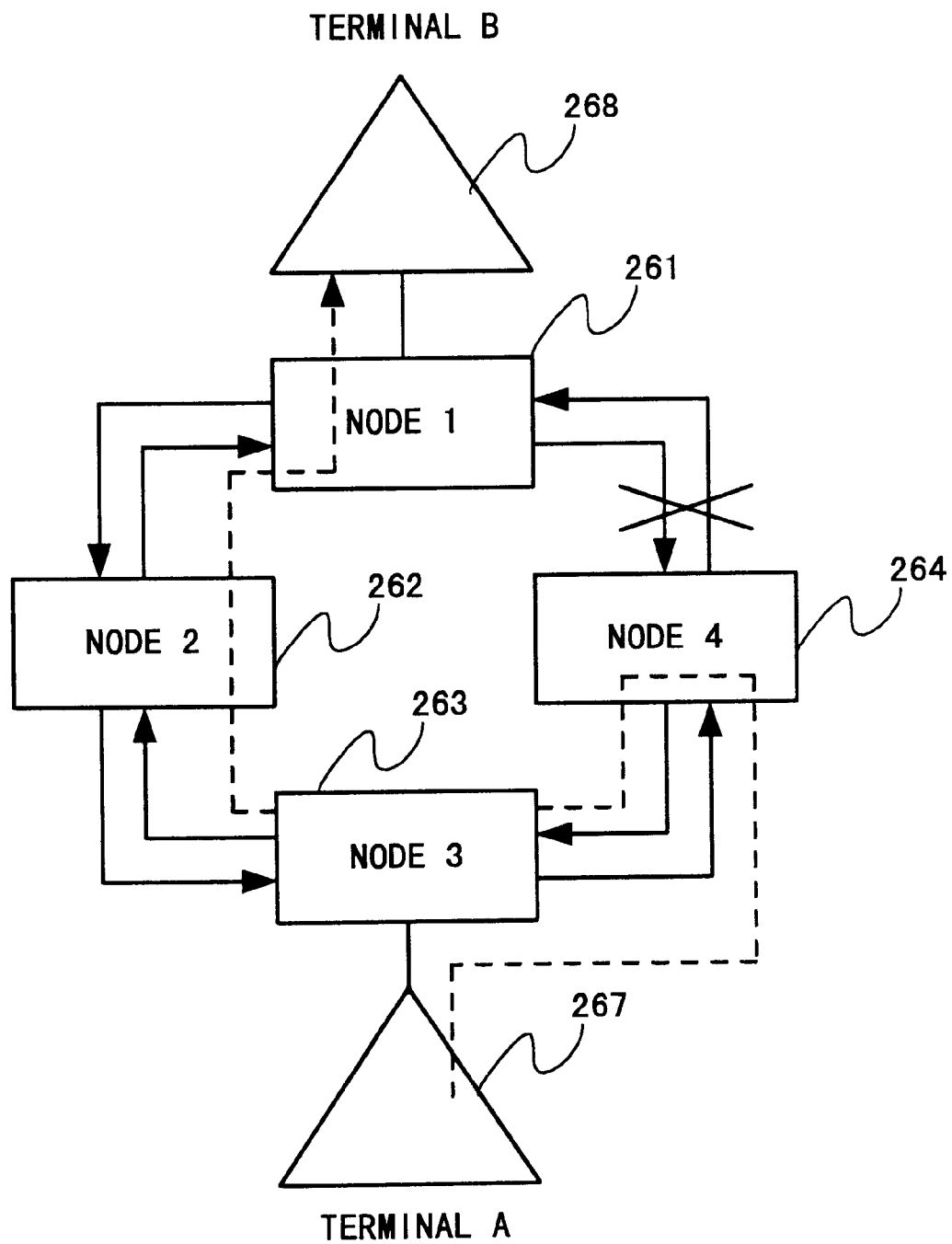
FIG. 45 is a diagram showing the implementation of loop-back in a case where a fault has occurred in a relay node in the transmission path from terminal A to terminal B.
Figure 46:
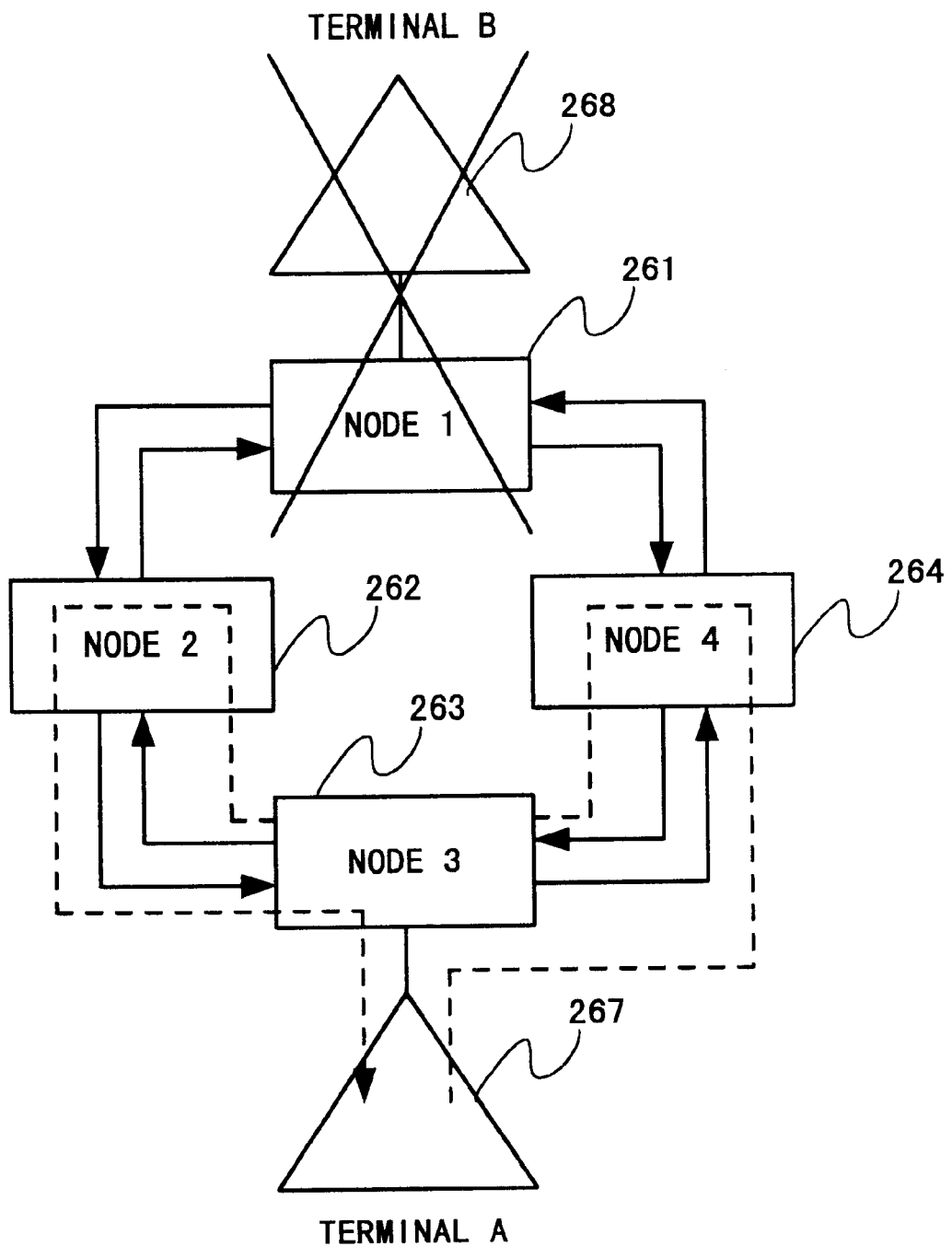
FIG. 46 is a diagram showing data output to terminal A returning right back to terminal A in a case where a fault has occurred in a node to which terminal B is connected.
Figure 47A:
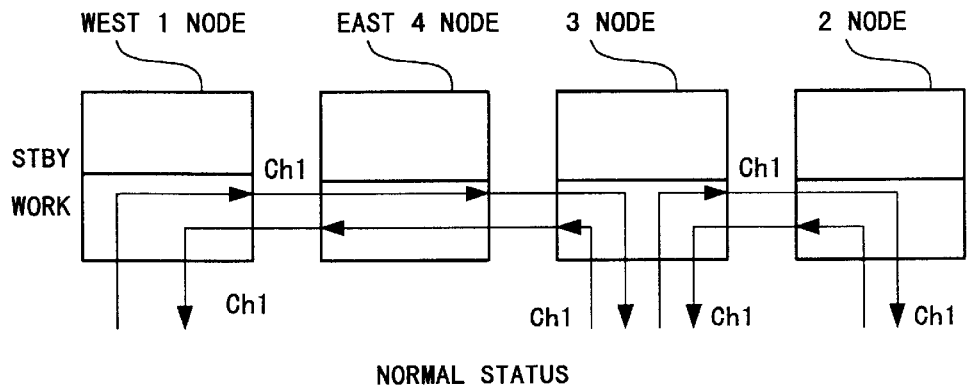
FIGS. 47(a)–47(c) are a set of block diagrams representing normal conditions, and switching conditions when a transmission path fault has occurred, in the prior art.
Figure 47B:
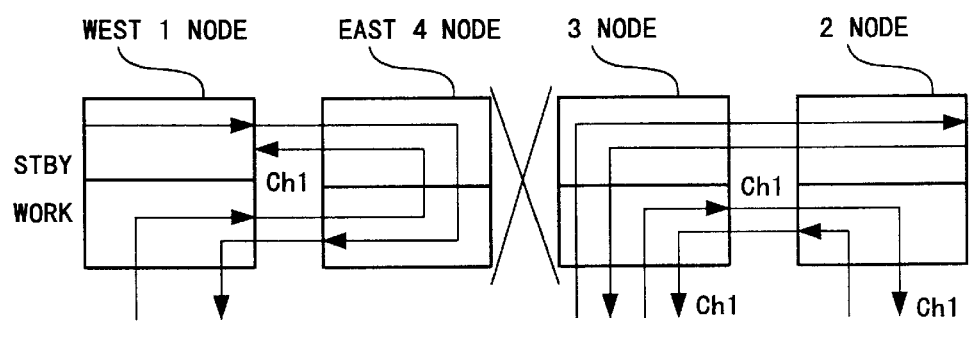
Figure 47C:
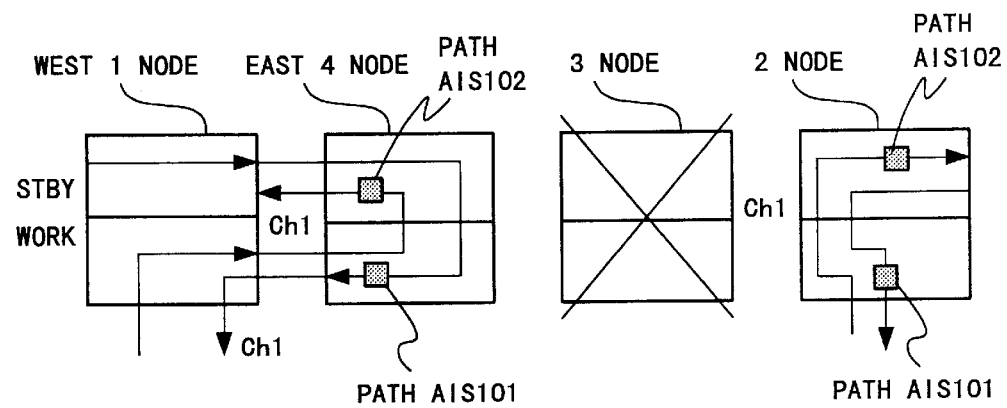
Figure 48A:
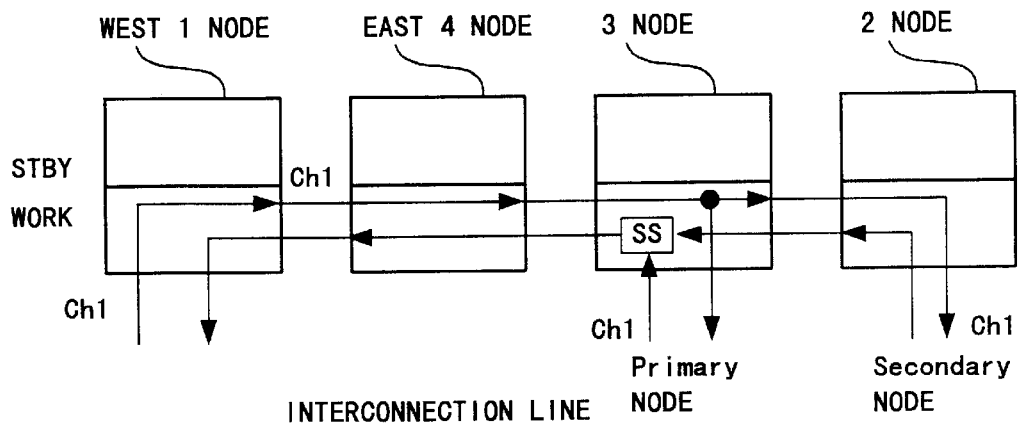
FIGS. 48(a)–48(c) are block diagrams representing the configuration of various types of branch lines.
Figure 48B:
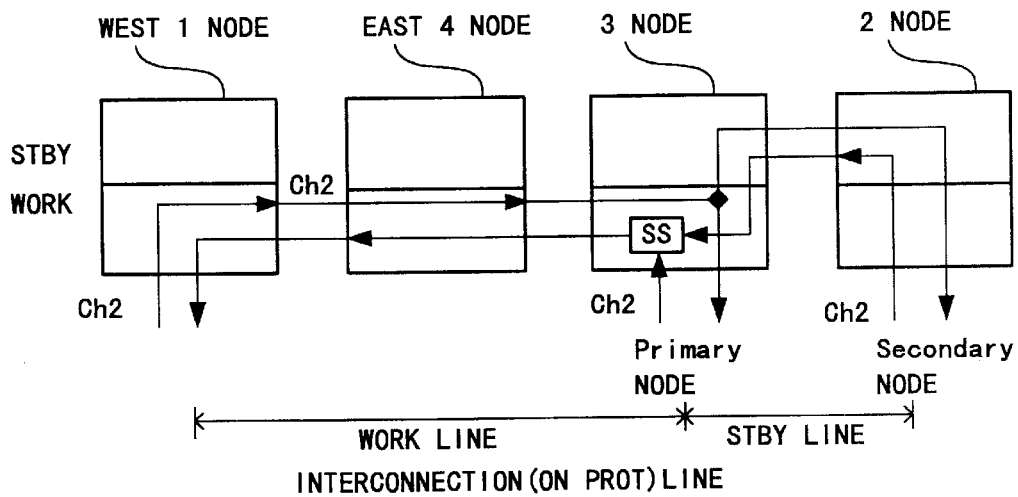
Figure 48C:
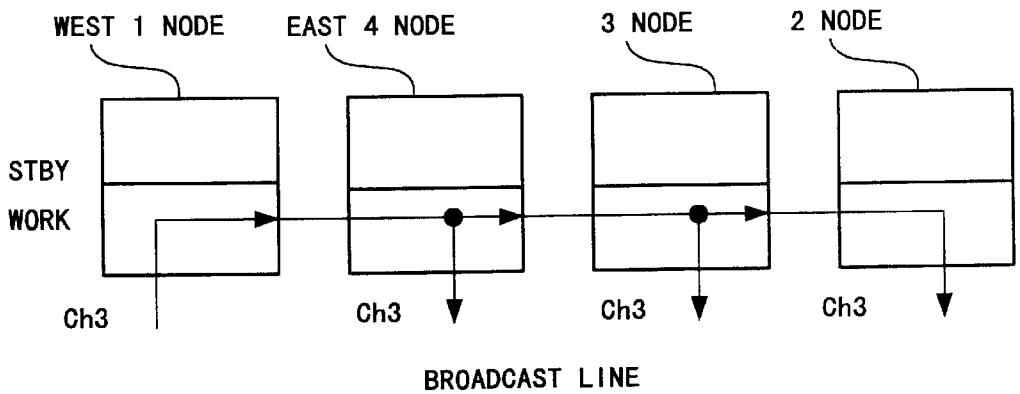
Figure 49A:
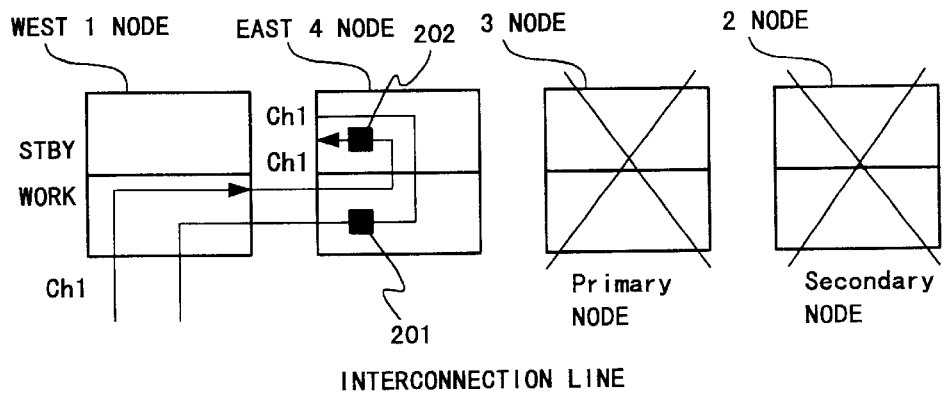
FIGS. 49(a)–49(c) are block diagrams of the configuration of a squelch table when a node fault has occurred.
Figure 49B:
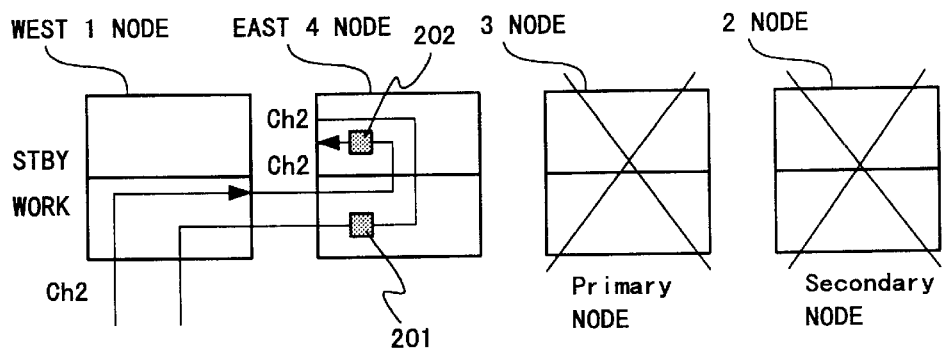
Figure 49C:
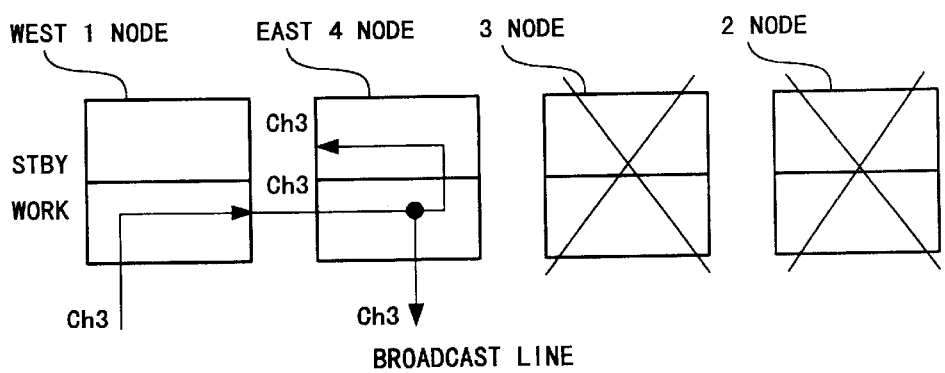

In FIG. 1, this communication network is configured with an ATM network provided at a U point that configures a subscriber line interface in an ordinary conventional communication network implemented with STM lines as diagrammed in FIG. 43. The U point interface is provided for the station exchange (LT unit) that comprises the existing carrier equipment and digital service units (DSUs) 11-1 and 11-2 installed for subscribers. In FIG. 1, moreover, for those components that serve the same function as those diagrammed in FIGS. 43, the same symbols as those used in FIG. 43 are utilized to simplify the description.

More specifically, in the configuration diagrammed in FIG. 1, an ATM network 20 is provided between DSUs 11-1 and 11-2, on the one hand, and the existing LT unit connected to existing STM lines that are high-speed digital lines or ISDN lines, etc., on the other. In this configuration, ATM transmission equipment 30-1 is positioned between the LT unit 10 and the ATM network 20, ATM transmission equipment 30-1 and 30-3, respectively, are positioned between the ATM network 20 and the DSU 11-1 and between the ATM network 20 and the DSU 11-2, and,a U point interface is provided for the LT unit 10 and for the DSUs 11-1 and 11-2.

Figure 2:
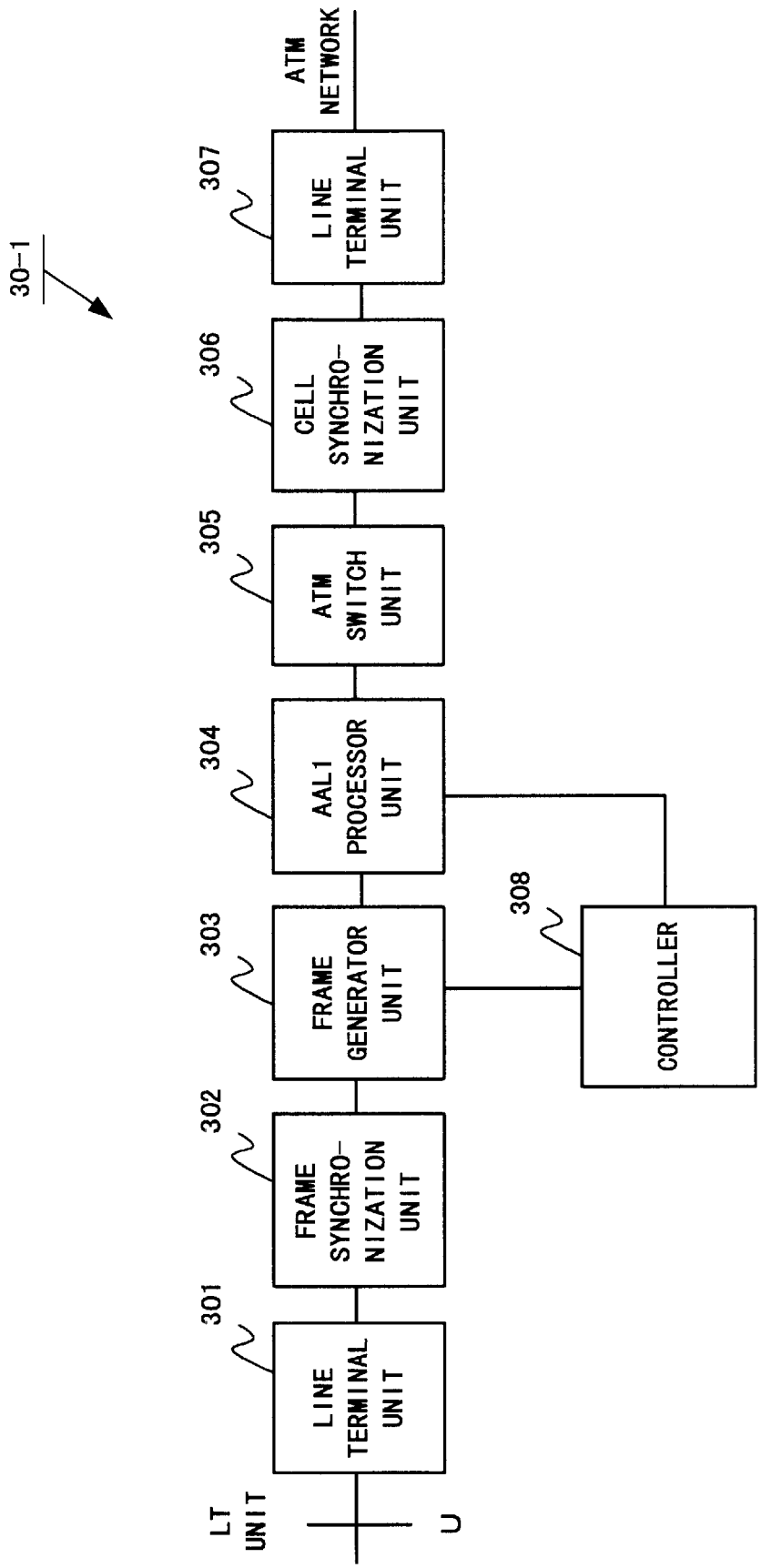
FIG. 2 is a block diagram showing the detailed configuration of ATM transmission equipment on the exchange side installed between the LT unit and the ATM network diagrammed in FIG. 1.

FIG. 2 is a block diagram showing the detailed configuration of ATM transmission equipment 30-1 on the exchange side installed between the LT unit 10 and the ATM network 20 diagrammed in FIG. 1.

The ATM transmission equipment 30-1 on the exchange side provided between the LT unit 10 and the ATM network 20 comprises a line terminal unit 301, a frame synchronization unit 302, a frame generator unit 303, an AAL1 (ATM adaptation type 1) processor (CLAD) 304, an ATM switching unit (ATM multiplexer-separator unit) 305, a cell synchronization unit 306, a line terminal unit 307, and a controller 308.

The line terminal unit 301, here, is connected to the LT unit 10 diagrammed in FIG. 1 and terminates the existing physical line. The frame synchronization unit 302 performs frame synchronization for existing lines.

The frame generator unit 303 performs pre- and post-processing for the AAL1 processing. The AAL1 processing unit 304 performs cell assembly and de-formation according to the AAL type 1 protocol.

The ATM switching unit 305 performs cell exchange or multiplexing. The cell synchronization unit 306 interfaces with the ATM network 20. The line terminal unit 307 terminates the ATM line from the ATM network 20.

The controller 308 performs processing both for inserting alarm information into frames and for extracting alarm information from frames.

Figure 3:
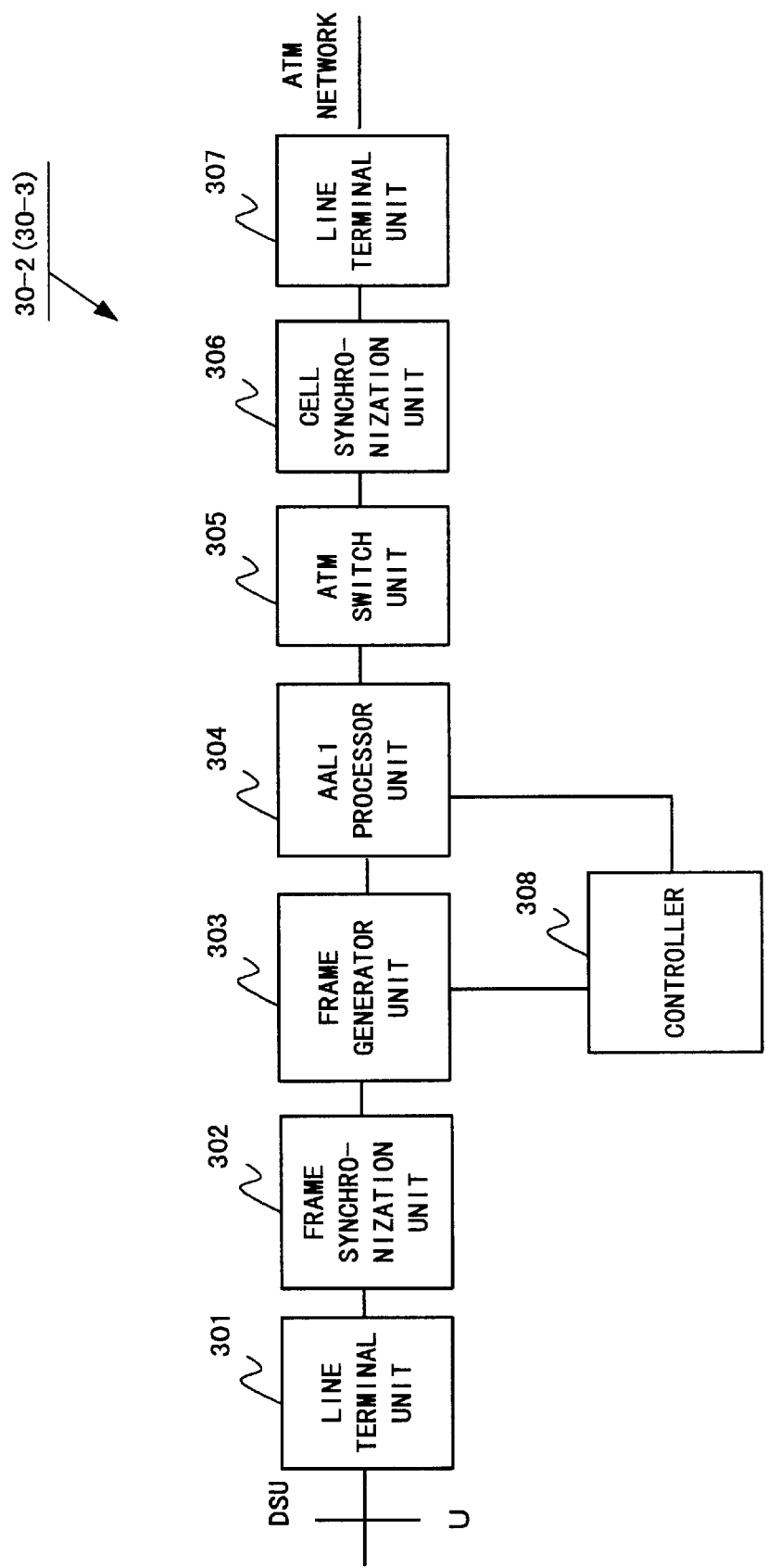
FIG. 3 is a block diagram showing the detailed configuration of ATM transmission equipment on the terminal side installed between the ATM network and the DSU diagrammed in FIG. 1.

FIG. 3 is a block diagram showing the detailed configuration of ATM transmission equipment 30-2 or 30-3 on the terminal side installed between the ATM network 20 and the DSU 11-1 or 11-2 diagrammed in FIG. 1.

In FIG. 3, the components serving the same function as in the ATM transmission equipment 30-1 on the exchange side diagrammed in FIG. 2 are indicated by the same symbols as those used in FIG. 2 to simplify the description.

The ATM transmission equipment 30-2 and 30-3 provided on the terminal sides between the ATM network 20 and the DSUs 11-1 and 11-2 are basically configured in the same way as the ATM transmission equipment 30-1 on the exchange side diagrammed in FIG. 2. However, in the ATM transmission equipment 30-2 and 30-2 on the terminal sides diagrammed in FIG. 3, the line terminal unit 301 is connected so as to look to the U points for the DSUs 11-1 and 11-2.

The basic operation of the ATM transmission equipment 30-1 on the exchange side and of the ATM transmission equipment 30-2 and 30-3 on the terminal sides, as described in the foregoing, is now described.

Data transmitted over the STM line from the LT unit 10, in the ATM transmission equipment 30-1, are passed to the frame synchronization unit 302 via the line terminal unit 301 that looks to the U point, whereupon the frame synchronization unit 302 checks the frame synchronization pattern and establishes frame synchronization.

As a result of this frame synchronization establishment, it becomes possible to differentiate between information channels and other frame bits, etc., in the data strings on the STM line.

In the frame generator unit 303, the frames transmitted to the ATM network 20 are generated. This is where alarm signal extraction processing is performed by the controller 308.

In the AAL1 processor 304, the frames generated by the frame generator unit 303 are formed into ATM cells by cell-forming processing, following the AAL type 1 protocol.

These ATM cells are transmitted via the cell synchronization unit 306 and the line terminal unit 307 to the ATM network 20.

The ATM cells transmitted to the ATM network 20 are received by the ATM transmission equipment 30-2 and 30-3 on the terminal sides.

In the ATM transmission equipment 30-2 and 30-3 at the terminals, these ATM cells are assembled into frames for the existing lines by a process that reverses the processing performed by the ATM transmission equipment 30-1 on the exchange side, and these frames are transmitted by the line terminal unit 301 to the DSUs 11-1 and 11-2.

More specifically, in the ATM transmission equipment 30-1 and 30-3 at the terminals, the ATM cells from the ATM network 20 are passed to the AAL1 processor 304 via the line terminal unit 307 and the cell synchronization unit 306, and are there subjected to cell disassembly according to the AAL type 1 protocol. In the frame generator unit 303, these data are assembled into frames for the existing lines. At this time, alarm signal insertion processing is performed by the controller 308.

The frames for the existing lines generated by the frame generator unit 303 are transmitted to the DSUs 11-1 and 11-2 via the frame synchronization unit 302 and the line terminal unit 301 facing the U point.

Similarly, the frames transmitted from the DSUs 11-1 and 11-2 are transmitted to the LT unit 10 via the ATM transmission equipment 30-2 and 30-3 at the terminals, the ATM network 20, and the ATM transmission equipment 30-1 at the exchange end.

Figure 4:
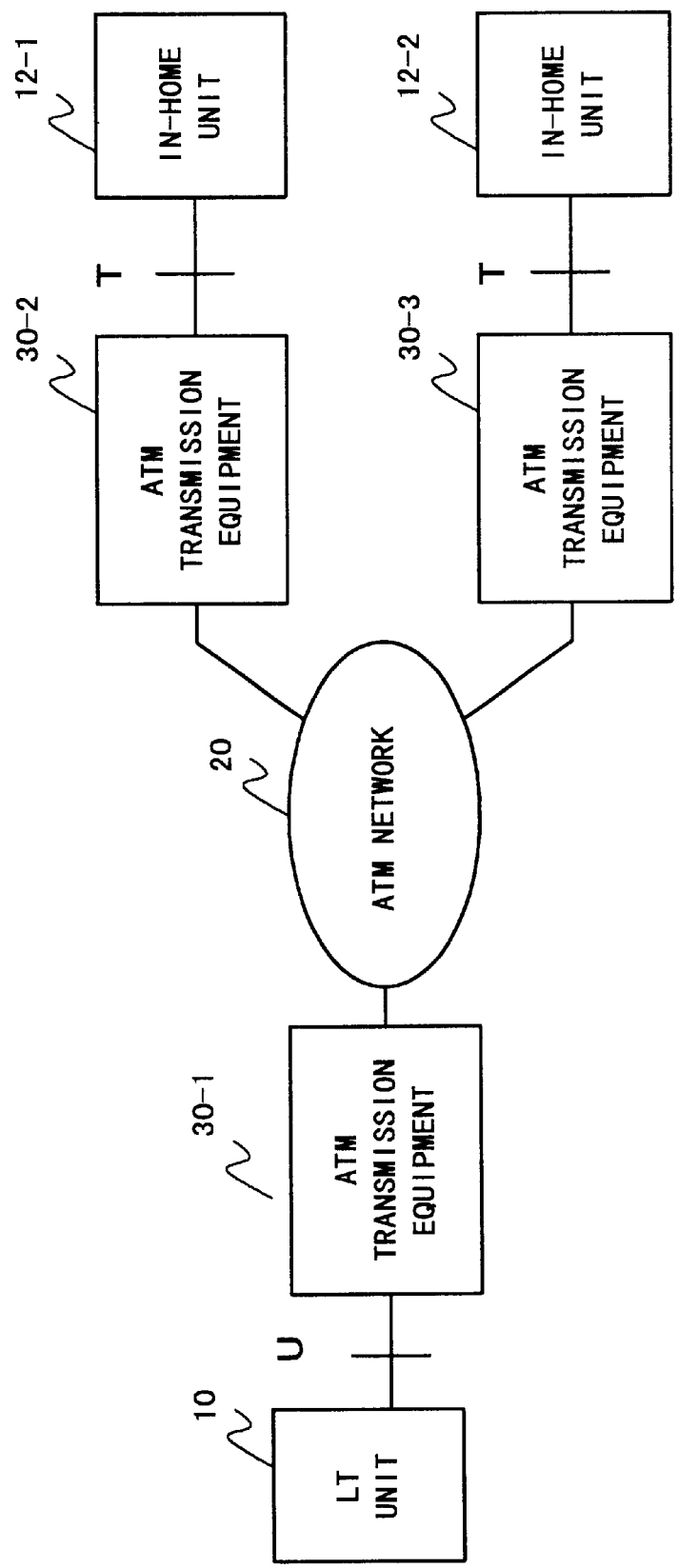
FIG. 4 is a block diagram of another embodiment of a communication network configured with ATM transmission equipment relating to the present invention.

FIG. 4 is a block diagram of another embodiment of a communication network configured with ATM transmission equipment relating to the present invention.

In FIG. 4, to simplify description, the same symbols as those used in FIG. 1 are employed to indicate components performing the same functions as those diagrammed in FIG. 1.

In the communication network diagrammed in FIG. 4, a U point interface is provided for the station exchange (LT unit) constituting the existing carrier equipment, and T point interfaces are provided for user terminals or other in-home unit 12-1 and 12-2.

More specifically, in the configuration diagrammed in FIG. 4, the ATM network 20 is provided between the LT unit 10 and the in-home unit 12-1 and 12-2 installed on the subscriber ends, the ATM transmission equipment 30-1 is placed between the LT unit 10 and the ATM network 20, the ATM transmission equipment 30-2 is placed between the ATM network 20 and the in-home unit 12-1, and the ATM transmission equipment 30-3 is placed between the ATM network 20 and the in-home unit 12-2.

The T point interfaces are provided in the configuration diagrammed in FIG. 4 in order to reduce the costs involved in installing DSUs by including DSU functions in the ATM transmission equipment 30-2 and 30-3, and also in order to efficiently accommodate 1.5M dedicated line services in the ATM network.

Figure 5:
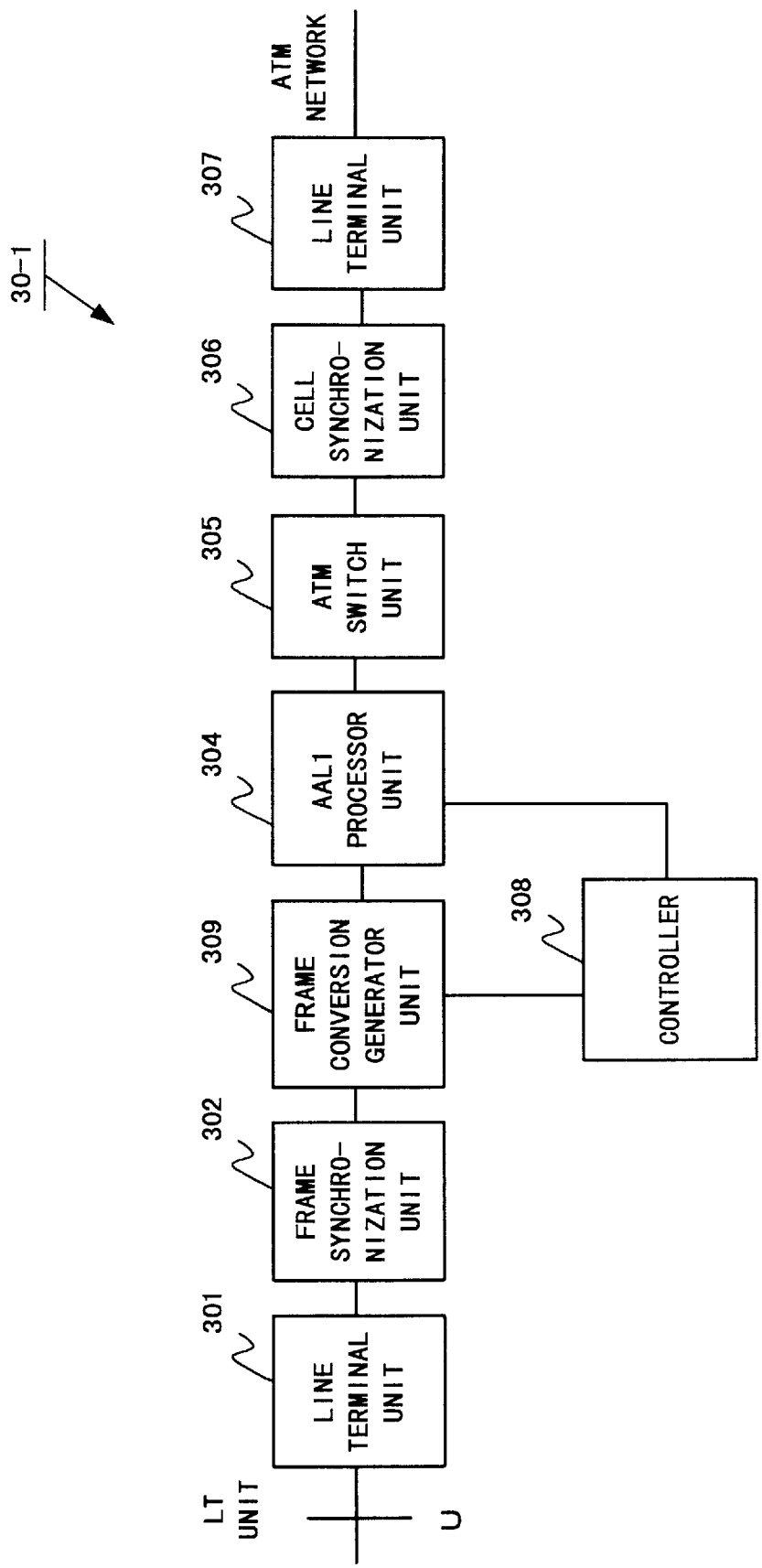
FIG. 5 is a block diagram showing the detailed configuration of ATM transmission equipment on the exchange side installed between the LT unit and the ATM network diagrammed in FIG. 4.

FIG. 5 is a block diagram showing the detailed configuration of ATM transmission equipment 30-1 on the exchange side installed between the LT unit 10 and the ATM network 20 diagrammed in FIG. 4.

In FIG. 5, to simplify description, the same symbols are used as those employed in FIG. 2 for components performing the same functions as in the ATM transmission equipment 30-1 on the exchange side in FIG. 2.

The ATM transmission equipment 30-1 at the exchange installed between the ATM network 20 and the LT unit 10 diagrammed in FIG. 5 is configured basically in the same way as the ATM transmission equipment 30-1 on the exchange side as diagrammed in FIG. 2. In the ATM transmission equipment 30-1 on the exchange side, diagrammed in FIG. 5, however, in place of the frame generator unit 303 diagrammed in FIG. 2, a frame conversion generator unit 309 that incorporates frame conversion for use with 1.5M dedicated line services is provided. This frame conversion used for the 1.5M dedicated line services will be described in detail with reference to FIGS. 10(*a*)–10(*c*).

Figure 6:
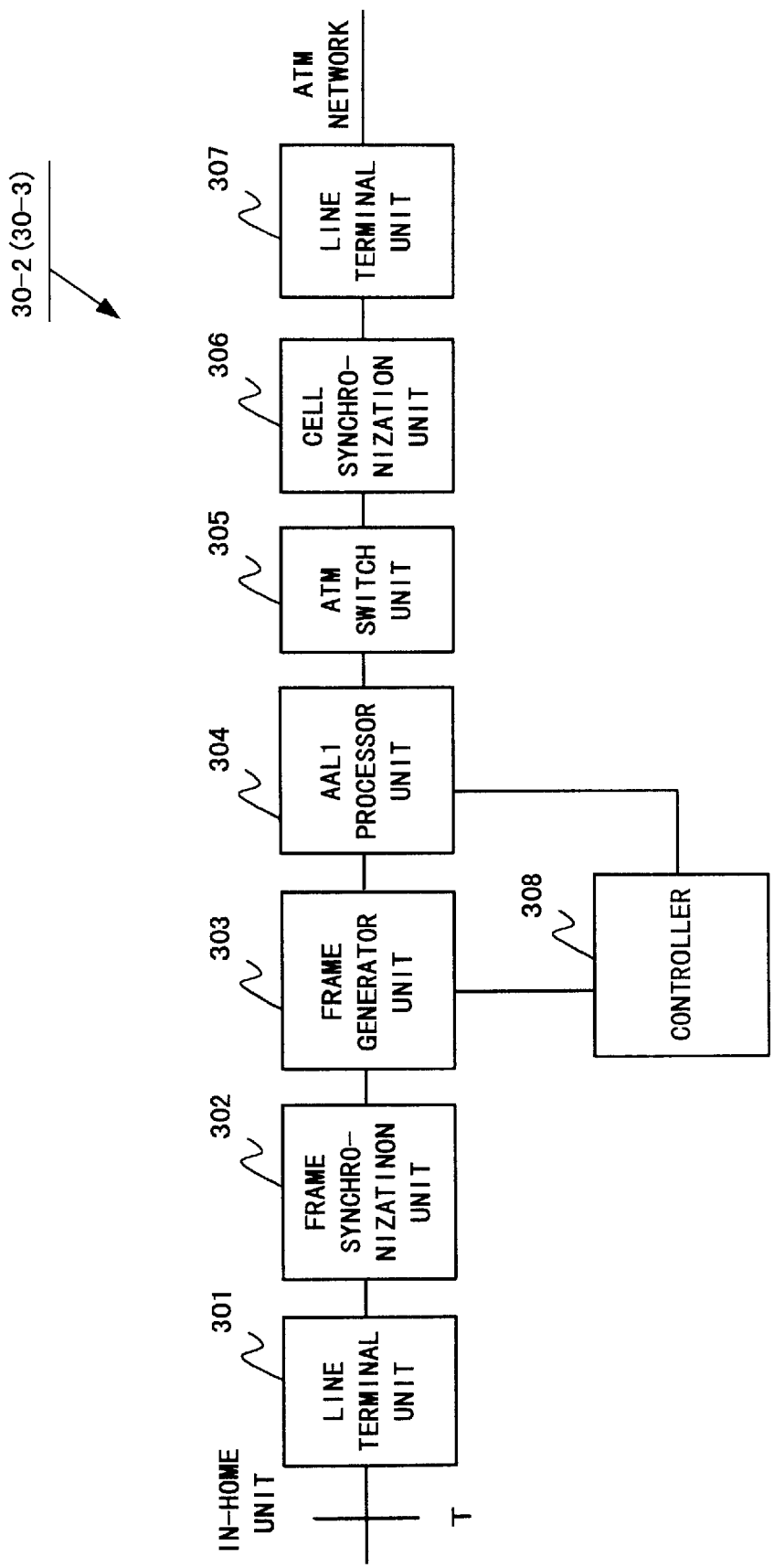
FIG. 6 is a block diagram showing the detailed configuration of ATM transmission equipment on the terminal side installed between the ATM network and the in-home unit diagrammed in FIG. 4.

FIG. 6 is a block diagram showing the detailed configuration of ATM transmission equipment 30-2 or 30-3 on the terminal side installed between the ATM network 20 and the in-home unit 12-1 or 12-2 diagrammed in FIG. 4.

In FIG. 6, to simplify description, the same symbols are used as those employed in FIG. 3 for components performing the same functions as in the ATM transmission equipment 30-2 or 30-3 on the exchange at the terminals diagrammed in FIG. 3.

The ATM transmission equipment 30-2 and 30-3 provided at the terminals between the ATM network 20 and the in-home unit 12-1 and 12-2 diagrammed in FIG. 6 are basically configured in the same way as the ATM transmission equipment 30-2 and 30-3 at the terminals diagrammed in FIG. 3. However, in the ATM transmission equipment 30-2 and 30-3 at the terminals diagrammed in FIG. 6, the line terminal unit 301 is connected so as to look to the T points for the in-home unit 12-1 and 12-2.

In the ATM network 20, data are cent in packets of fixed length called cells (ATM cells). Thus it is necessary to covert data on existing lines to cells in order to accommodate them. In the ATM network 20, the existing lines are associated with virtual connections (Vcs) distinguished by cell headers.

Figure 7:
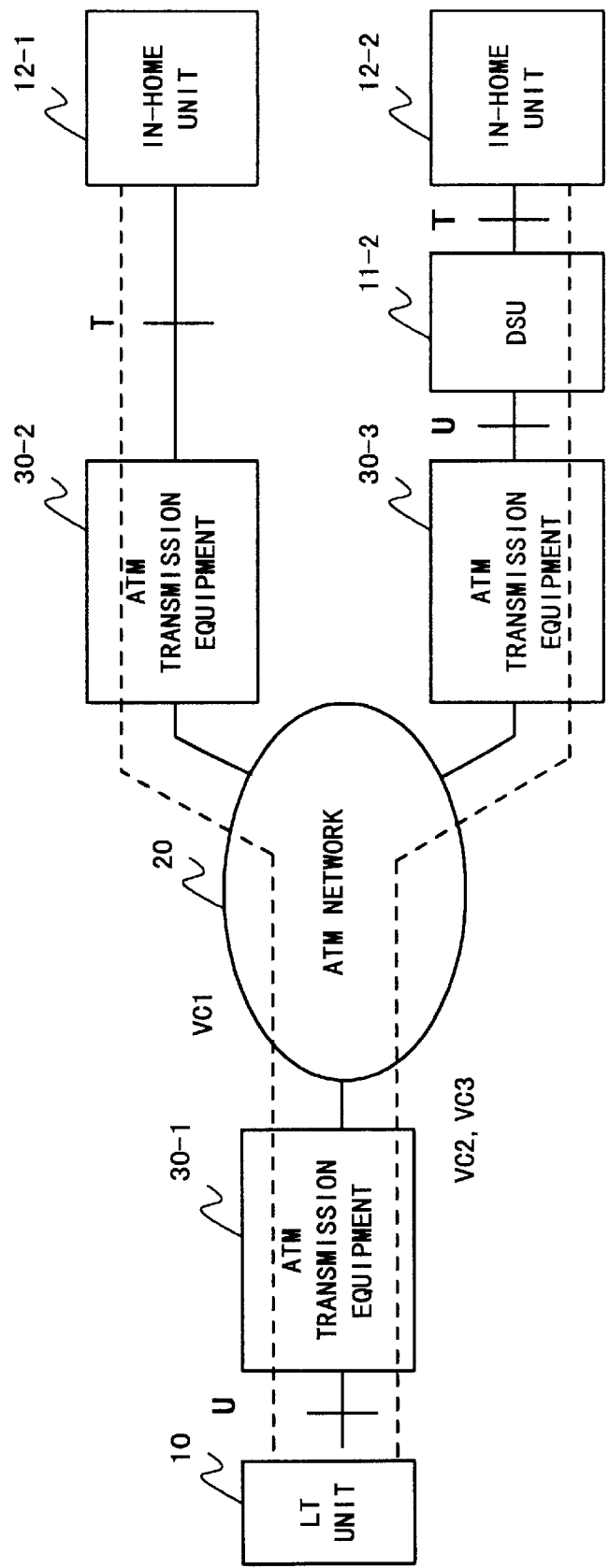
FIG. 7 is a diagram of one example of how, in the present invention, to handle an existing physical line and a virtual connection on an ATM network.

FIG. 7 is a diagram of one example of how, in the present invention, to handle an existing physical line and a virtual connection on an ATM network.

In the case diagrammed in FIG. 7, the LT unit 10 and the in-home unit 12-1 are connected via a U point, while the ATM transmission equipment 30-1, the ATM network 20, and the ATM transmission equipment 30-2 are connected via T points (corresponding to the configuration diagrammed in FIG. 4), while the LT unit 10-1 and the DSU 11-2 are connected via a U point, the ATM transmission equipment 30-1, ATM network 20, and ATM transmission equipment 30-3 are connected via U points, and the in-home unit 12-2 is connected via a T point to this DSU 11-2 (corresponding to the configuration diagrammed in FIG. 1).

Now, the data on the exchange lines are in continuous constant-speed bit strings called frames. In order to transmit these over the ATM network 20, therefore, these frames made up of constant-speed bit strings are converted to ATM cells. The AAL type 1 protocol described earlier is employed in this conversion to ATM cells. As a result, the existing physical lines are associated in the ATM network 20 with one or more virtual connections (Vcs).

More specifically, depending on the circuit configuration, there are cases where the frame length and transmission speed of the existing physical lines exceeds the load sustainable by AAL type 1 protocol processing. In such cases, the frames on the existing physical lines are suitably divided to form ATM cells, whereupon the existing physical lines are associated in the ATM network 20 with one or more virtual connections (Vcs).

In FIG. 7, for communication between the LT unit 10 and the in-home unit 12-1, one existing physical line is associated in the ATM network 20 with one virtual connection VC1, while for communication between the LT unit 10 and the DSU 11-2, one existing physical lines is associated in the ATM network 20 with two virtual connections VC2 and VC3.

Figures 8A, 8B, 8C:
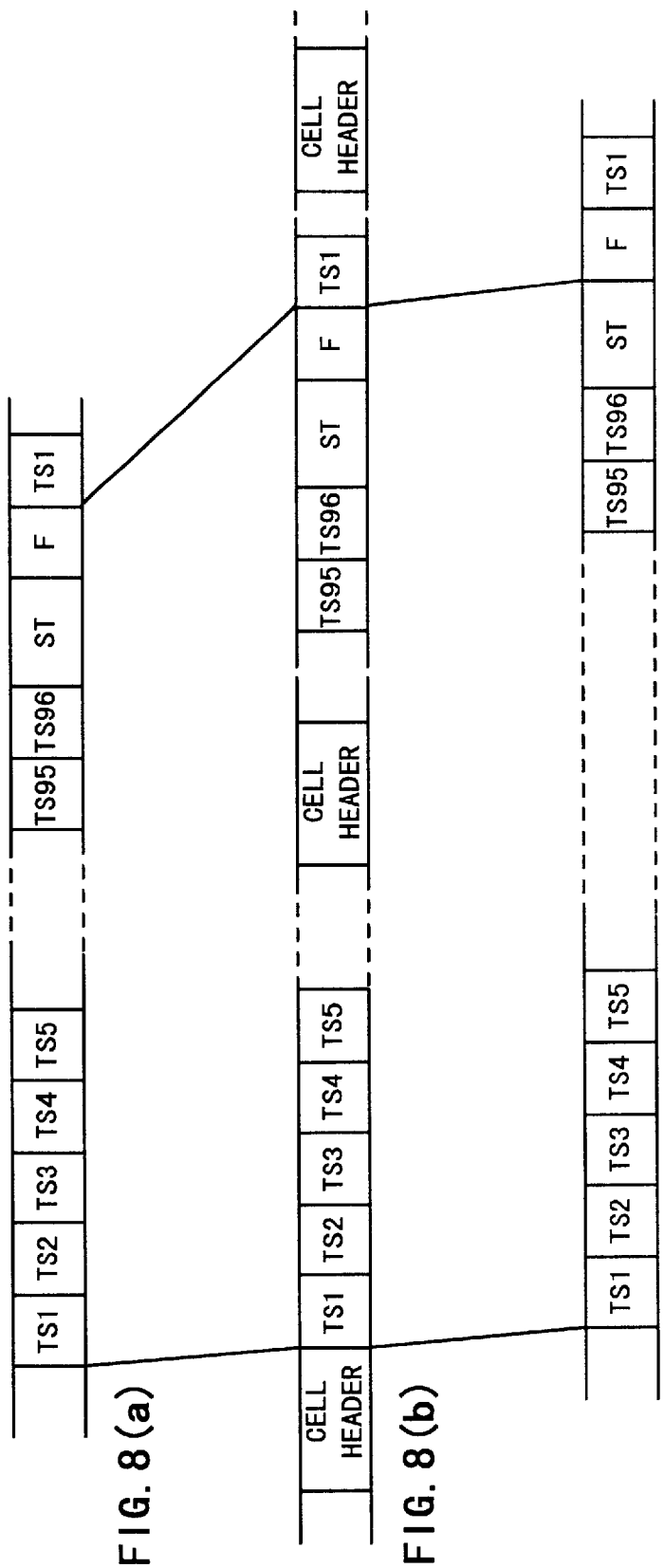
FIGS. 8(a)–8(c) are timing charts representing one example of cell conversion in the present invention.

FIGS. 8(a)–8(c) are timing charts representing one example of cell conversion in the present invention.

In FIGS. 8(a)–8(c) are represented a case where a 6M dedicated line is accommodated in the communication network diagrammed in FIG. 1, that is, a case where the U point interface for an existing physical line is a 6M interface.

In FIG. 8(a) is represented a data string transmitted over the 6M dedicated line that is the existing physical line. This data string, in this case, continues from byte-unit data TS 1 at the head to data TS 96. These data are followed by an ST frame and an F bit, whereupon the frame comprising this data string is repeated.

In this case, the data string diagrammed in FIG. 8(a) and input to the line terminal unit 301 in the ATM transmission equipment 30-1 on the exchange side diagrammed in FIG. 2 is synchronized by the frame synchronization unit 302 and then output to the AAL1 processor 304 via the frame generator unit 303. In the AAL1 processor 304, data are set, in order from TS 1, in the payload portions of ATM cells having the virtual connection VC1, for example. In this case, the frame made up of the data string diagrammed in FIG. 8(a) is longer than the payload in the ATM cell, wherefore what cannot be fit into the first ATM cell is set in the same way in the next cell.

When the data string diagrammed in FIG. 8(a) has been set in this manner in ATM cells up to the data TS 96, the ST frame and F bit are next set in ATM cells, whereupon one frame of data will have been output in ATM cell payloads.

When output is finished for the ATM cell payloads up to the F bit in the data string diagrammed in FIG. 8(a), the cell forming process is repeated in the same way from the data TS 1 at the head of the next frame, whereupon the cell diagrammed in FIG. 8(b) is completed. However, due to the relationship between ATM cell payload length and frame length, subsequent data TS 1 will not necessarily be set immediately after the cell header.

The ATM cells completed in this manner are transmitted over the ATM network 20 and arrive at the ATM transmission equipment at the terminal end.

The ATM transmission equipment 30-2 or 30-3 at the terminals diagrammed in FIG. 3 take the arriving ATM cells and assemble them into frames for an existing line in a procedure that reverses that described in the foregoing. More specifically, the AAL1 processor 304 in the terminal-side ATM transmission equipment 30-2 or 30-3 extracts from the ATM cells the data from TS 1 to TS 96, the ST frame, and the F bit carried in the payload thereof, and outputs these data, together with a signal designating the data TS 1, to the frame generator unit 303.

The frame generator unit 303 outputs in order, beginning with the data TS 1, in coordination with the timing of the frame synchronization unit 302, and assembles these data into frames for the existing line. By these operations the frame diagrammed in FIG. 8(c) is produced.

Furthermore, in the event that a fault of some kind occurs in the ATM network 20 so that cells cannot be transmitted, the fact that cells cannot be received by the AAL1 processor 304 will be detected either from the cell synchronization being off or from a receiving buffer anomaly. In such a case as that, in the controller 308, a frame is created which indicates an abnormal condition, and this frame is output to the frame generator unit 303 instead of the data output by the AAL1 processor 304.

FIGS. 9(a)–9(c) are timing charts representing another example of cell conversion in the present invention.

FIGS. 9(a)–9(c) diagram a case wherein a 6M dedicated line is accommodated in the communication network diagrammed in FIG. 1, that is, a case wherein the U point interface for the existing physical line is a 6M interface. The case diagrammed in FIGS. 9(a)–9(c), however, is an example of cell conversion wherewith the AAL1 processor 304 cannot handle data exceeding 96 bytes.

The cell conversion example diagrammed here in FIGS. 9(a)–9(c) differs from the cell conversion diagrammed in FIGS. 8(a)–8(c) in that the ST frame and the F bit are assembled into a cell;having a separate virtual connection (such as the virtual connection VC2, for example) from the data from TS 1 to T 96.

More specifically, in this case, in the frame generator unit 303 of the ATM transmission equipment on the transmitting end, the data string diagrammed in FIG. 9(a) is separated into the data from TS 1 to T 96 and the ST frame and F bit, and then output to the AAL1 processor 304. As a result, in the AAL1 processor 304, the data from TS 1 to T 96 and the ST frame and F bit are formed into cells for different virtual connections, namely into virtual connection VC1 cells and virtual connection VC2 cells, and transmitted to the ATM network 20.

In the ATM transmission equipment at the receiving end, the data from TS1 to T96 and the ST frame and F bit transmitted by the separate virtual connections VC1 and VC2 are synthesized into one frame, as diagrammed in FIG. 9(c), by the frame generator 303.

Figures 10A, 10B, 10C:
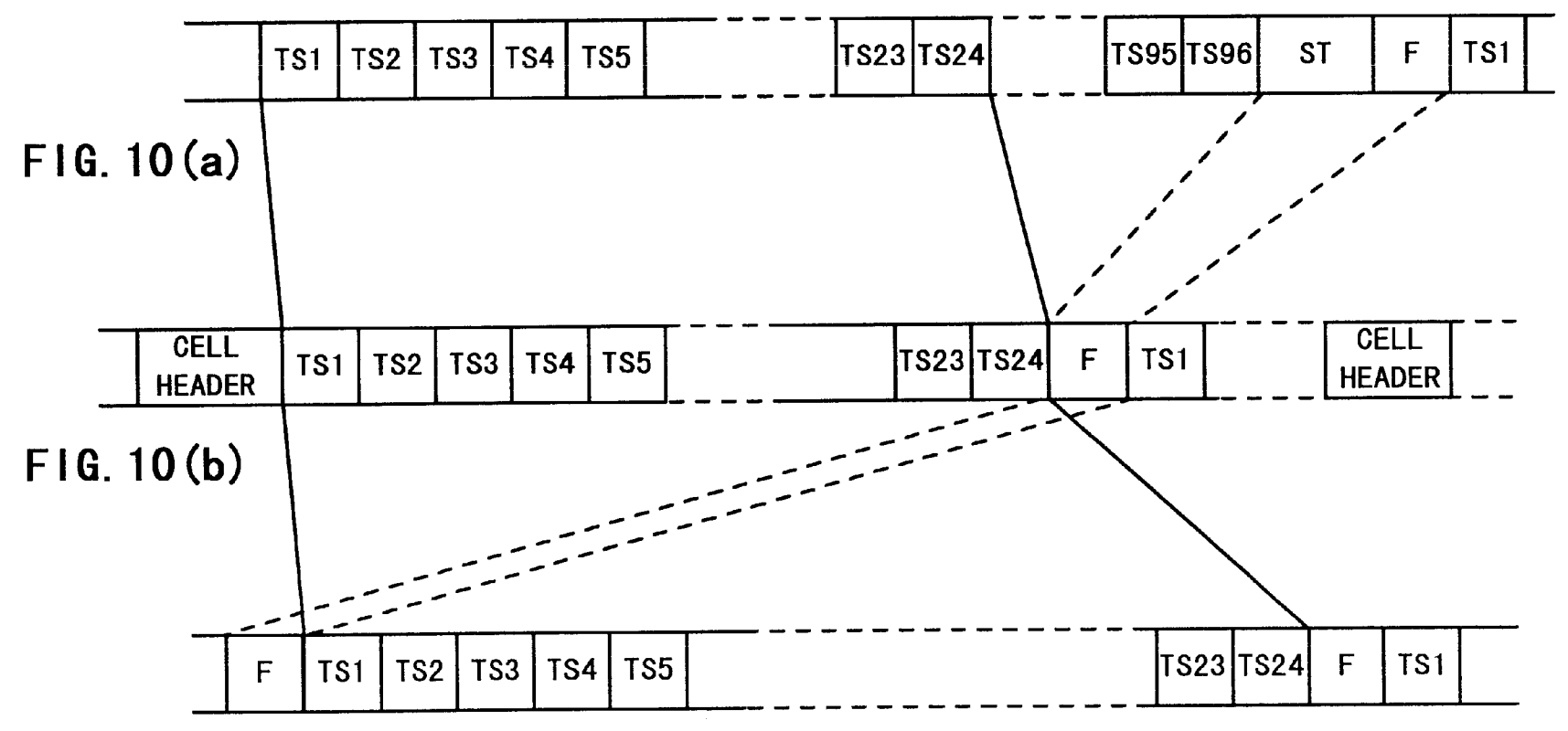

FIGS. 10(a)–10(c) are timing charts representing yet another example of cell conversion in the present invention.

In FIGS. 10(a)–10(c) is diagrammed a case wherein a 1.5M dedicated line is accommodated in the communication network diagrammed in FIG. 4, that is, a case wherein the T point interface for an existing physical line is a 1.5M interface.

In FIGS. 10(a)–10(c), are represented data on a line based on a U point interface, the speed whereof is configured from frames having the 6M speed of normal 96 time slots.

The data string diagrammed here in FIG. 10(a), after being synchronized by the frame synchronization unit 302, is output to the AAL1 processor 304 via the frame generator unit 303. In the AAL1 processor 304, these data are set in the payload portions of ATM cells having the virtual connection VC1, for example, in order from TS 1.

If cell assembly is performed here as described in conjunction with FIGS. 8(a)–8(c) or FIGS. 9(a)–9(c), the transmission band of the ATM network 20 will be wasted. Therefore, only the actually valid data, that is, in the data string diagrammed in FIG. 10(a), only the 24 time slots, ST frame, and F bit portions are extracted, and cell assembly is performed wherein conversion is done into 24+F bit 1.5M frames, that is, into frames corresponding to the T point interface.

Also, because the ways in which the alarm signals are transmitted with the U point interface and the T point interface differ, the ST frame+F bit information is converted (translated) into T point interface F bits by the frame conversion generator unit 309.

More specifically, in the cell conversion example diagrammed in FIGS. 10(a)–10(c), when the data string diagrammed in FIG. 10(a) up to the data TS 24 has been completely set in the ATM cell payload, the F bit information is set, so that, thereby, one frame of data will have been output in the ATM cell payload.

When the output for the ATM cell payload up to the F bit in the data string diagrammed in FIG. 10(a) is finished, cell assembly processing is repeated in the same manner from the data TS 1 at the head of the next frame. As a result, the cell diagrammed in FIG. 10(b) is completed. However, due to the relationship between the ATM cell payload length and the frame length, the following data TS 1 will not necessarily be carried immediately following the cell header.

The ATM cells completed in this manner are transmitted over the ATM network 20 and arrive at the ATM transmission equipment 30-2 or 30-3 at the terminal end.

The ATM transmission equipment 30-2 or 30-3 at the terminal assembles the arriving ATM cells into frames for an existing line in a procedure that is the reverse of that described in the foregoing. Specifically, the ATM transmission equipment 30-2 or 30-3 at the terminal end extracts data T 24 and F bit from the data TS 1 carried in the payload thereof at the ATM cells and transmits these together with a signal designating the data TS 1 to the frame generator unit 303.

The frame generator unit 303 outputs data, in order from TS 1, in conjunction with the timing of the frame synchronization unit 302, and assembles these data into frames for an existing line. By these operations the frame diagrammed in FIG. 10(c) is produced.

Furthermore, in the event that a fault of some kind occurs in the ATM network 20 so that cells cannot be transmitted, the fact that cells cannot be received by the AAL1 processor 304 will be detected either from the cell synchronization being off or from a receiving buffer anomaly. In such a case as that, in the controller 308, a frame is created which indicates an abnormal condition, and this frame is output to the frame generator unit 303 instead of the data output by the AAL1 processor 304.

Hence this embodiment is configured so that exchange comprising STM line interfaces and terminals comprising digital service units or STM network user network interfaces are connected by an ATM network using ATM transmission equipment comprising line interface means for connecting the STM lines, cell forming means for converting constant-bit-rate data strings on the STM lines to ATM cells, cell transmission control means for transmitting the ATM cells converted by the cell forming means to the ATM network using at least one virtual connection, and cell de-forming means for converting the ATM cells received from the ATM network into constant-bit-rate data strings for the STM lines. Thus the following benefits are realized.

(1) It is possible to efficiently accommodate existing exchange, line connecting devices, and terminals, etc.

(2) The costs associated with the installation of digital service units can be reduced, and 1.5M dedicated line services can be efficiently accommodated in ATM networks.

Figure 11:
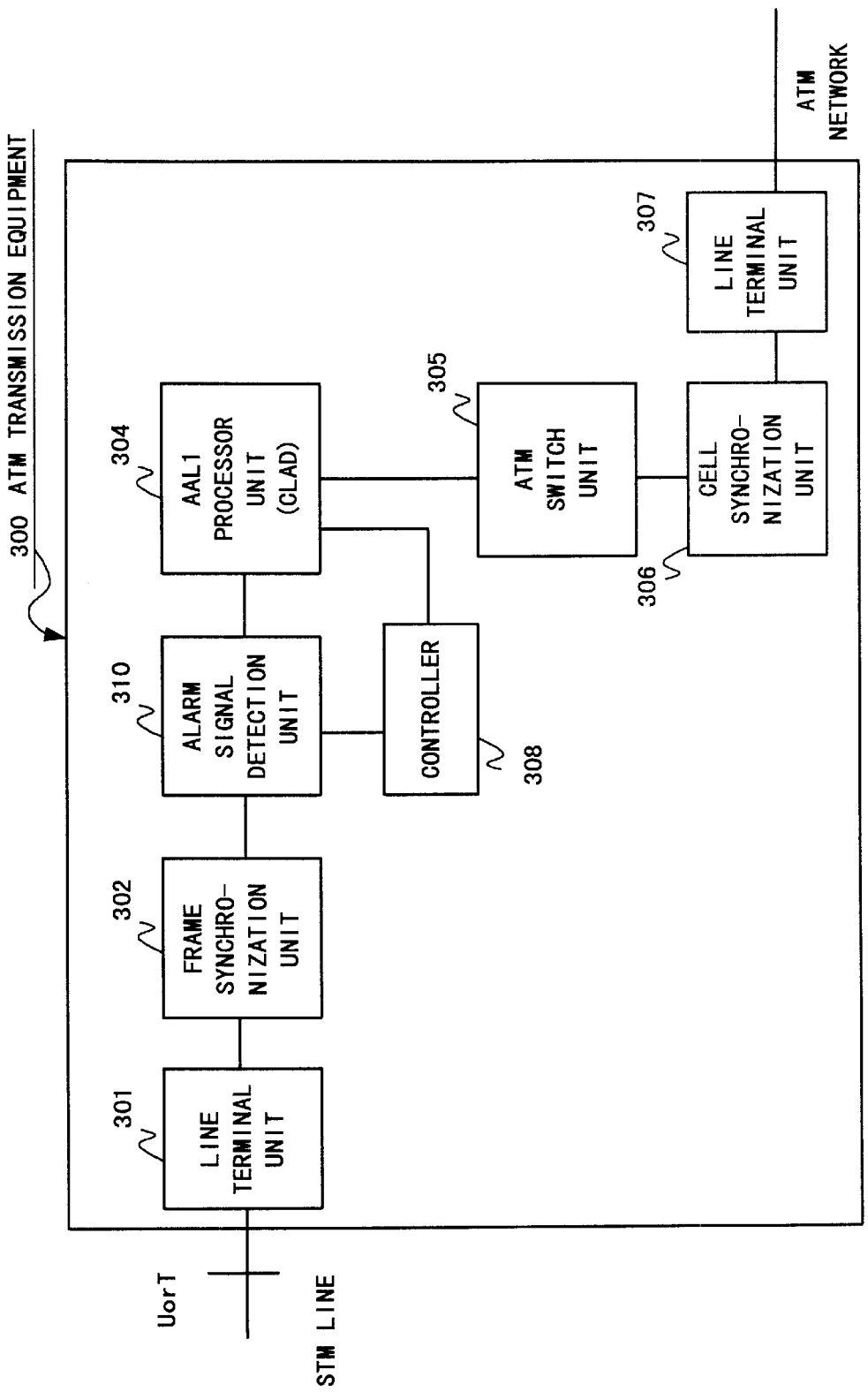
FIG. 11 is a block diagram of the functional configuration of ATM transmission equipment when the communication network configuration diagrammed in FIG. 7 is implemented.

FIG. 11 is a block diagram representing another functional configuration of the ATM transmission equipment 30-1, 30-2, and 30-3 as ATM transmission equipment 300, when the communication network configuration diagrammed in FIG. 7 is implemented. In FIG. 11, the same symbols are used as in FIG. 2 for components serving the same functions as in the ATM transmission equipment 30-1 diagrammed in FIG. 2.

In FIG. 11, this. ATM transmission equipment 300 comprises a line terminal unit 301, a frame synchronization unit 302, an alarm signal detection unit 310, an AAL1 processor (CLAD) 304, an ATM switching unit 305, a cell synchronization unit 306, a line terminal unit 307, and a controller 308.

The basic operation of this ATM transmission equipment 300 is next described. In this ATM transmission equipment 300, STM line data are passed through a line terminal unit 301 that looks to either a U point or a T point to the frame synchronization unit 302. The frame synchronization unit 302 checks the frame synchronization pattern and establishes frame synchronization. In this frame synchronization unit 302, processing is performed for detecting communication anomalies from data strings on STM lines. With the establishment of this frame synchronization, it becomes possible to differentiate between information channels and other frame bits, etc., from the data strings on the STM lines. At the alarm signal detection unit 310, the information channels and the other frame bits, etc., are differentiated, making it possible to extract maintenance and operational information (which are inserted in frame bits other than information channels).

Of the information pertaining to communication anomalies detected by the frame synchronization unit 302 and maintenance or operational information extracted or detected by the alarm signal detection unit 310, only that information which is necessary is replaced with alarm signals of a prescribed morphology made up thereby, and transmitted to the ATM network 20. At that time, at the AAL1 processor 304, the information channels in the data strings noted above and the alarm signals are merged, formed into cells using the same VC (virtual channel), and transmitted to the ATM network through the ATM switching unit 305, cell synchronization unit 306, and line terminal unit 307. Alternatively, the configuration may provide functions for forming the alarm signals noted above and the information channels noted above into cells, without merging them, using separate Vcs, and transmitting them to the ATM network 20 as described above.

What is described above are the processing operations when transferring data from the U point or T point in FIG. 11 to the ATM network 20. Processing operations which are the reverse thereof are performed, as described below, when transferring data from the ATM network 20 to the U point or T point side.

Specifically, data from the ATM network 20 pass through the line terminal unit 307, cell synchronization unit 306, and ATM switching unit 305, and are taken into the AAL1 processor 304. The AAL1 processor 304 performs cell disassembly on these data input. As to the cell disassembly processing when transferring data from the U point or T point described above to the ATM network 20, it is possible for alarm signals, such as noted above, to be contained within the data so subjected to cell disassembly. The alarm signals subjected to cell disassembly are either inserted into frame bits, etc., in STM frames having a prescribed morphology, as will be described subsequently with reference to FIG. 14, either in the alarm signal detection unit 310 or in the frame synchronization unit 302, or, alternatively, fault information corresponding to a fault detected in the ATM network 20 is inserted in place of a data string, and such are transmitted via the line terminal unit 302 to the STM line.

Taking as an example the case where the U point or the T point is a high-speed digital line, the specifics of the processing method for subjecting the information channels and alarm signals of the data strings noted above to cell assembly/disassembly are now described with reference to FIGS. 12(a)–12(c) and FIGS. 13(a)–13(c). In the interest of simplicity, in the following description, only that processing is described which is performed when making transfers from the U point toward the T point, that is, from the LT unit 10 toward the in-home unit (terminal) 12-1 or 12-2. Processing for the reverse direction (from the T point toward the U point), or processing performed when transferring between a U point and another U point, can readily be implemented by applying these same processing principles, wherefore no detailed description thereof is given.

Figure 12:
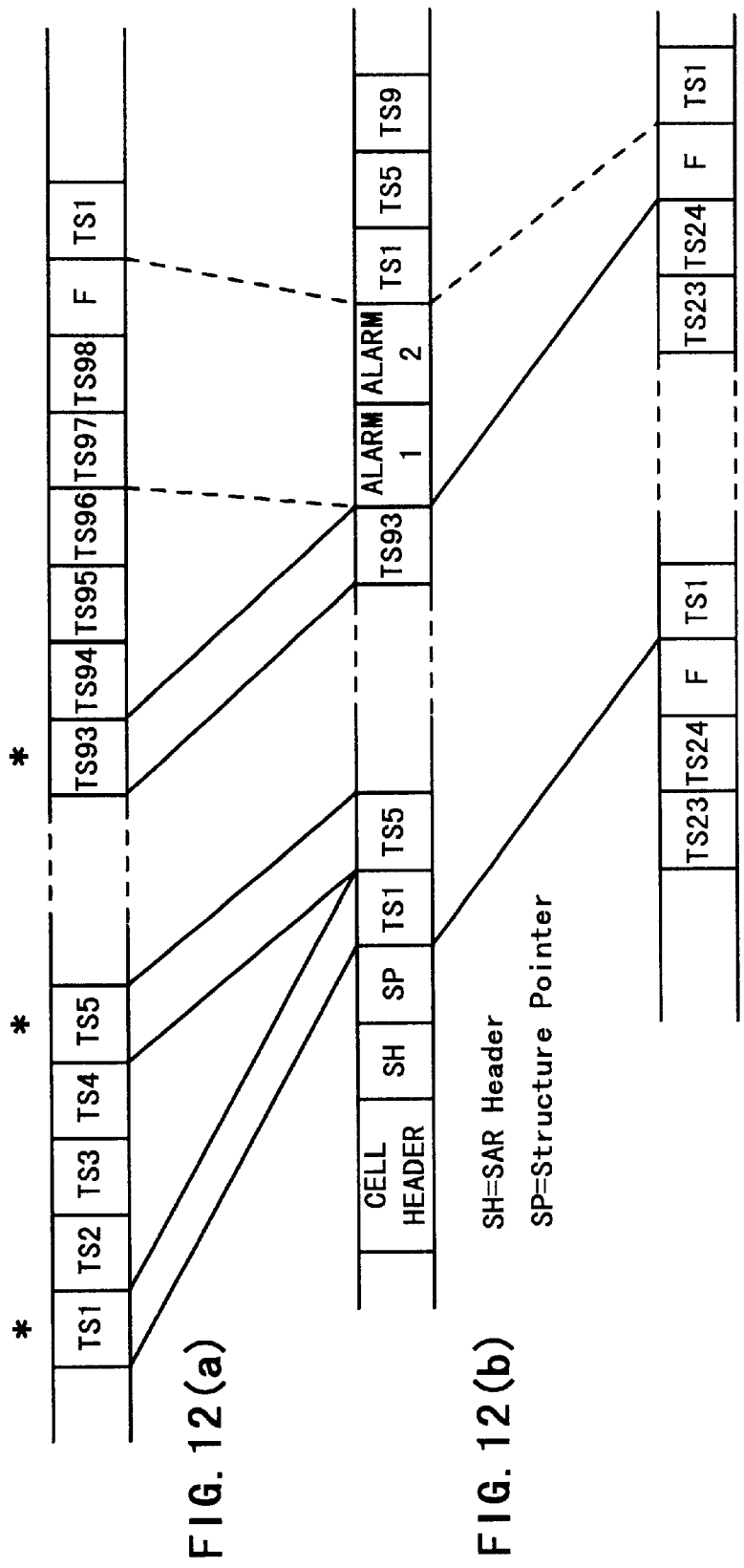
FIGS. 12(a)–12(c) are diagrams representing one example of cell conversion processing with ATM transmission equipment.

FIGS. 12(a)–12(c) represent the signal structure involved in cell assembly/disassembly when the T point on a high-speed digital line operates at 1.5M. In FIG. 12(a), a frame configuration is represented for the U point between the LT unit 10 and the ATM transmission equipment 30-1 in FIG. 7. In FIG. 12(c) is represented the frame configuration between the ATM transmission equipment 30-2 and the terminal 12-1. And in FIG. 12(b) is represented the cell structure when making transfers within the ATM network 20.

In the example illustrated here, in the U point frame configuration, the information channel transmitted toward the terminal 12-1 is only that portion (4 slot intervals) indicated by asterisks (* . . . *) in FIG. 12(a). A total of 24 Tss (time slots) in this portion are merged with two alarm information Tss and formed into cells with the same VC. The information formed into cells in this manner is transmitted within the ATM network 20 and, when passed to the T point on the terminal 12-1 side, is subjected to cell disassembly by the AAL1 processor 304 of the ATM transmission equipment 30-2, whereupon it is assembled into the frame configuration diagrammed in FIG. 12(c) and transferred to the terminal 12-1.

Figure 13:
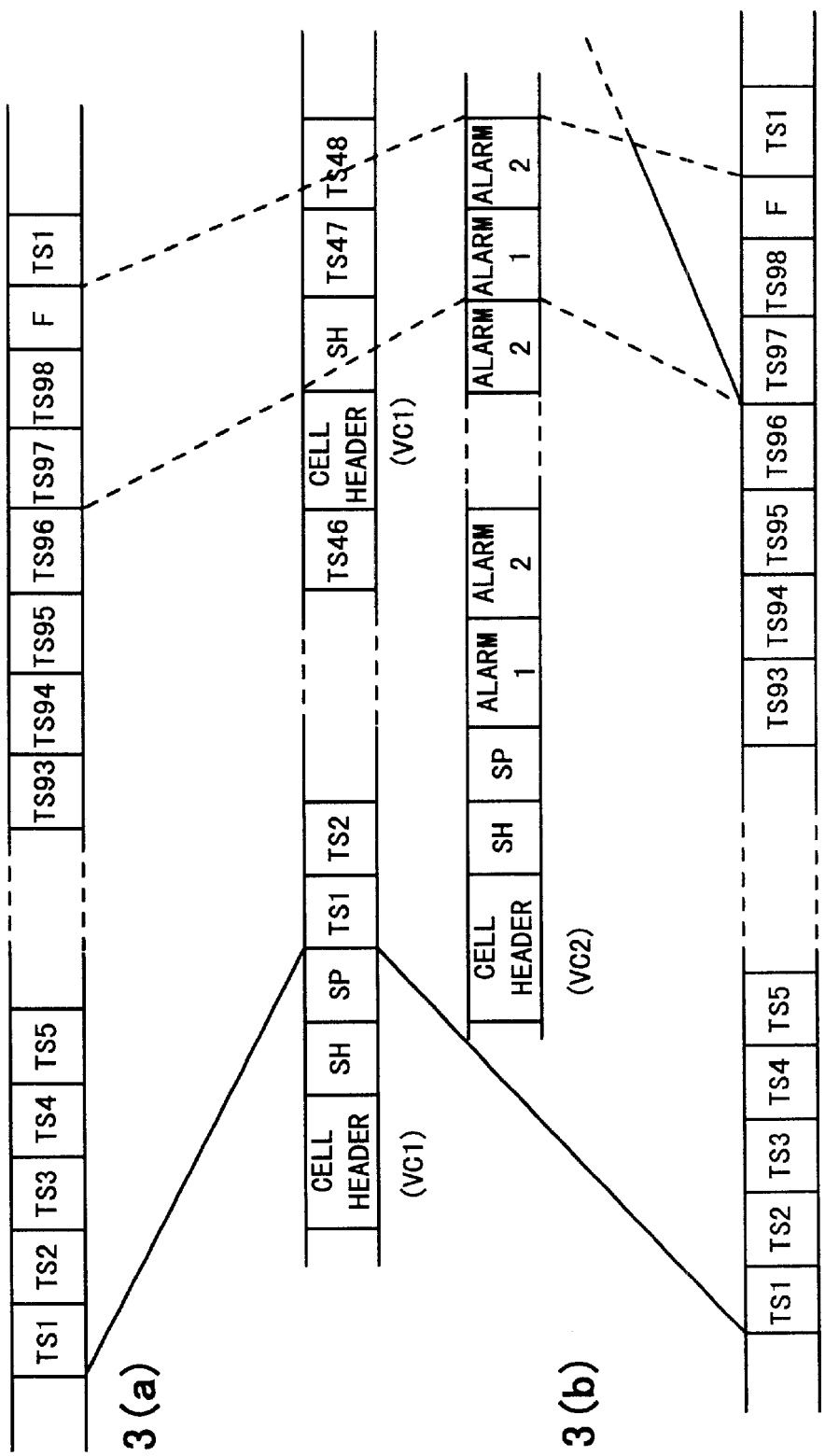
FIGS. 13(a)–13(c) are diagrams representing another example of cell conversion processing with ATM transmission equipment.

FIGS. 13(a)–13(c) represent the signal structure involved in cell assembly/disassembly when the T point on a high-speed digital line operates at 6.3M. In FIG. 12(a), a frame configuration is represented for the U point between the LT unit 10 and the ATM transmission equipment 30-1 in FIG. 7. In FIG. 12(c) is represented the frame configuration between the ATM transmission equipment 30-2 and terminal 12-1 or DSU 11-2 and terminal 12-2. Further, in FIG. 12(b) is represented the cell structure when making transfers within the ATM network 20.

In the example illustrated here, the 96 Tss of the information channel portion and the 2 Tss of the alarm signal portion are subjected to cell assembly/disassembly using separate Vcs, respectively. The information formed into cells is transmitted within the ATM network 20 and, when passed to the T point at terminal 12-1 or 12-2, is subjected to cell disassembly by the AAL1 processor 304 in the ATM transmission equipment 30-2 or 30-3, whereupon it is assembled into the frame configuration diagrammed in FIG. 4(c) and transferred to terminal 12-1 or 12-2. When performing the cell assembly described above, the alarm signal band is made 2 TS after giving consideration to the number of bits in other signals transmitted within the ATM network 20. In the example diagrammed in FIG. 17 and described below, for example, there are various signals (LP2 and Kx, etc.) other than the alarm signals noted above which must be transmitted within the ATM network 20, wherefore the band for the alarm signal noted above is set so as not to impair such transmissions.

Thus, in the communication network of this embodiment, when alarm signals are transmitted within the ATM network 20, two methods can be employed, namely the method of merging alarm signals and information channels, and performing cell assembly/disassembly using the same virtual connection, and the method of performing cell assembly/disassembly using different virtual connections for the alarm signals and the information channels. When the former network configuration is implemented, no means for frame conversion to STM line data are necessary, thus providing the benefits of hardware simplification and equipment cost reduction.

Figure 14:
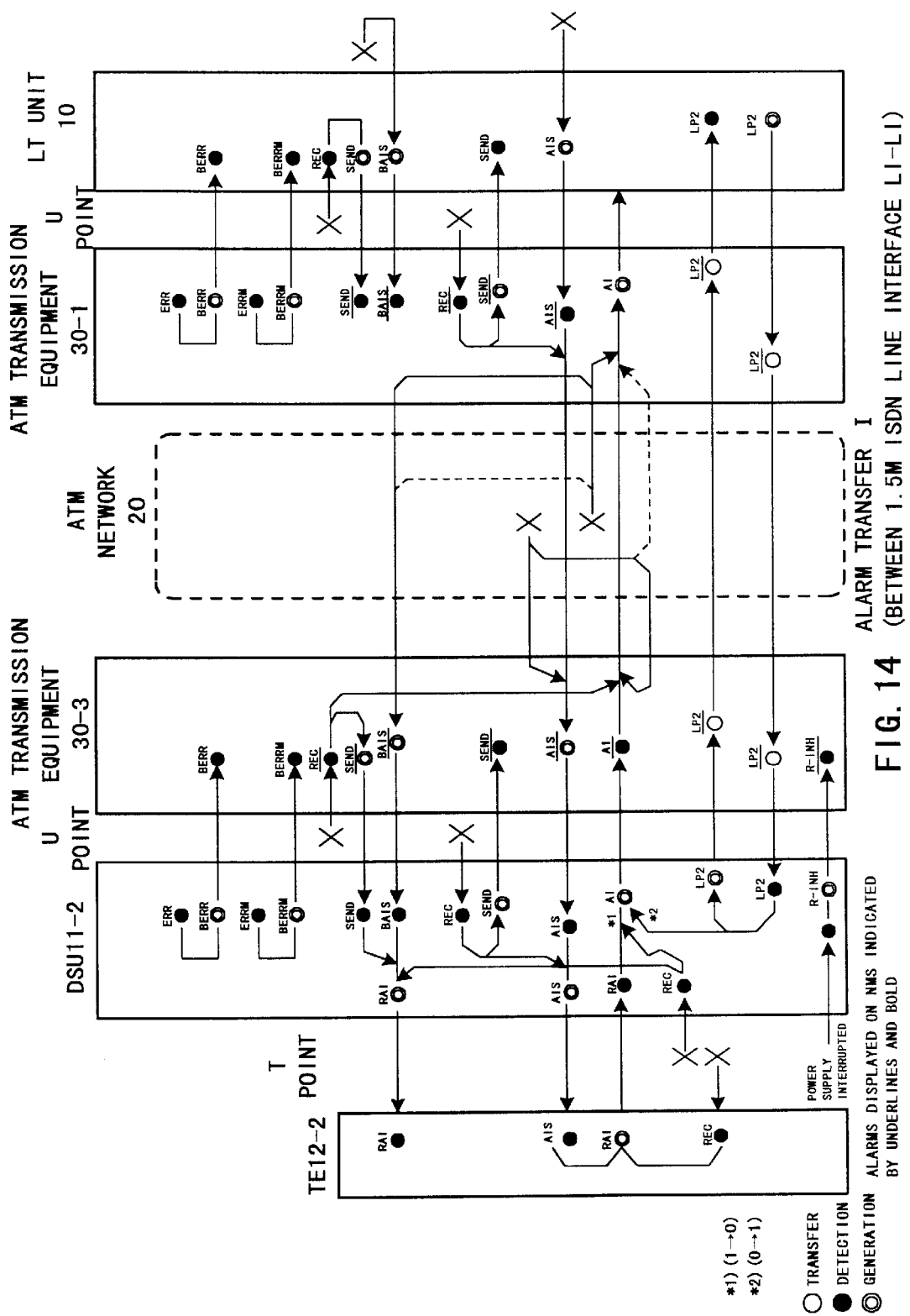
FIG. 14 is a diagram representing an example of alarm information transfer between two U points in an ATM network accommodating ISDN lines.

Specific examples of the alarm signals transmitted within the ATM network 20 of the communication network of this embodiment are described next, associating points in the network with different types of lines. First, in FIG. 14 is diagrammed an example of how alarm signals are transferred between two U points within the ATM network 20 in this communication network, specifically in the case where the U points are 1.5M ISDN lines. In this diagram, the places in the ATM network 20 marked by an X represent places where faults have occurred in the ATM network 20.

In the transfer of alarm signals in this case, the ATM transmission equipment 30-1 detects an alarm signal such as the REC at the U point on the right side in FIG. 14, from the frame configuration on the STM line diagrammed in FIG. 12(a), for example. The REC information detected is merged with AIS information and transmitted to the ATM network 20. In the opposing ATM transmission equipment 30-3, these data are merged with fault information inside the ATM network 20, and the AIS information is placed in the frame configuration diagrammed in FIG. 12(c), for example, and transmitted to the opposing DSU 11-2.

Faults in the ATM network 20 are detected either by anomalies in the cell disassembly means in the AAL1 processor 304 in FIG. 11 or by data anomalies in a channel that is transmitting an alarm signal. In the alarm detection unit 310 in FIG. 11, for example, means are provided for detecting data anomalies and such are dealt with by those detection means. In terms of a concrete example, such detection means can be implemented, for example, by providing CRC or other protection means for the alarm signals during cell assembly, using a functional configuration that, during cell disassembly, checks syndromes in data subjected to cell disassembly. When bit errors in the transmission line, etc., are taken into consideration, however, it is better to provide multiple-stage protection means to make such checks and then to regard these as faults in the ATM network 20.

FIG. 14 represents an example of alarm signal transfer between two U points in FIG. 7, but the transfer of alarm signals can be done in the same way under other conditions.

Figure 15:
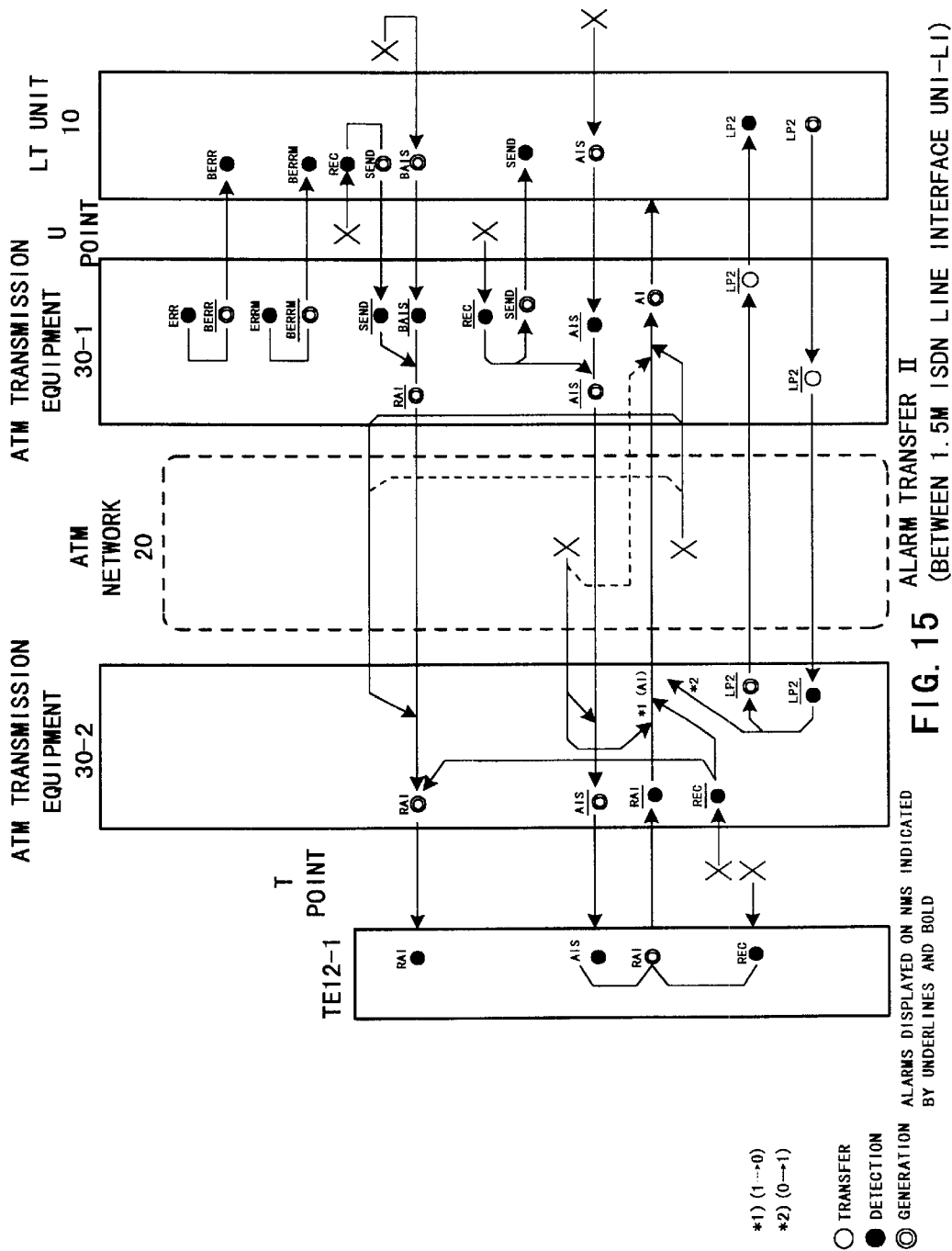
FIG. 15 is a diagram representing an example of alarm information transfer between a U point and a T point in an ATM network accommodating ISDN lines.

FIG. 15 diagrams an example of how alarm signals are transferred between.a U point and a T point in the ATM network 20 in this communication network, specifically in the case where the U point and the T point are 1.5M ISDN lines.

Figure 16:
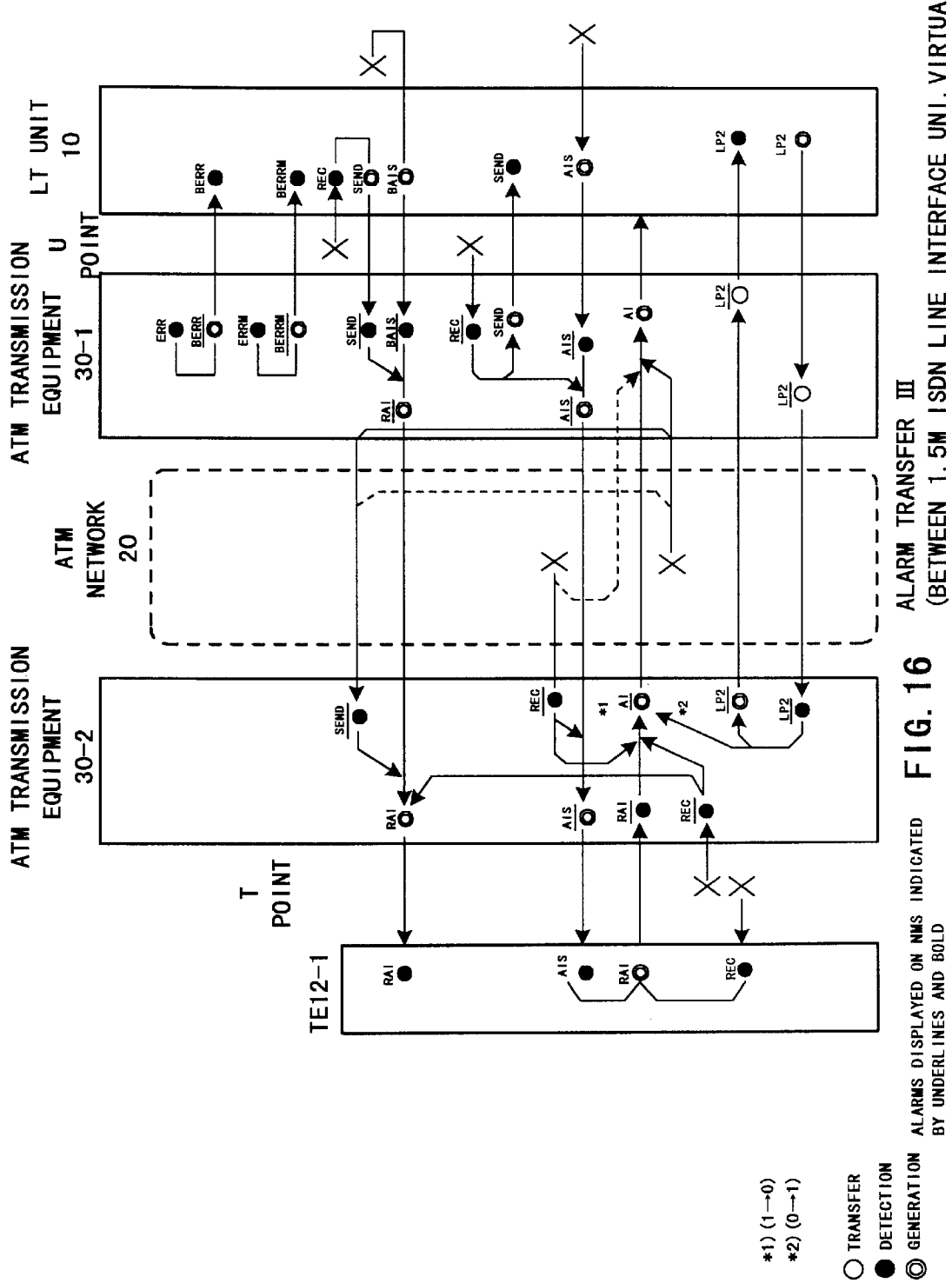
FIG. 16 is a diagram representing an example of alarm information transfer between a U point and a virtual U point in an ATM network accommodating ISDN lines.

FIG. 16 diagrams an example of how alarm signals are transferred between a U point and a virtual U point in the ATM network 20 in this communication network, specifically in the case where the U point and the virtual U point are 1.5M ISDN lines. In this example, DSU functions are virtualized in the ATM transmission equipment 30-2, and information pertaining to maintenance and operations, etc., at the U point is displayed virtually.

Figure 17:
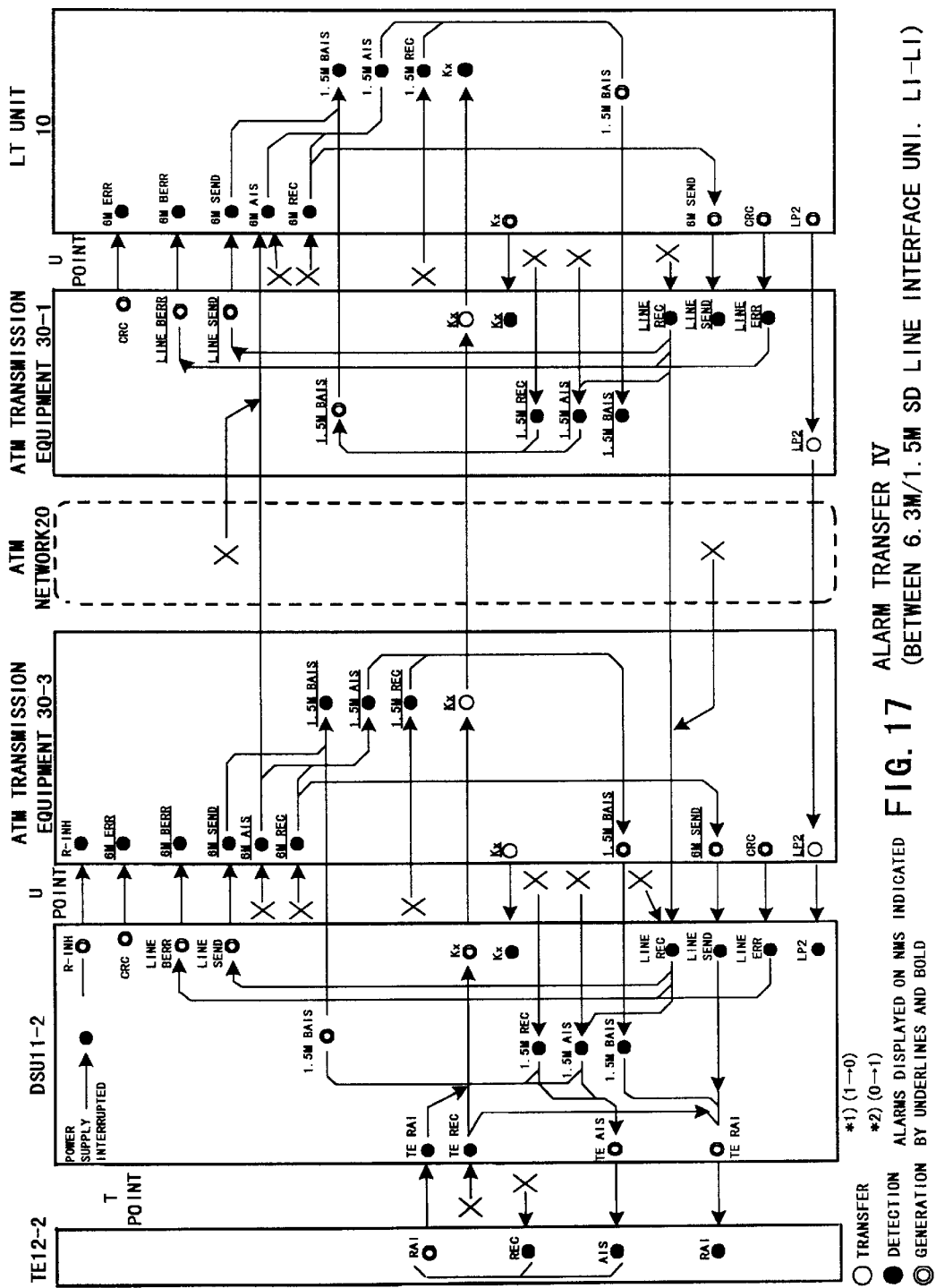
FIG. 17 is a diagram representing an example of alarm information transfer between two U points in an ATM network accommodating high-speed digital lines.
Figure 18:
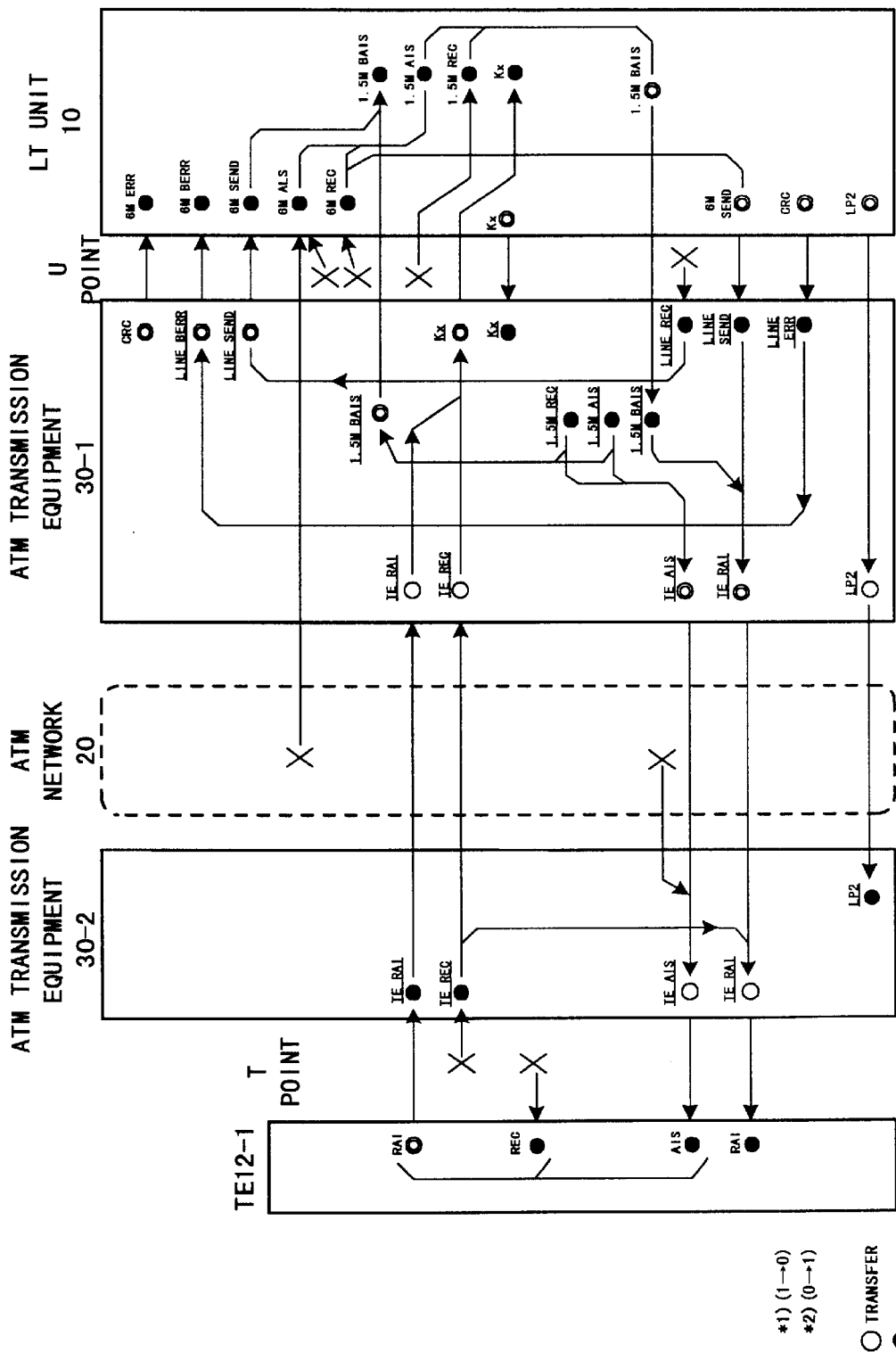
FIG. 18 is a diagram representing an example of alarm information transfer between a U point and a T point in an ATM network accommodating high-speed digital lines.
Figure 19:
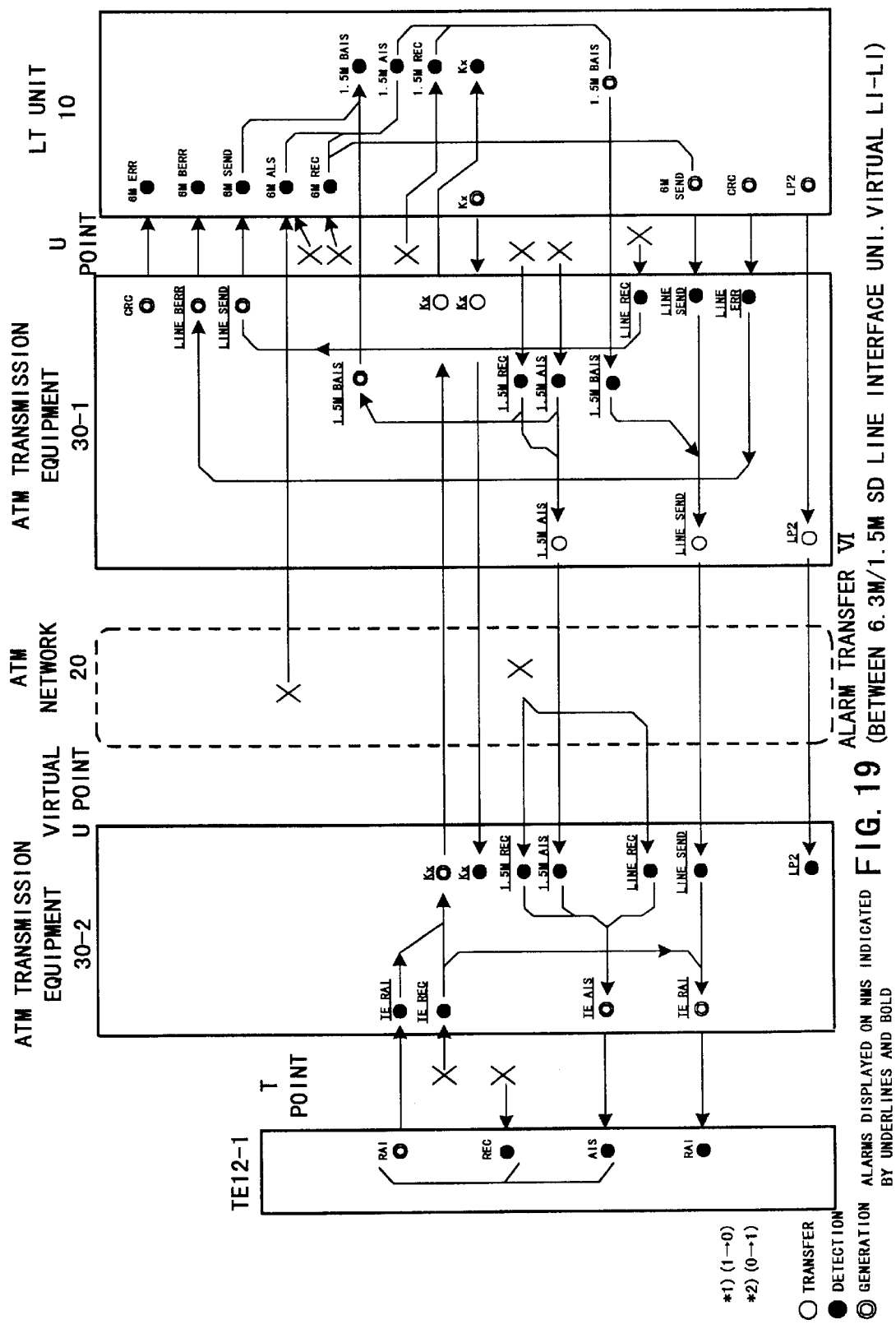
FIG. 19 is a diagram representing an example of alarm information transfer between a U point and a virtual U point in an ATM network accommodating high-speed digital lines.

FIG. 17 diagrams an example of how alarm signals are transferred between two U points in the ATM network 20 in this communication network, specifically in the case where the U points are high-speed digital lines. FIG. 18, similarly, diagrams an example of how alarm signals are transferred between a U point and a T point in the ATM network 20 in this communication network, specifically in the case where the U point and the T point are high-speed digital lines. FIG. 19 diagrams an example of how alarm signals are transferred between a U point and a virtual U point in the ATM network 20 in this communication network, specifically when the U point and the virtual U point are high-speed digital lines. In this example, as in the example represented in FIG. 16, functions of DSU 11-2 are virtualized in the ATM transmission equipment 30-2, and information pertaining to maintenance and operations, etc., at the U point is displayed virtually.

Thus, when this embodiment is implemented, the extraction of maintenance or operational information or the detection of communication anomalies is performed from data strings on STM lines, by means for interfacing with the STM lines, whereupon, based on these detection or extraction results, only necessary information is replaced with alarm signals and transmitted within the ATM network, wherefore a benefit is realized in that, as compared to the case where all signals on the STM lines are transmitted, the transmission band within the ATM network can be reduced, and network resources can be used more effectively.

Figure 20:
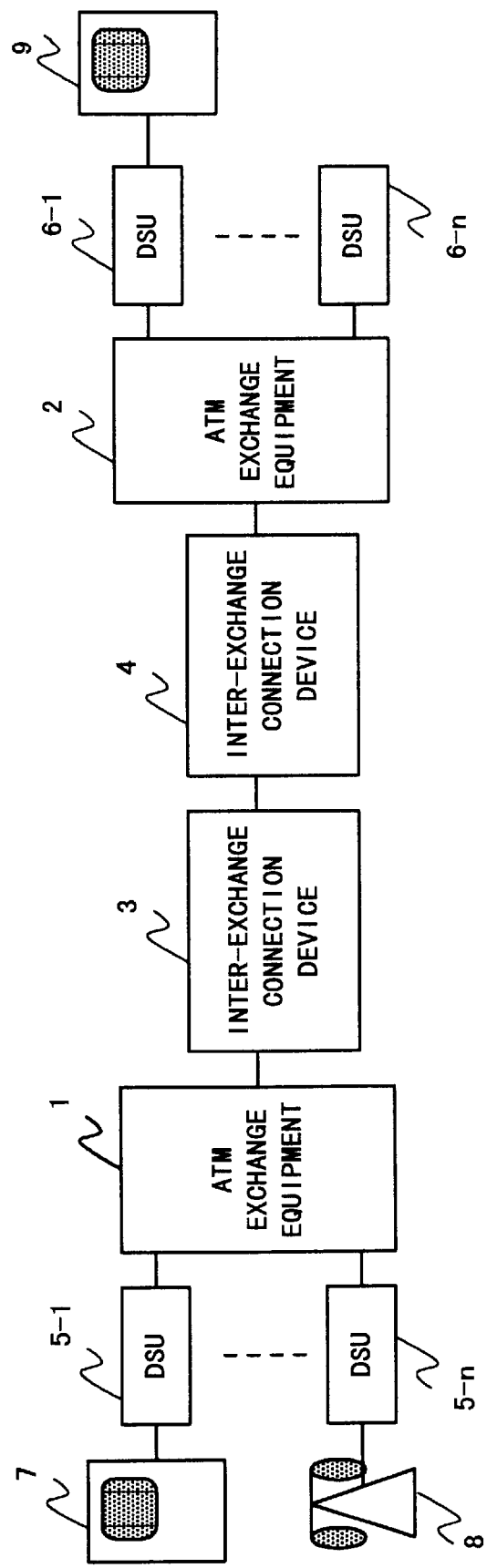
FIG. 20 is a configurational diagram of one embodiment of an ATM communication system wherein the present invention is applied.

FIG. 20 is a configurational diagram representing another embodiment of a communication system wherein the present invention is employed. The example diagrammed here represents the simplest configuration wherein ATM exchange 1 and 2 are connected by ATM cross-connectors (VPHs) or other inter-exchange-equipment connecting devices 3 and 4.

In each set of ATM exchange 1 and 2, multiple DSUs, 5-1 to 5-n and 6-1 to 6-n, are connected, to which DSUs 5-1 to 5-n and 6-1 to 6-n are connected terminal devices, namely computers 7 and 9 and telephone device 8, thereby facilitating the exchange of text data, video data, and audio data, etc.

Figure 21:
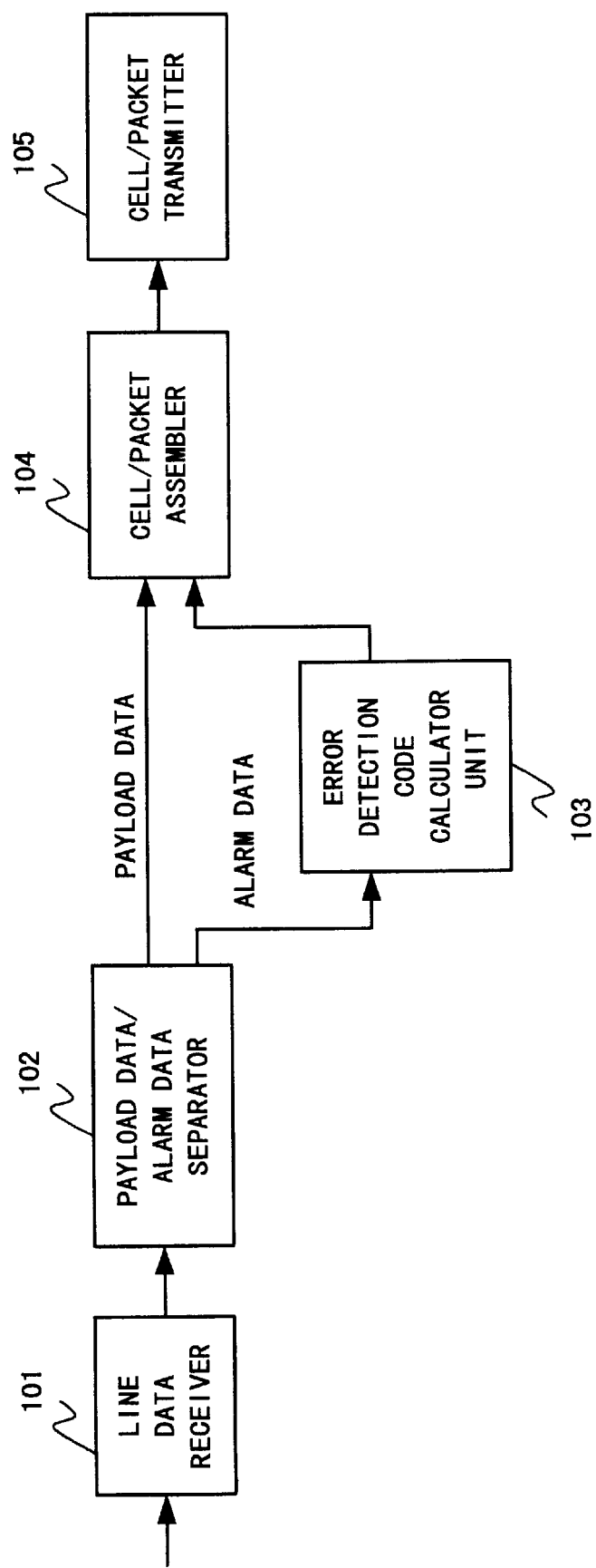
FIG. 21 is a block configurational diagram of one embodiment of a detailed configuration of the transmission unit in a line interface provided in the ATM exchange diagrammed in FIG. 20.

FIG. 21 is a block diagram of one embodiment of the detailed configuration of the transmission unit in the line interface units provided in the ATM exchange 1 and 2, comprising a line data receiver unit 101, payload/alarm data separator 102, error detection code calculation unit 103, cell/packet assembler 104, and cell/packet transmission unit 105. Data are input from the computer 7, etc., via a DSU to the line data receiver unit 101.

Figure 22:
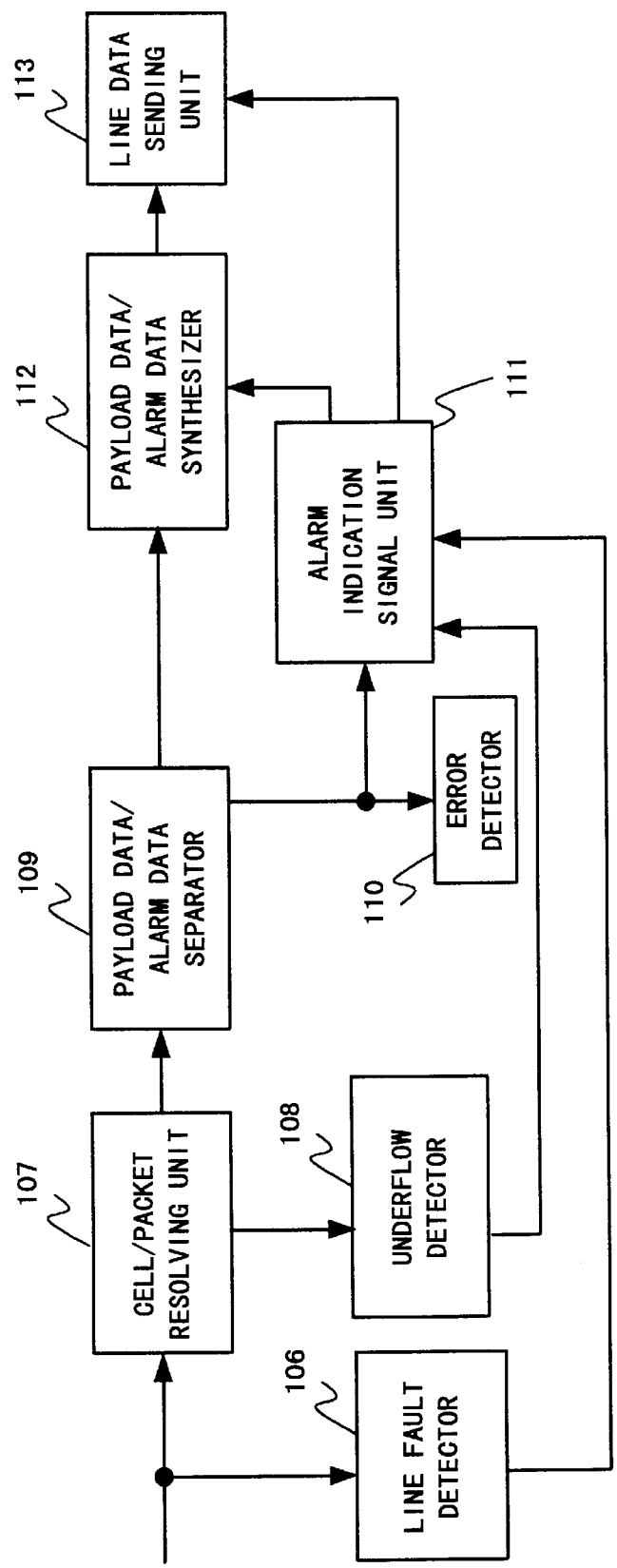
FIG. 22 is a block configurational diagram of one embodiment of a detailed configuration of the receiver unit in a line interface provided in the ATM exchange diagrammed in FIG. 20.

FIG. 22 is a block configurational diagram of one embodiment of a detailed configuration of the receiver unit in a line interface provided in the ATM exchange diagrammed in FIG. 20. This receiver unit comprises a line fault detection unit 106, cell/packet resolving unit 107, payload data/alarm data separator 109, error detection unit 110, alarm indication signal (AIS) output unit 111, payload data/alarm data synthesizer 112, and line data transmission unit 113.

In such a configuration as this, assuming the case where the ATM exchange 1 is the transmitting-end equipment and the ATM exchange 2 is the receiving-end equipment, the line interface unit in the ATM exchange 1 at the transmitting end receives data input from the DSU 5-1, for example, by the line data receiver unit 101, and inputs these data to the payload data/alarm data separator 102. The payload data/alarm data separator 102 separates the input data into payload portions and alarm data portions.

By alarm data here are meant information indicating a line fault such as a line break or synchronization error, being information that is detected at the receiving end of a line.

The payload data/alarm data separator 102 inputs the separated payload data to the cell/packet assembler 104 and the alarm data to the error detection code calculation unit 103. The error detection code calculation unit 103 adds error detection codes to the input alarm data portions and inputs these to the cell/packet assembler 104. The cell/packet assembler 104 assembles the alarm data portions with attached error detection codes and the payload portions separated by the payload data/alarm data separator 102 into single cells/packets and transmits these from the cell/packet transmission unit 105 to the ATM exchange 2. In this case, cell assembly follows the ITU- I.363.1 standard.

Figure 23:
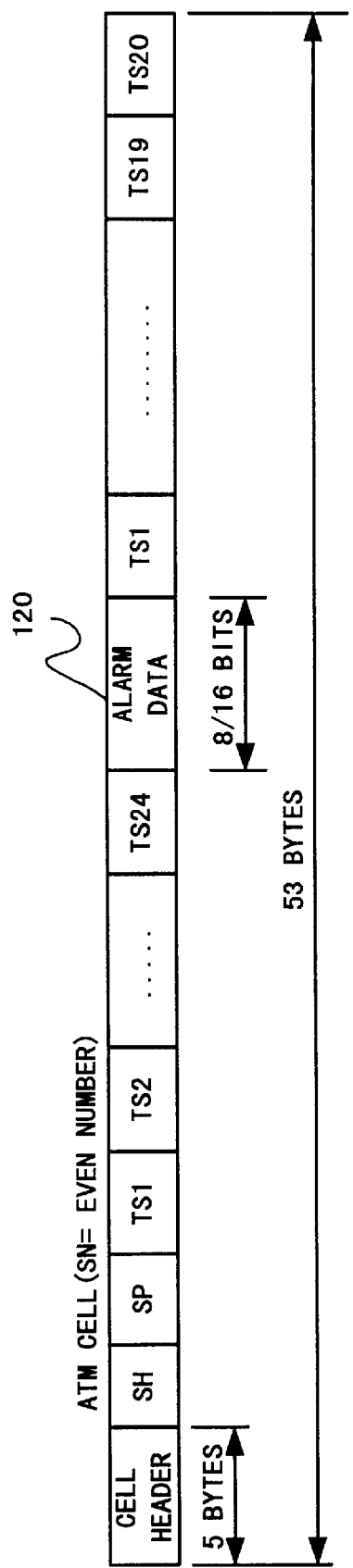
FIGS. 23(a)–23(b) are mapping diagrams for a case where alarm data are transmitted with one connection.
Figure 23:
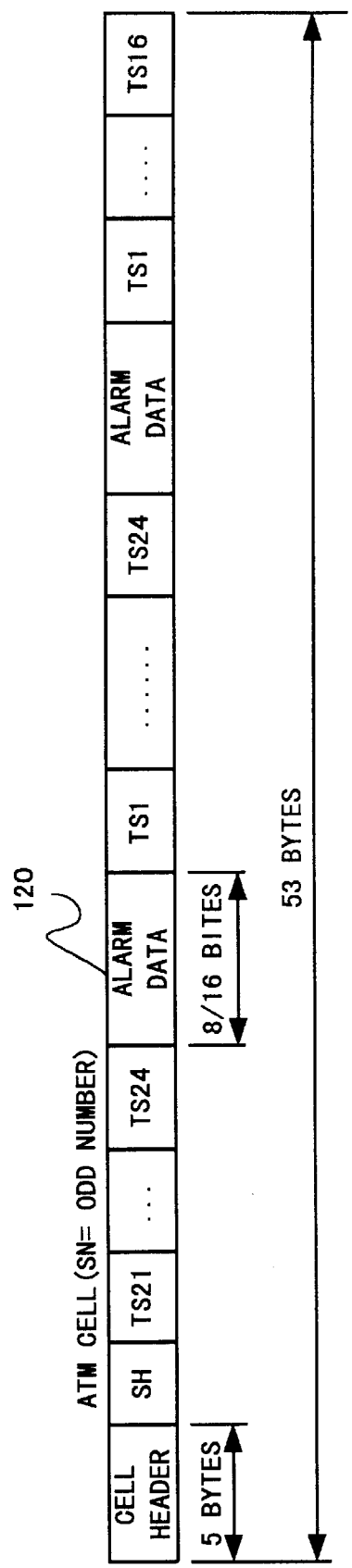
Figure 24A:
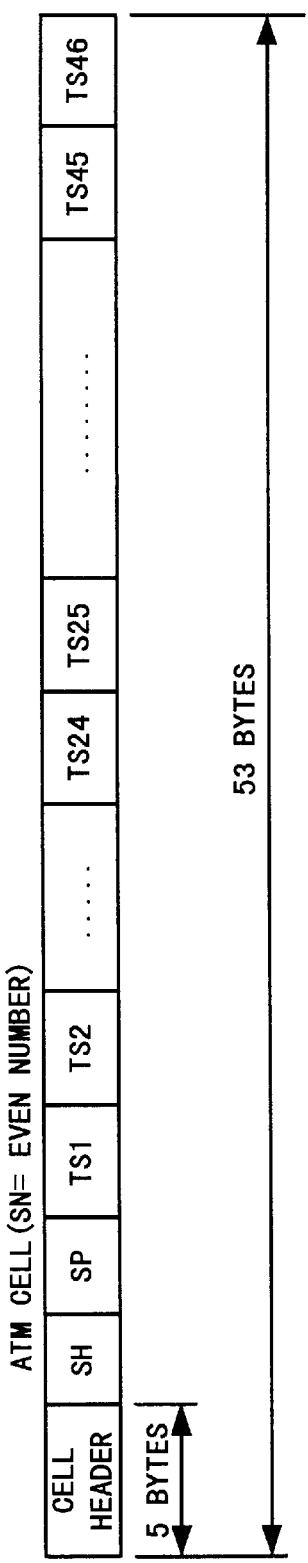
FIGS. 24(a)–24(c) are payload data mapping diagram for a case where alarm data and payload data are transmitted with separate connections.
Figure 24B:
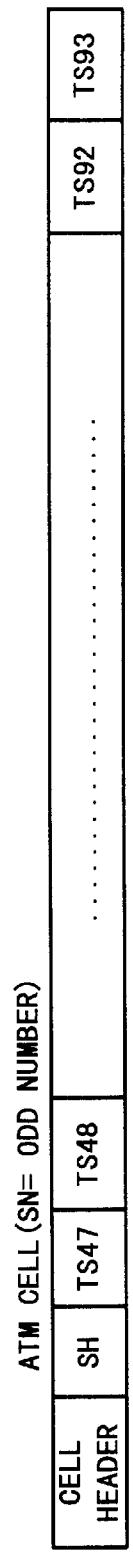
Figure 24C:
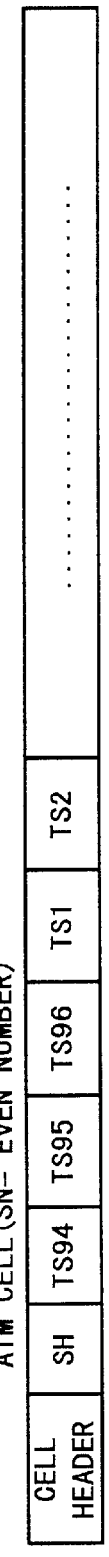
Figures 25A, 25B:
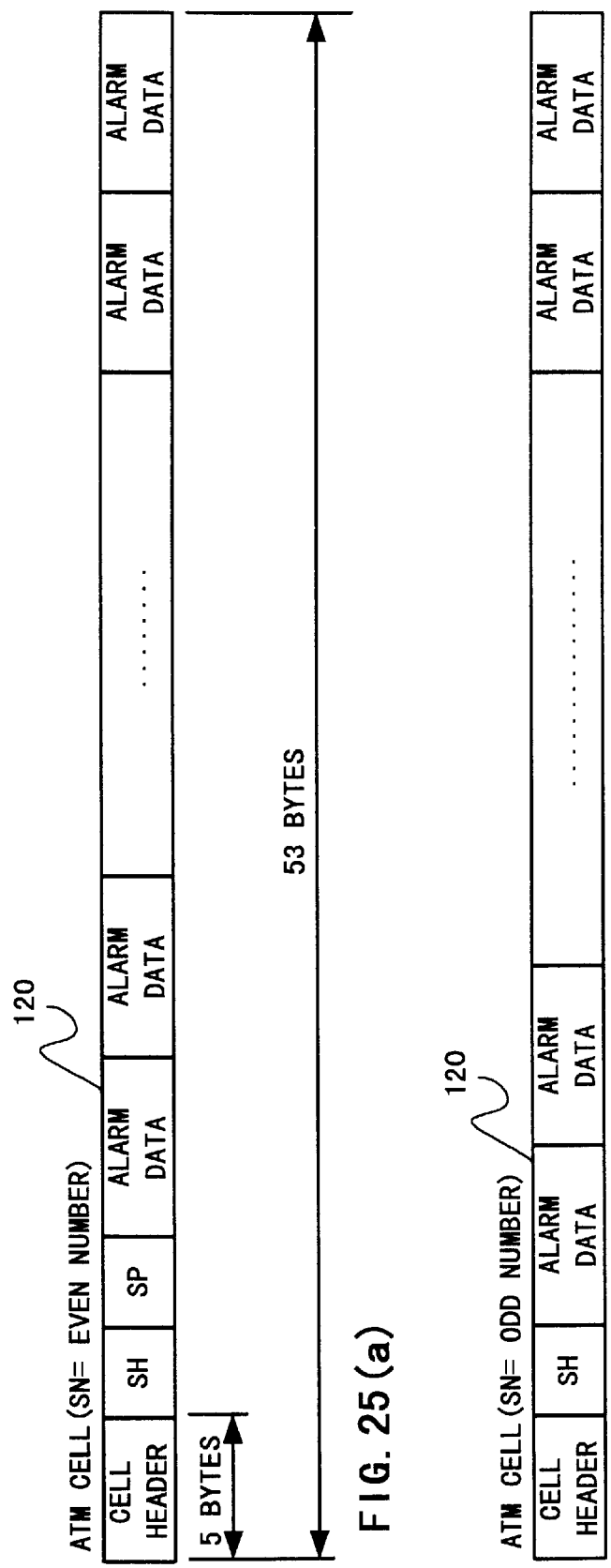
FIGS. 25(a)–25(b) are alarm data mapping diagrams for a case where alarm data and payload data are transmitted with separate connections.

As to the way the alarm data are transmitted, these data may be transmitted with one connection, as diagrammed in FIGS. 23(a) and 23(b), or they may be transmitted with separate connections, as diagrammed in FIGS. 24(a)–24(c) and FIGS. 25(a)–25(b). In FIG. 23–25, SN is a sequence number, SH is an SAR header byte, SP is a structure pointer byte, and TS 1–TS 93 are the 8-byte data configuring the payload. The alarm data 120 is configured either as 8-byte or 16-byte data.

The ATM exchange 2 at the receiving end, on the other hand, receives data from the transmitting end with the ATM cell line fault detection unit 106 and the cell/packet resolving unit 107. The line fault detection unit 106 detects line faults such as line breaks and frame synchronization errors at the entrance to the network, and reports these to the alarm indication signal output unit 111.

The cell/packet resolving unit 107, meanwhile, resolves the received cells and inputs to the payload data/alarm data separator 109. The physical line/alarm data separator 109 separates the received cells into payload portions and alarm data portions and inputs the separated alarm data portions to the error detection unit 110. The error detection unit 110 detects whether or not there are errors in the alarm data portions by the error detection codes added to those alarm data portions and inputs the results of this detection to the alarm indication signal output unit 111.

An underflow detection unit 108, meanwhile, detects underflows in a receiving buffer that receives the cells/packets and, when an underflow is detected that is sustained longer than a preset time interval, reports that fact to the alarm indication signal output unit 111.

The alarm indication signal output unit 111, when there are no errors in the alarm data portions, according to the detection results of the error detection unit 110, assembles the received payload portions and alarm data portions into fixed-length data in the same transmitting units in the payload data/alarm data synthesizer 112 and these data are transmitted from the line data transmission unit 113 to a line interface at the receiving end.

If, however, there is an error in an alarm data portion, it is determined that a line fault has occurred, and line-break alarm data are transmitted from the line data transmission unit 113 to the line interface at the receiving end.

The alarm indication signal output unit 111, even when an underflow has been detected by the underflow detection unit 108 that extends beyond the preset time interval, transmits the line-break alarm data from the line data transmission unit 113 to the line interface at the receiving end. Furthermore, even in cases where the line fault detection unit 106 detects a line fault such as a line break or frame synchronization error at the entrance to the network, line-break alarm data are transmitted from the line data transmission unit 113 to the line interface at the receiving end.

Thus error detection codes are added to the alarm data and transmitted to the receiving end, the presence or absence of errors in the alarm data is detected by those error detection codes at the receiving end, and, when there is an error, line-break alarm data are transmitted to the line interface at the receiving end. There is therefore no need to provide a protocol for mutually verifying the line condition at the transmitting-end equipment and at the receiving-end equipment, protocols can be prevented from becoming complex, and line faults can be easily detected.

As configured here, when there is an error in the alarm data, line-break alarm data are output immediately, but a configuration is also permissible wherewith line-break alarm data are output when an error continues at or above a preset value, and only the last alarm data containing no error are output when the preset value is not reached.

Figure 26:
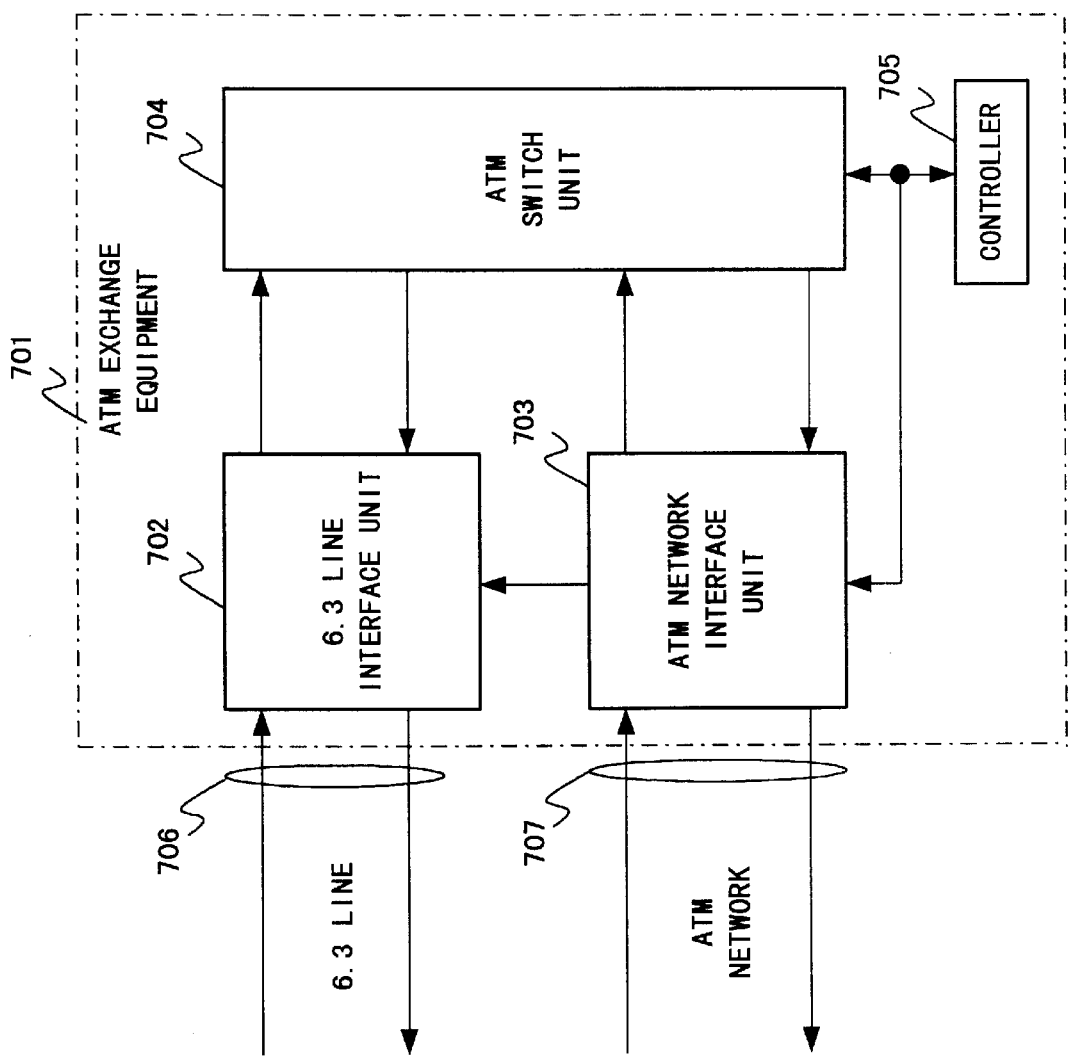
FIG. 26 is a configurational diagram of ATM exchange representing yet another embodiment of the present invention.

FIG. 26 is a configurational block diagram of ATM exchange representing yet another embodiment of the present invention. The ATM exchange 701 in this embodiment comprises an existing 6.3M line interface unit 702 that accommodates an existing line 706 at 6.3 Mbps, an ATM network interface unit 703 that accommodates an ATM network 707, an ATM switching unit 704 for performing ATM cell routing, and a controller 705 for performing overall control.

Video or text data input to the existing 6.3M line interface unit 702 are subjected to line transmission frame termination by that existing 6.3M line interface unit 703, converted to 53-byte ATM cells, and transmitted to the ATM switching unit 704. The ATM switching unit 704 transfers data to the ATM network interface unit 703 preset by the headers of the input ATM cells.

The ATM cells input to the ATM network interface unit 703 are transferred to the opposing ATM exchange via the ATM network 707 and are there routed to an existing 6.3M line at the opposing end.

Figure 27:
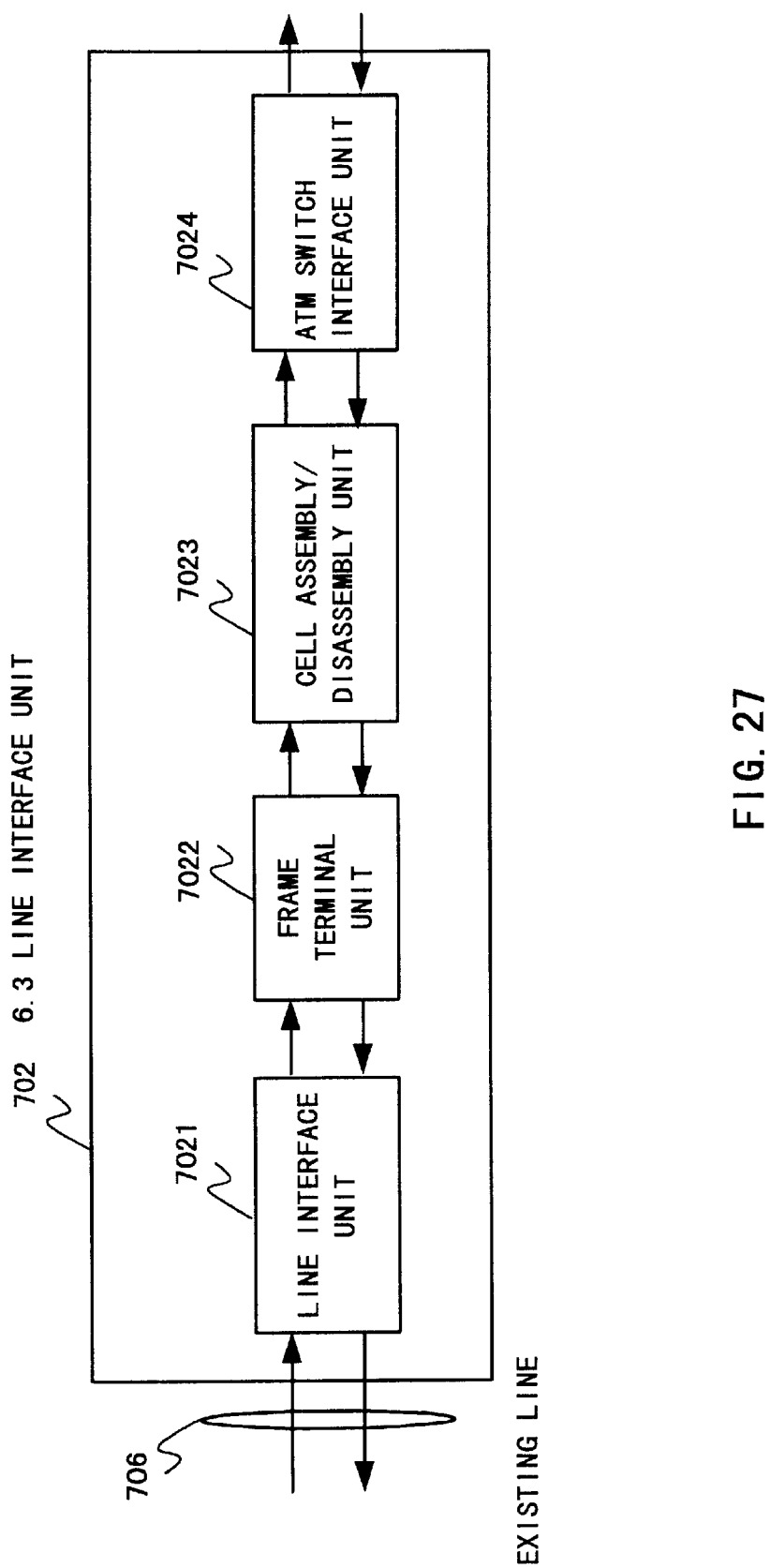
FIG. 27 is a detailed configurational diagram of the existing 6.3M line interface unit in FIG. 26.

In FIG. 27 is diagrammed the detailed configuration of the existing 6.3M line interface unit 703. The existing 6.3M line interface unit 702 diagrammed here comprises a line interface unit 7021, a frame terminal unit 7022, an cell assembly/disassembly unit 7023, and an ATM switching interface unit 7024.

Data input from the existing 6.3M line 706 are subjected to optical/electrical conversion by the line interface unit 7021, converted to transmission codes, and frame-synchronized by frame synchronization bits in the data flow assigned in the 6.3M format by the next frame terminal unit 7022, whereupon data are extracted from the transmission frames. The extracted data are converted by the assembly/disassembly unit 7023 into 53-byte ATM cells to which are added 5-byte cell headers containing a preset VPI (virtual path number) and VCI (virtual channel number). The ATM cells are input to the ATM switching unit 704 via the ATM switching interface unit 7024.

Figure 28:
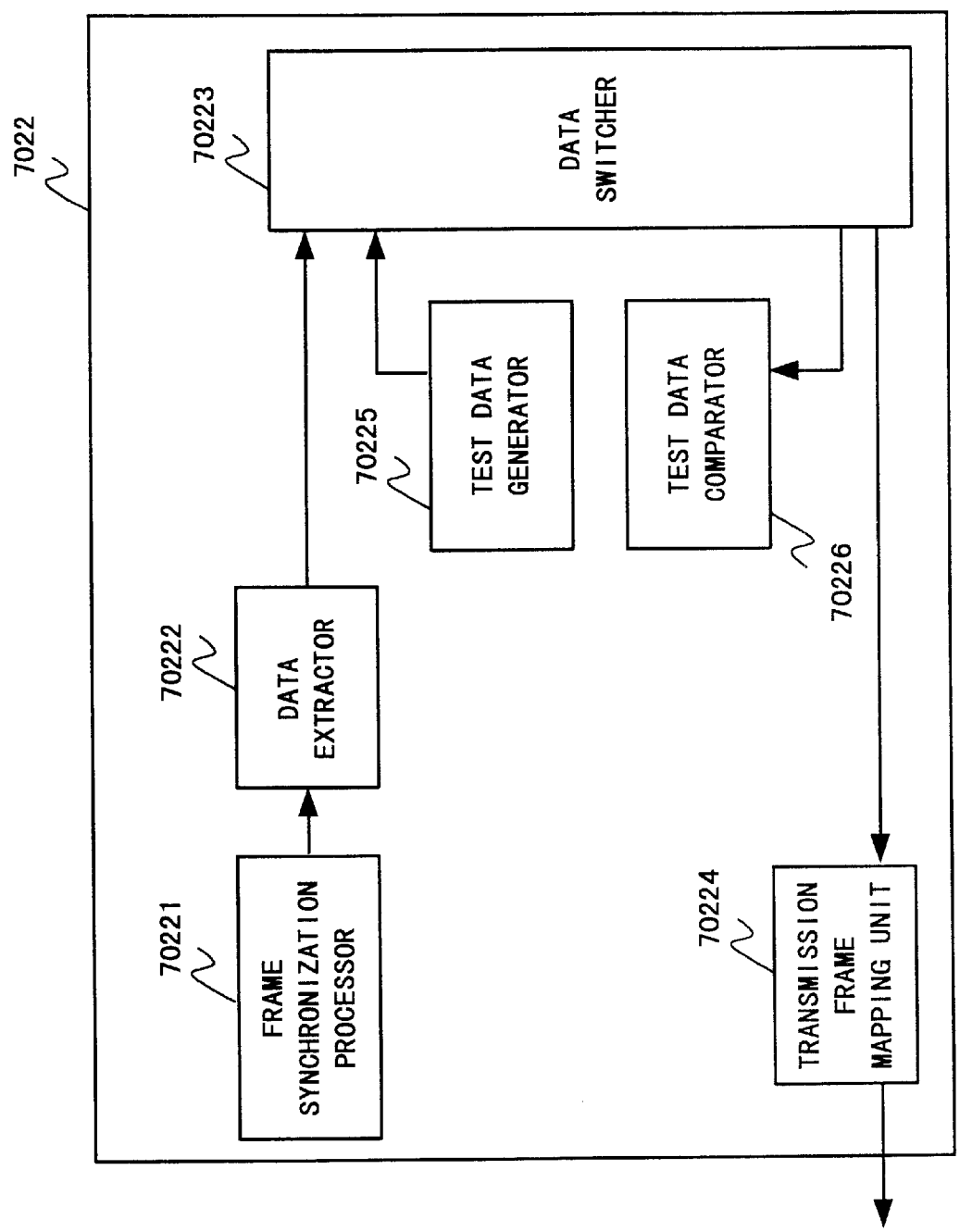
FIG. 28 is a detailed configurational diagram of the frame terminal unit in FIG. 27.

FIG. 28 is a block diagram showing the detailed configuration of the frame terminal unit 7022. The frame terminal unit 7022 diagrammed comprises a frame synchronization processor 70221, a data extractor 70222, a data switcher 70223, a transmission frame mapping unit 70224, a test data generator 70225, and a test data comparator 70226. The frame terminal unit 7022 is configured so that, either prior to the start of operations on the ATM communication system or when a fault occurs during operation, test data are generated by the test data generator 70225 and transmitted toward a line terminal unit in the opposing line interface unit via an established line, whereupon the test data transmitted and the test data that return via the, opposing line terminal unit are compared by the test data comparator 70226, and the presence or absence of anomalies in the line going to the line terminal unit in the opposing line interface unit is detected according to whether those data agree or not.

The test data generator 70225 here is configured so that it repeatedly generates random data of fixed length. The test data generated by the test data generator 70225, either prior to the start of operation in the ATM communication system or when a fault occurs during operation, pass through the data switcher 7023 and are input to the assembly/disassembly unit 7023 by the input of the data switcher 70223 switching from the data extractor 7022 side to the test data generator 70225 side. These data are converted to ATM cells by the assembly/disassembly unit 7023 and transmitted toward the line terminal unit in the line interface unit in the opposing ATM exchange.

The line terminal unit in the line interface unit in the opposing ATM exchange transmits the received test data over a reverse path to the original transmitting line terminal unit 7022.

The test data comparator 70226 that receives the test data that are returned via the data switcher 70223, on the other hand, compares the test data transmitted by the test data generator 70225 against the returning test data and, if those data agree, judges that there is a line anomaly in the path going to the line terminal unit in the line interface unit in the opposing ATM exchange, and so notifies the controller 705 in the ATM exchange 701. If those data do not agree, however, the line is considered to be normal and the controller 705 is so notified.

The data switcher 70223 is normally connected to the data extractor 70222 and the transmission frame mapping unit 70224 according to switching commands from the controller 705.

Thus, either prior to commencing operation in the communication system or when a fault occurs during operation, test data are generated by the test data generator 70225 and transmitted toward the line terminal unit in the opposing line interface unit via an established line, those test data are compared by the test data comparator 70226 against test data returned via the opposing line terminal unit, and the presence or absence of anomalies in the line going to the line terminal unit in the opposing line interface unit is detected according as to whether or not those data agree. It is thereby possible to make the verification of normality in the calling path from end to end that could not be accomplished with OAM cells without connecting test equipment.

Figure 29:
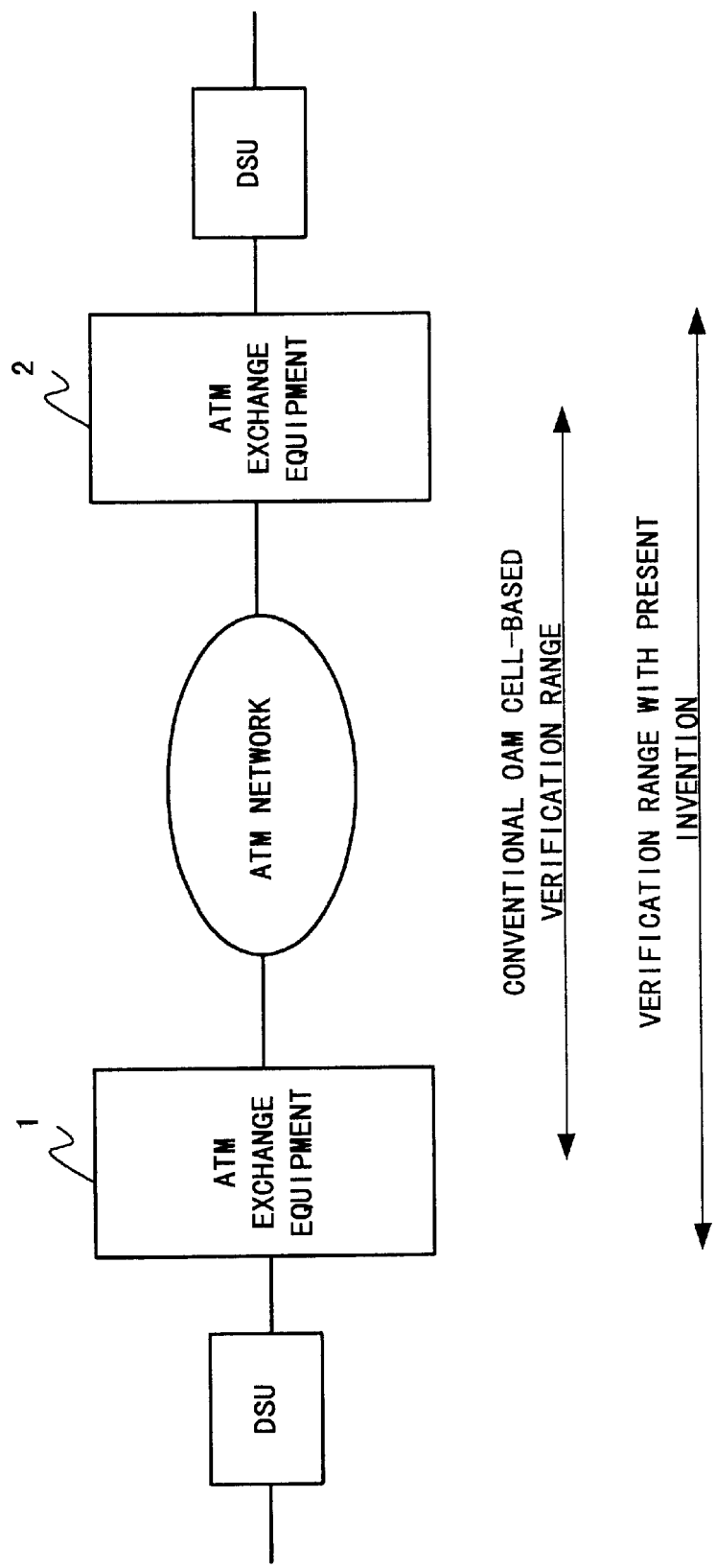
FIG. 29 is an explanatory diagram representing the range over which communication lines can be confirmed when the configuration diagrammed in FIG. 28 is employed.

In other words, as diagrammed in FIG. 29, whereas the range of line verification using OAM cells extends up to the assembly/disassembly unit, in the configuration described in the foregoing that range is expanded out to the frame terminal unit, whereupon it is possible to verify normal and abnormal states in lines that also include portions subjected to cell disassembly.

Figure 30:
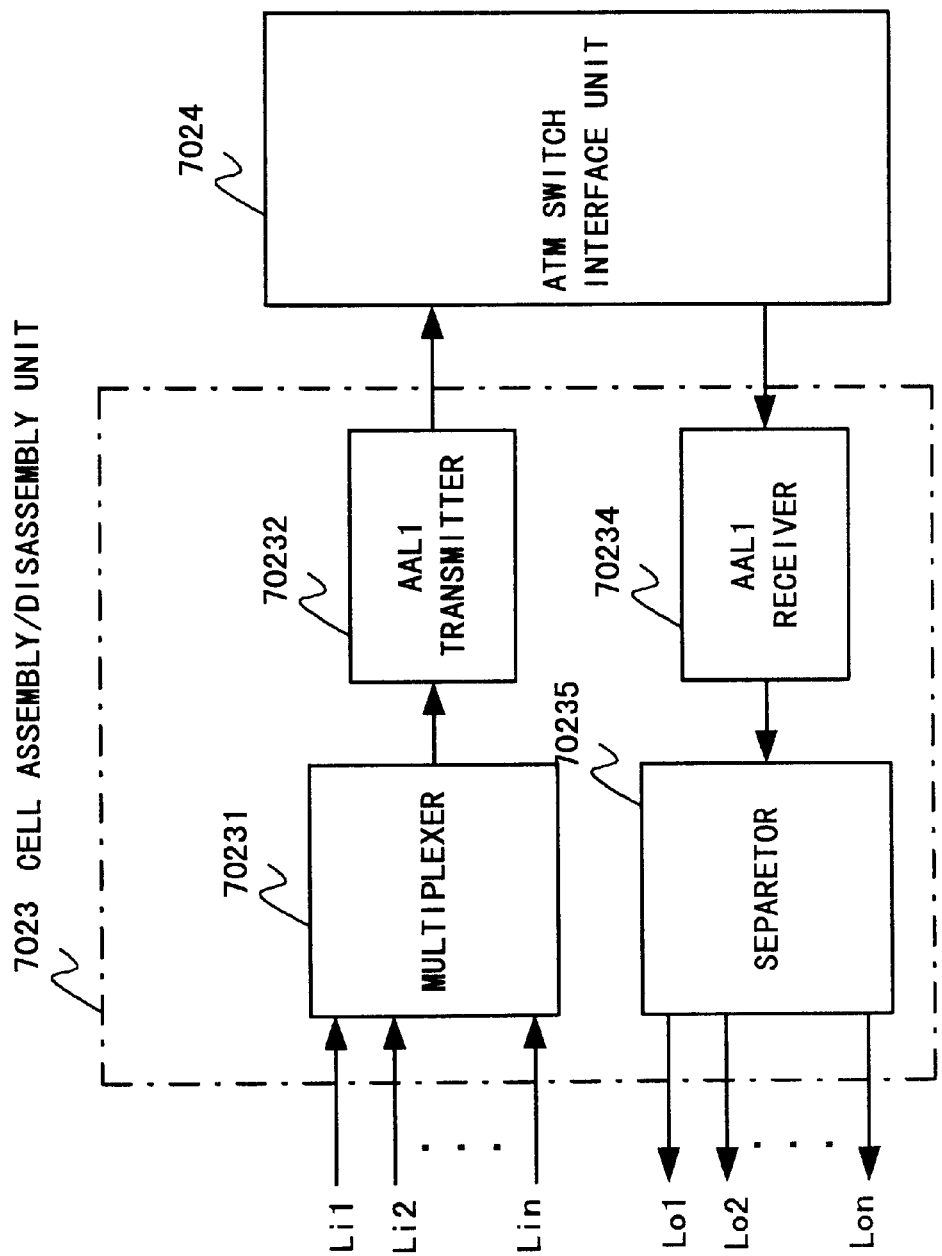
FIG. 30 is a detailed configurational diagram of a cell assembly/disassembly unit.

FIG. 30 is a block diagram of the detailed configuration of the assembly/disassembly unit 7023. The assembly/disassembly unit 7023 diagrammed here comprises a multiplexer 70231, an AAL1 transmission unit 70232, an AAL1 receiver unit 70234, and a separator 70235, and is configured to receive data at a constant bit rate (CBR).

Conventionally, when constant-bit-rate signals on multiple lines are multiplexed, if the band of the line being input to is 1.536 Kbps (24 TS), for example, 1.536 Kbps of data are multiplexed even if only 384 Kbps (6 Tss) are used. For this reason, the transmission efficiency (throughput) declines, traffic becomes more congested on the overall system, and it becomes difficult to add other lines.

When operating at low speed (such as 64 Kbps, for example), approximately 6 ms are required for cell assembly, resulting in transmission delay problems on lines where immediate response is required, such as telephone lines, wherefore there has been a need to perform cell assembly faster.

The assembly/disassembly nit 7023 diagrammed in FIG. 30 is provided with new functions for resolving such problems as these. More specifically, when the band being used is smaller than the band of the line being input to, only the portion of the band being used is multiplexed, whereby system traffic can be reduced, and the number of lines can easily be increased. Also, by forming cells by combining the bands used on a plurality of lines into one block, cell assembly is made faster than when forming cells from the bands used on single lines. This is now described in greater detail.

In FIG. 30, the multiplexer 70231 inputs data from the reception lines Li1–Lin, and multiplexes and outputs these data. Next, the AAL1 transmission unit 70232 forms the multiplexed data into cells, following the standard provided in ITU-T I.432, and outputs these to the ATM switching interface unit 7024.

The ATM cells received by the ATM switching interface unit 7024 are subjected to cell disassembly, following the standard provided in ITU-T I.432, and output after being separated by the separator 70235 to the respective lines Lo1–Lon.

Figure 31:
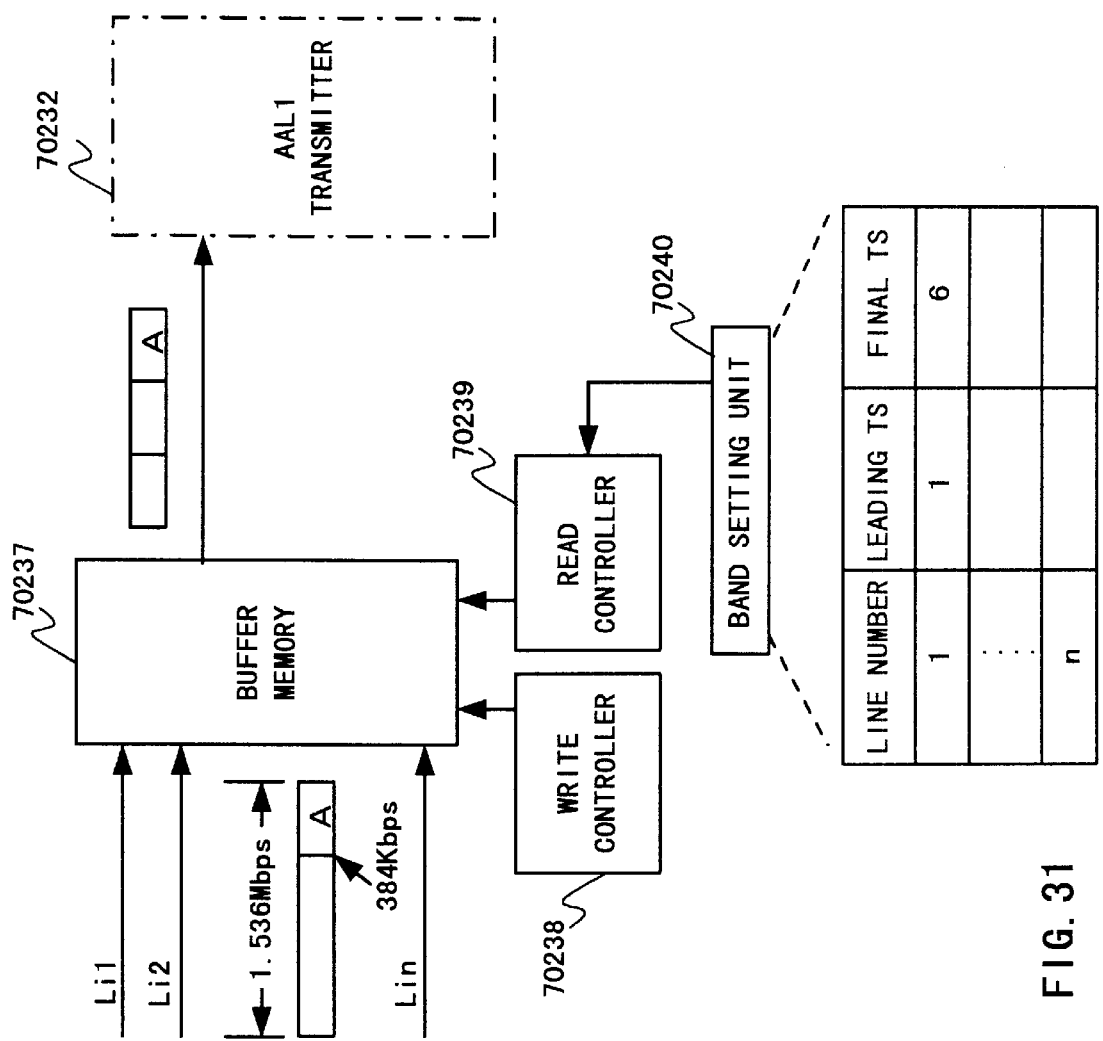
FIG. 31 is a detailed diagram of the configuration of the assembly/disassembly unit on the assembly side.
Figure 32:
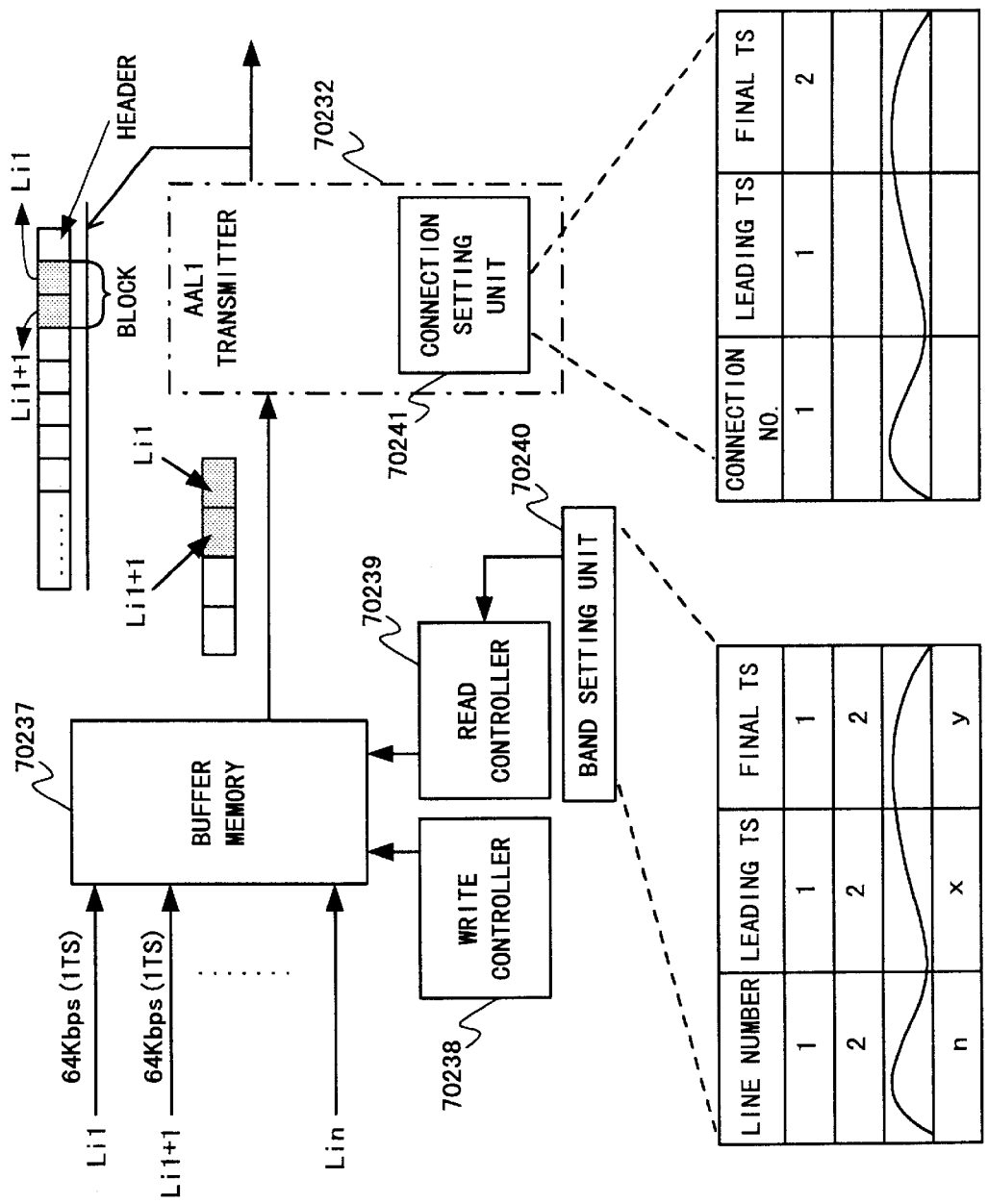
FIG. 32 is a diagram of the way multiplexing is implemented for a case where receiving lines Li1–Lin are in the 64 Kbps band.
Figure 33:
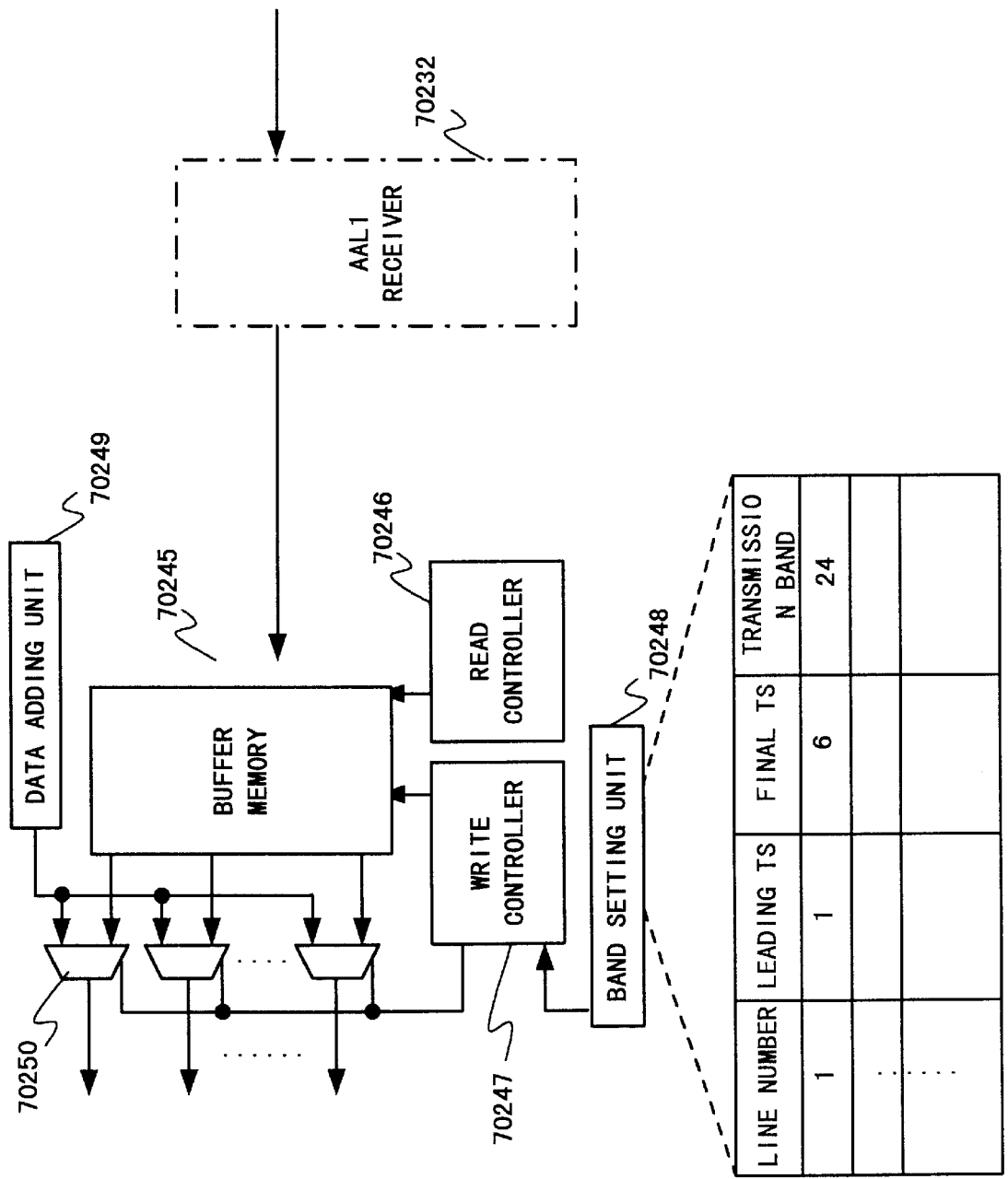
FIG. 33 is a detailed diagram of the configuration of the assembly/disassembly unit on the resolution side.

FIG. 31 is a detailed diagram of the configuration on the assembly side of the assembly unit 7023. CBR data input from the reception lines Li1–Lin are written in line-number order by a write controller 70238 to a buffer memory 70237 in the multiplexer 70231, allotted by line therein. A band setting unit 70240 is provided here, and the lead values and final values of time slots (Tss) for the bands used are preset by line. In the example diagrammed in FIG. 31, the setting is made so that the "line number 1" data uses TS=1–6.

A read controller 70239 reads CBR data from the received lines Li1–Lin stored in the buffer memory, following the values of the times slots for the lines set, and multiplexes those data. Thereby, the "line number 1" CBR data A are multiplexed in TS=1–6 in one frame and input in the AAL1 transmission unit 70232, and there subjected to cell disassembly according to the standard provided in ITU-T I.432.

FIG. 30-2 is a diagram showing how the received lines Li1–Lin are multiplexed in the case of the 64 Kbps band. In the example diagrammed here, in terms of the band setting done in the band setting unit 70240, data from the received lines are stored in the buffer memory 70237 at 2TS intervals, setting the lead TS value at 1 and the final TS value at 1 for the received line Li, and setting the lead TS value at 2 and the final value at 2 for the next received line Li1+1. With a connection setting unit 70241 in the AAL1 1 transmission unit 70232, moreover, the leading cell-formation value is set at 1 and the final value at 2, and cell assembly is performed with 2 Tss taken as 1 block for each line. By so doing, cell assembly can be done in half the time required when 1 TS at a time is stored.

FIG. 30-3 diagrams the detailed configuration on the resolution side in the assembly/disassembly unit 7023.

Cells received from the ATM exchange are subjected to cell disassembly in accordance with the standard provided in ITU-T I.432 by the AAL1 receiver unit 70232. The data resulting from this cell disassembly are written to a buffer memory 70245 by a write controller 70246. Lead TS values and final values for the band used and the line transmission band are preset for each line in a band setting unit 70248. Thereupon, the read controller 70247 reads out data stored in the buffer memory 70245 in accordance with the time slot values for each line set in the band setting unit 70248, and separates those data.

For the case where the line number=1, for example, when the band used is 384 Kbps (6 Tss) and the transmission band is 1.536 Mbps (24 Tss), the band used is smaller than the transmission band, wherefore, after 6 Tss of data are read out, 18 Tss of data, from the difference between the band used and the transmission band for line number=1 set in the band setting unit 70248, are read out as fixed data from a data adding unit 70249, and input to a selector 70250 corresponding to band number=1, and the 18 Tss of fixed data are added to the 6 Tss of data and output from the line having line number=1.

Thus the band for data resulting from cell disassembly can also be controlled line by line.

It is also possible then to raise the transmission efficiency (throughput), and, since traffic becomes lighter on the accommodated lines, lines can be easily added. In addition, by performing cell assembly on data on two or more lines in 1 block, it is possible to resolve the problem of transmission delays on lines such as telephone lines where immediate response is required.

An embodiment is next described that transfers alarm information while minimizing the decline in user data transmission efficiency.

Figure 34:
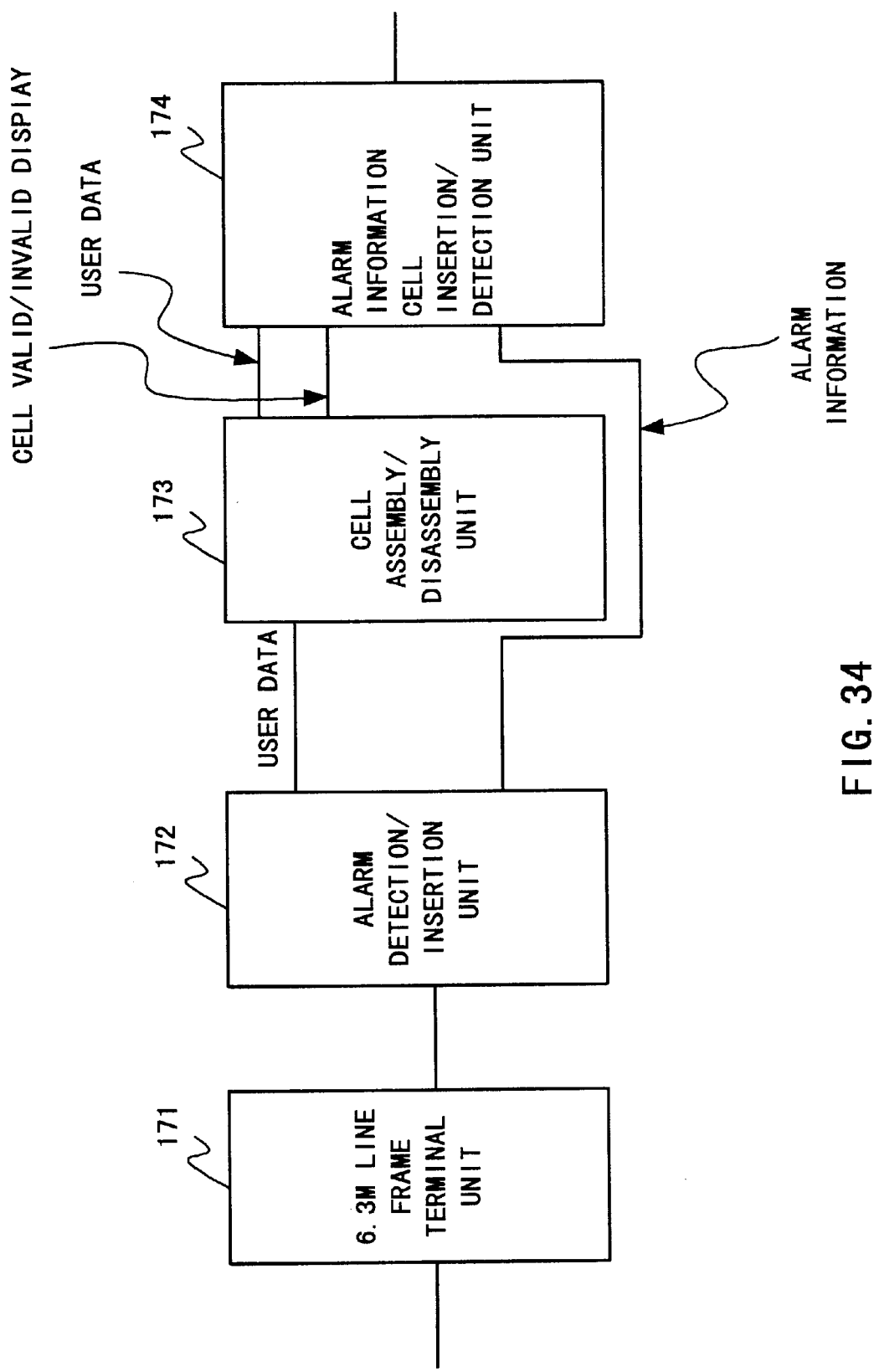
FIG. 34 is a block diagram or another embodiment of a line interface unit in ATM exchange.

FIG. 34 is a block diagram of another embodiment of a line interface unit in ATM exchange. The line interface unit in this embodiment is for use in an existing 6.3M line interface unit.

The line interface unit diagrammed in FIG. 34 comprises a 6.3M line frame terminal unit 171, an alarm detection/insertion unit 172, a cell assembly/disassembly unit 173, and an alarm information cell insertion/detection unit 174.

Data from an existing 6.3M line are subjected to line transmission frame termination in the 6.3M line frame terminal unit 171, just as in the embodiment diagrammed in FIG. 26. Alarm information is detected from a specified bit in the frame by the alarm detection/insertion unit 172 and separated into user;data (payload) and alarm information data.

Only user data are transferred to the cell assembly/disassembly unit 173 in the next stage, whereupon the preset VPI and VCI are added, and these data are transmitted to the alarm information cell insertion/detection unit 174 as 53-byte ATM cells. In the alarm information cell insertion/detection unit 174, ATM headers having payload type values designated on the basis of the alarm information from the alarm detection/insertion unit 172 are added, and the alarm data having these added ATM headers are inserted into invalid cell positions in the user data cell flow and transferred to an ATM switching unit (corresponding to item 704 in FIG. 26).

Figure 35:
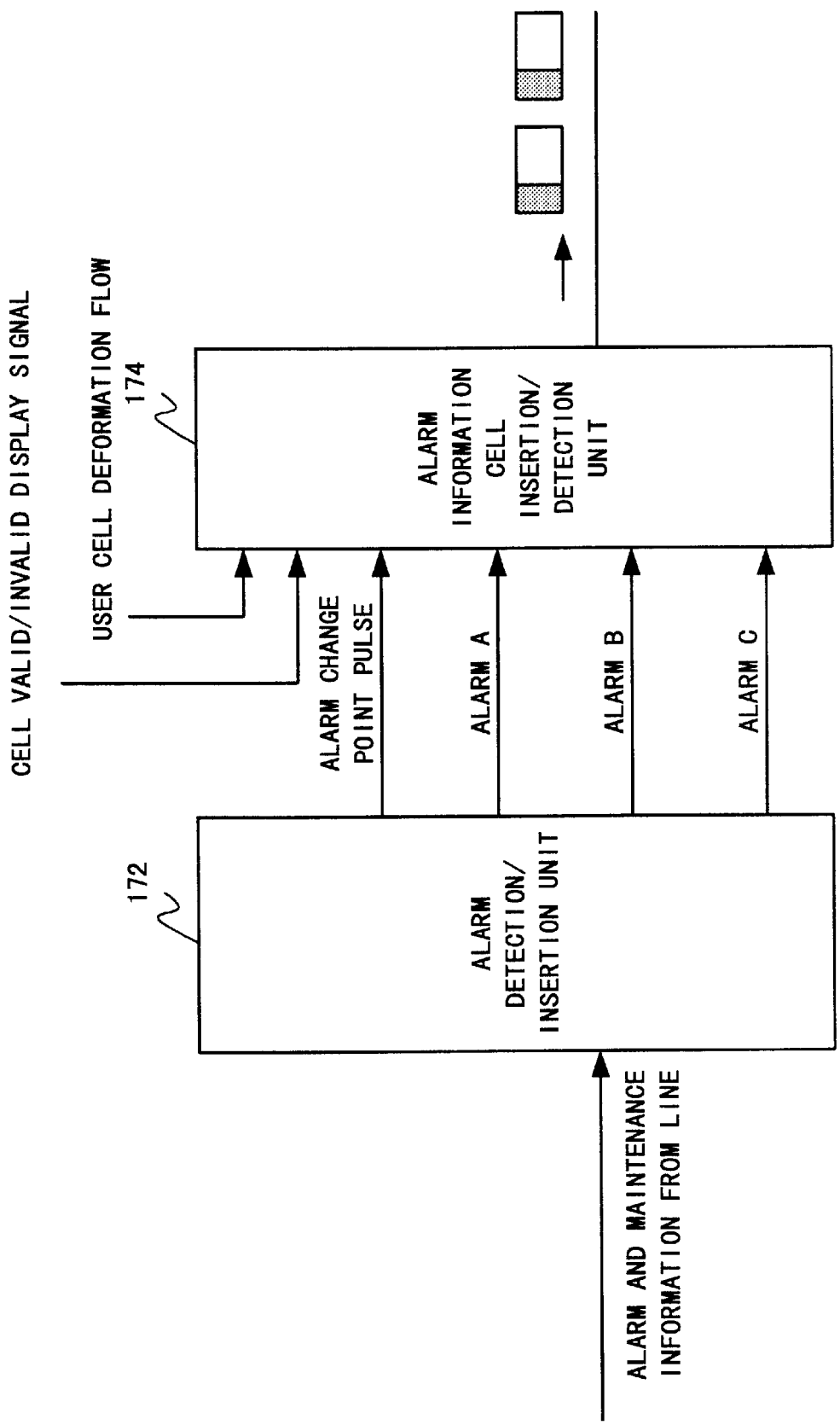
FIG. 35 is a diagram that extracts the input/output relationship between an alarm detection/insertion unit and an alarm information cell insertion/detection unit.
Figure 36:
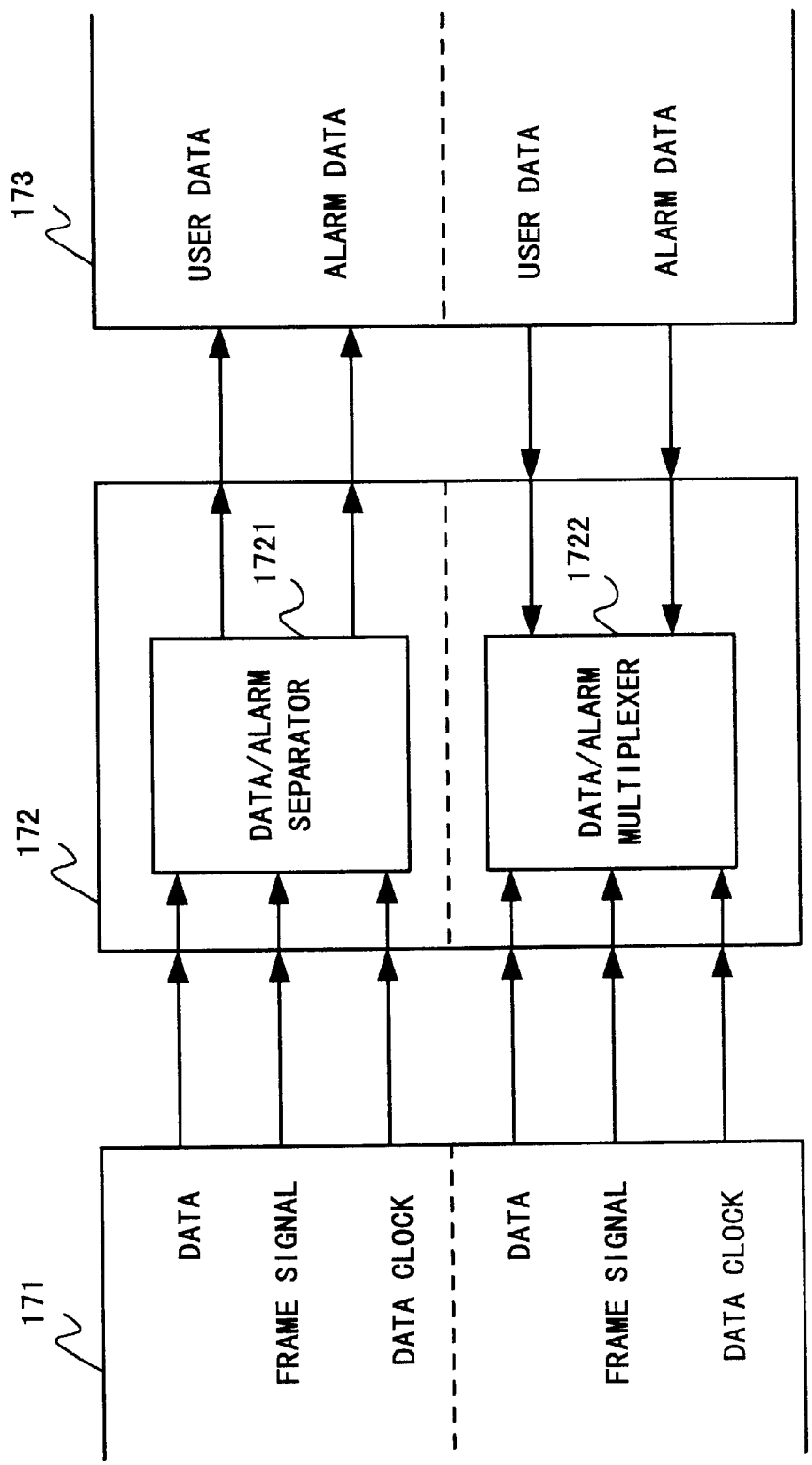
FIG. 36 is a diagram representing the input/output relationship of the line frame terminal unit, alarm detection/insertion unit, and cell assembly/disassembly unit.

FIG. 35 is a diagram that extracts the input/output relationship between:the alarm detection/insertion unit 172 and an alarm information cell insertion/detection unit 174, representing cases where information A, B, and C are transferred as the alarm information for the line condition and maintenance information.

The alarms A, B, and C from the line side are monitored by the alarm detection/insertion unit 172 and, at the points in time where there are changes in the content of those alarms, alarm change, point pulses indicating that the alarm content has changed are output from the alarm detection/insertion unit 172, as diagrammed in the time chart in FIG.

Figure 39A:
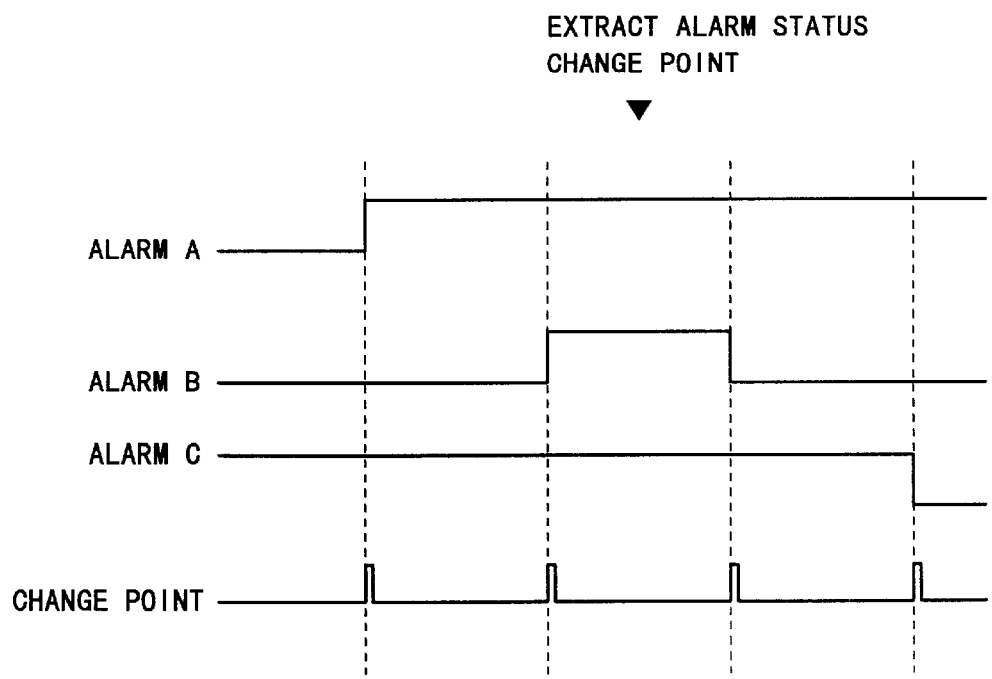
FIGS. 39(a) and 39(b) are diagrams showing the relationship between alarm data and change points in the alarm content.
Figure 39B:
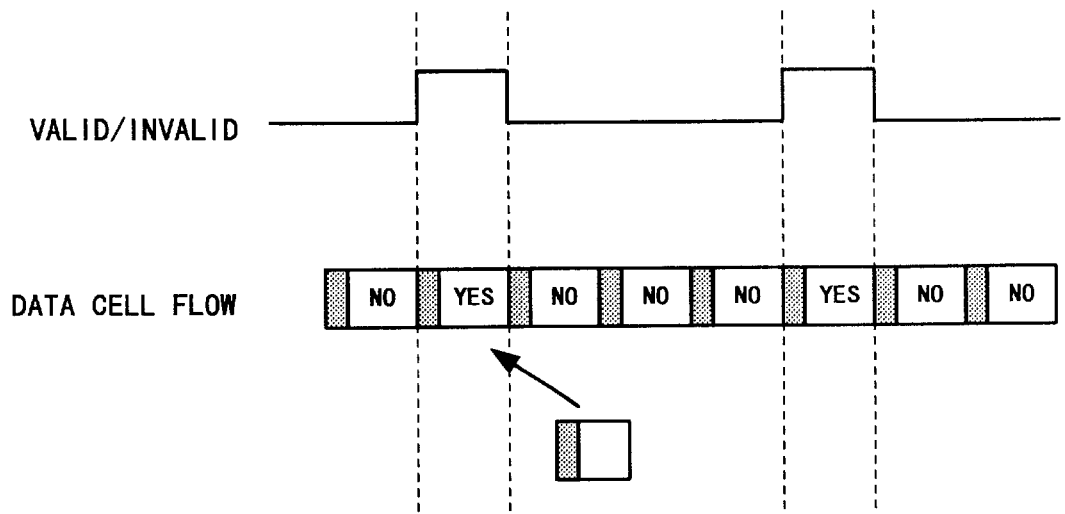

29 (A). In FIGS. 39(*a*) and 39(*b*), moreover, the changes in the alarms A, B, and C are indicated by pulses, and this diagram does not indicated that the alarms themselves are pulses.

The change point pulses and the alarms A, B, and C are transferred to the alarm information cell insertion/detection unit 174, and, as diagrammed in the time chart in FIG. 39(*a*), the alarm A, B, and C conditions when the alarm change point pulse is "1" become payload portions, whereupon ATM cells are formed with the prescribed payload type values and the preset VPI and VCI values added.

These ATM cells are inserted in the user data cell flow from the cell assembly/disassembly unit 173 at invalid cell positions by valid/invalid cell indicator signals and transmitted to the ATM switching unit.

In this case, the number of alarm information cell transmissions at the alarm change points can be set at any desired value, from the perspective of system reliability, taking network cell loss into consideration.

Figure 37:
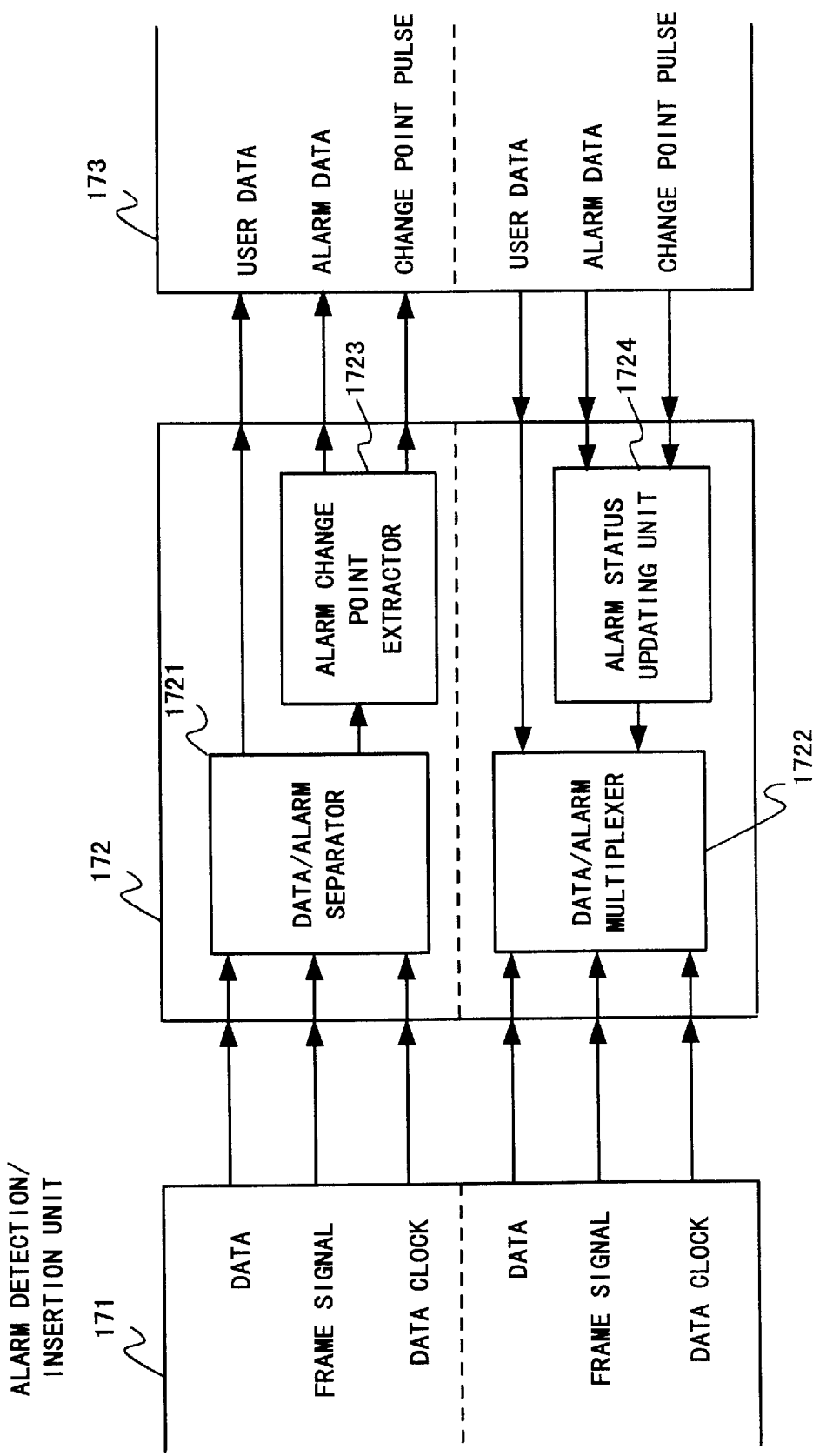
FIG. 37 is a detailed configurational diagram of the internal data/alarm separator unit and data/alarm multiplexer unit in the alarm detection/insertion unit.

In FIG. 26 is diagrammed the input/output relationships between the line frame terminal unit 171, the alarm detection/insertion unit 172, and the cell assembly/disassembly unit 173. In FIG. 37 are diagrammed the detailed configurations of an internal data/alarm separator 1721 and data/alarm multiplexer 1722 in the alarm detection/insertion unit 172.

As diagrammed in FIG. 37, on the output side of the data/alarm separator 1721 is provided an alarm change point extractor 1723 for extracting change points for separated alarm data and outputting those as change point pulses. On the input side of the data/alarm multiplexer 1722 is provided an alarm status updating unit 1724 for taking in the alarm data received from opposing equipment at points in time where the change point pulse changes and updating them.

Figure 38:
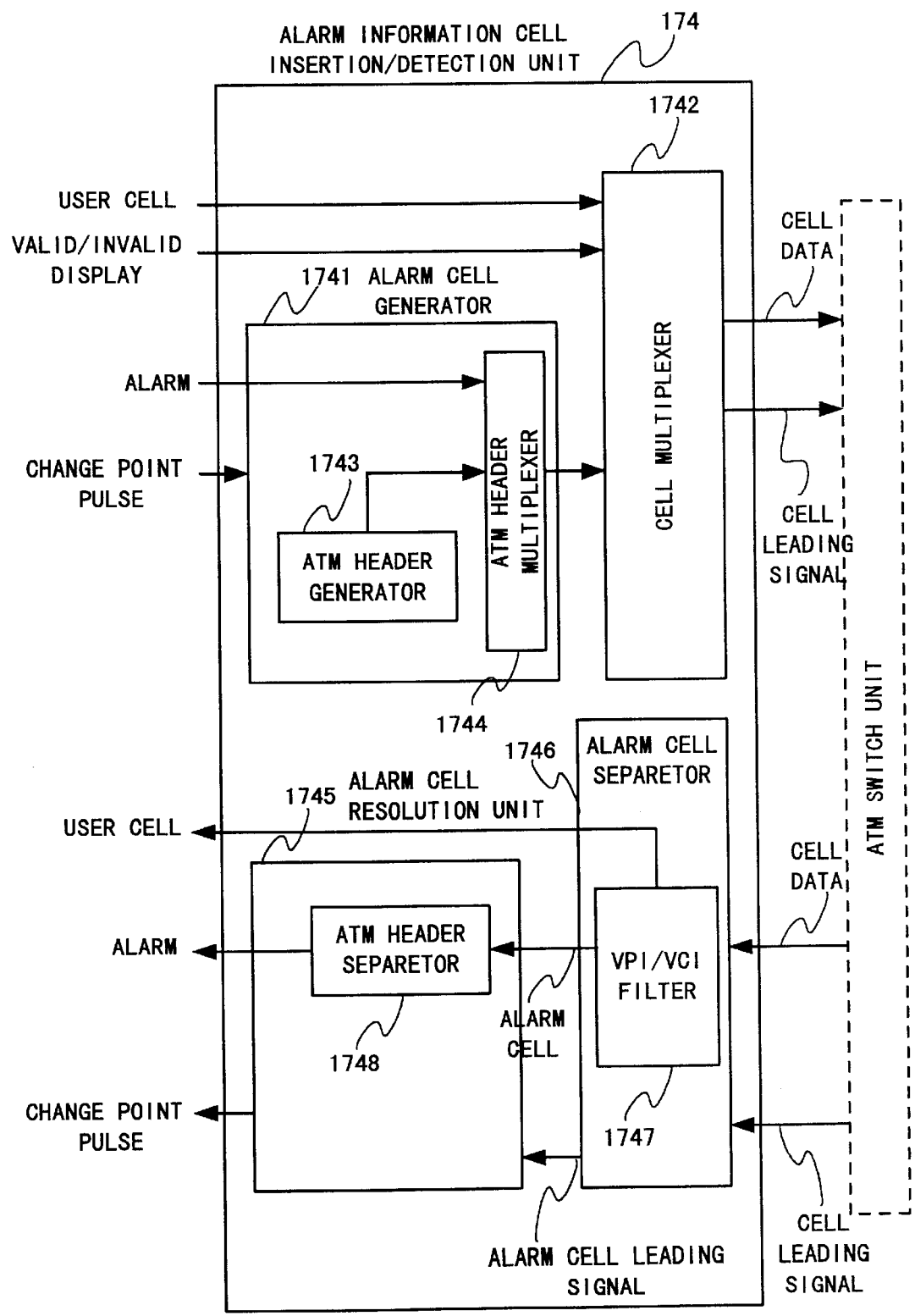
FIG. 38 is a detailed block diagram of the configuration of the alarm information cell insertion/detection unit.

FIG. 38 is a block diagram of the detailed structure of the alarm information cell insertion/detection unit 174 which comprises an alarm cell generator 1741, a cell multiplexer 1742, an alarm cell separator 1746, and an alarm cell resolution unit 1745. The alarm status when the alarm change point pulse is "1" becomes the cell payload portion, and a prescribed payload type value generated by an ATM header generator 1743 and the set VPI and VCI values are added by an ATM header multiplexer 1744, whereupon the data become ATM cells which are input to the cell multiplexer 174.

These ATM cells are inserted in leading positions in invalid cells according to the flow of user data cells from the cell forming/de-formation unit 173 and the valid/invalid designator symbol and are transmitted to the ATM switching unit.

Meanwhile, cells input from the ATM switching unit are filtered by a VPI/VCI filter 1747 in the alarm cell separator 1746 and separated into user cells and alarm cells. The separated alarm cells have the header portions separated in an ATM header separator 1748 in the alarm cell separator 1745 by the alarm cell leading designator signal and are output as alarm data.

Figure 40:
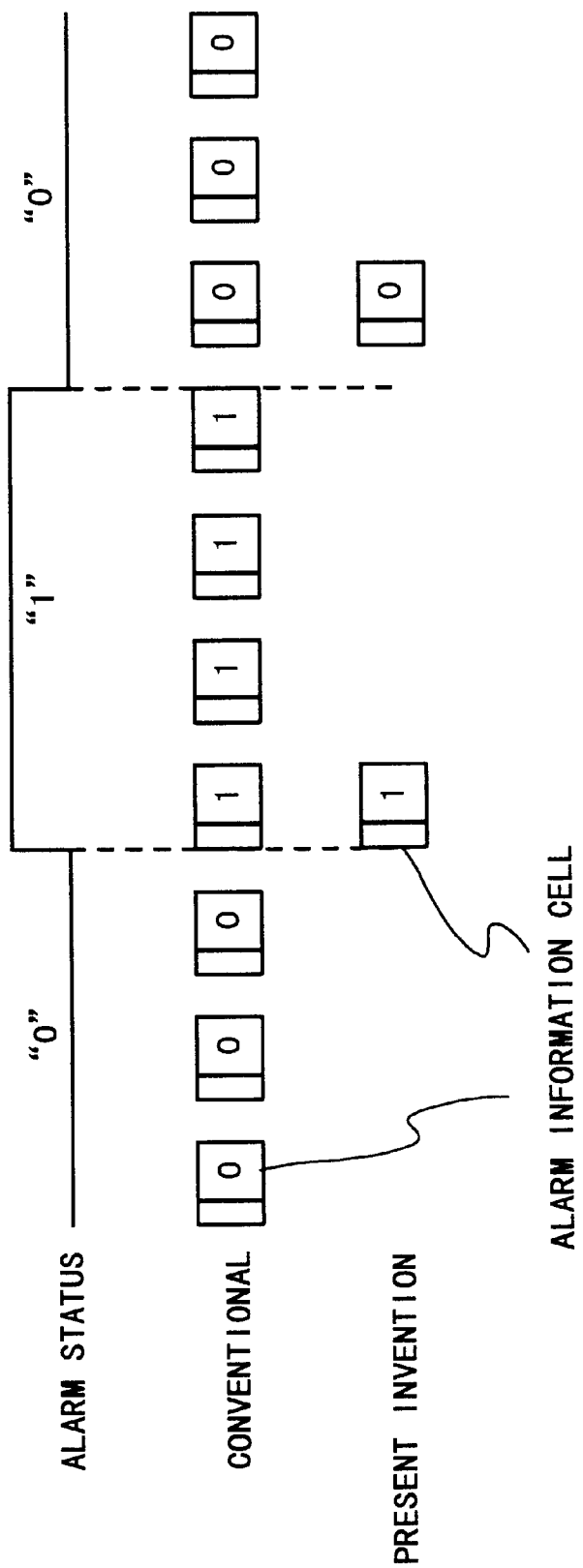
FIG. 40 is a diagram showing the differences between alarm information cell transfer modes in the prior art and in the present invention.

In FIG. 40 are diagrammed the differences in the way alarm information cells are transferred in the prior art and in the present invention. In the prior art, alarm information is transferred to the cell forming/de-formation unit 173, designated ATM headers are attached, and the values of the alarm information are formed without modification into cells, wherefore, as diagrammed in FIG. 40, cell transfer is always continued, irrespective of whether or not there is any change in the alarm content. In actual operating situations, however, there are hardly any changes in the alarm information; that information changes only when an anomaly has occurred or -maintenance operations become necessary, wherefore the same values get transferred as cells.

In this embodiment, as diagrammed in FIG. 40, cells are only generated, and the status changed, when there is a change in the content of the alarm information.

Thus it is possible to transfer alarm information while minimizing the decline in user data transmission efficiency. This alarm information transfer mode can also be applied in the same way to the embodiments diagrammed in FIG. 20 and FIG. 26.

Figure 41A:
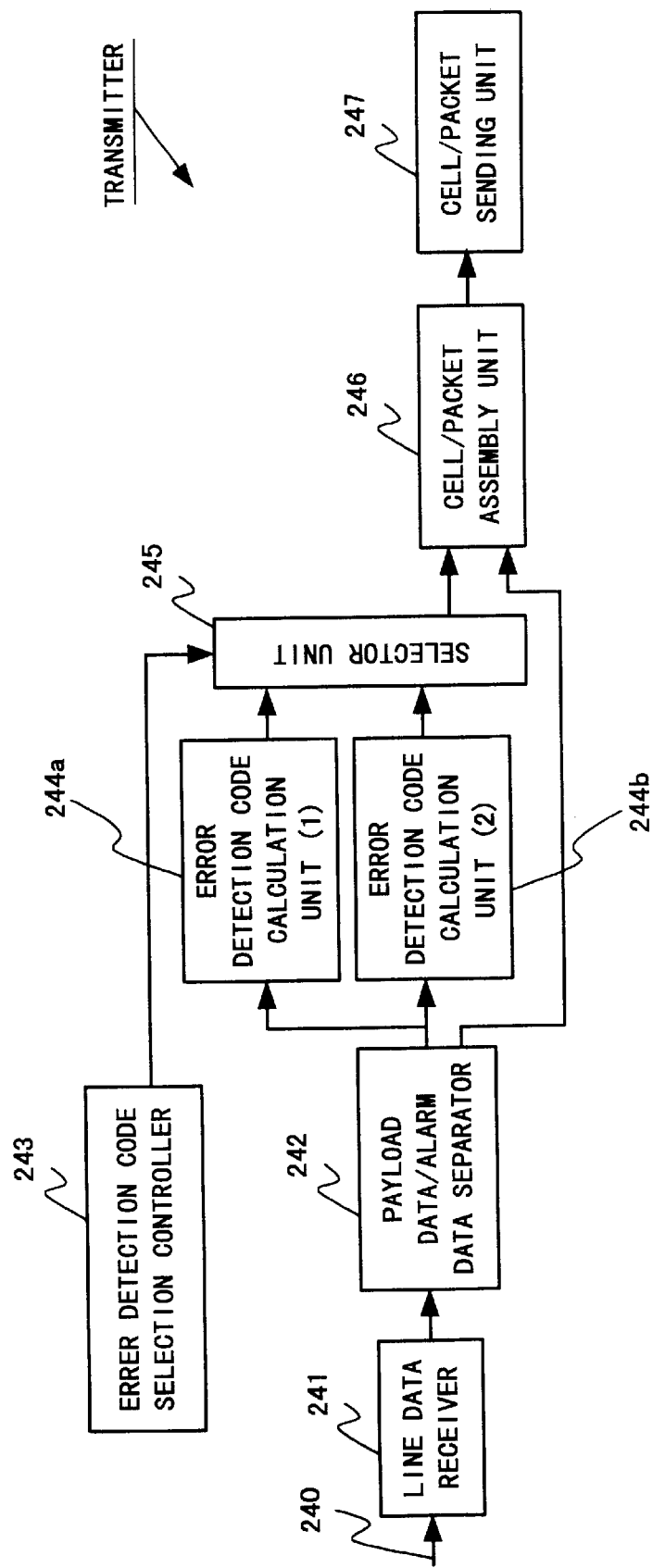
FIGS. 41(a) and 41(b) are block diagrams of the configuration of the transmission unit and receiver unit in the line interface unit in ATM exchange.
Figure 41:
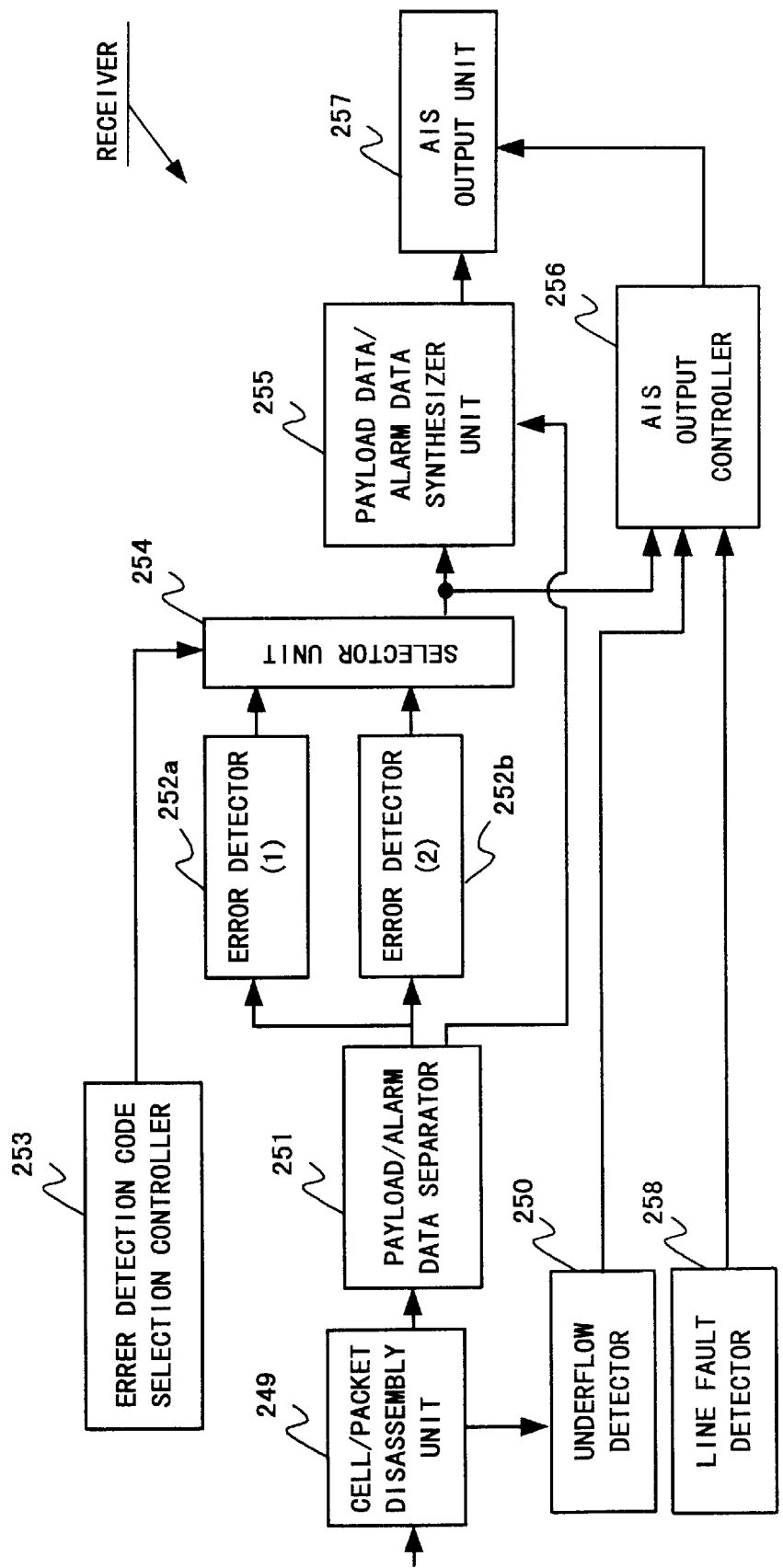

FIGS. 41(*a*) and 41(*b*) are next used in describing an embodiment for a line fault detection method wherewith, when ATM cells are transmitted and received over a ring-shaped transmission path, faults can be detected in opposing equipment at an originating node at the ATM connection/packet connection level when faults occur in the opposing equipment, and alarm information can be output to terminals.

FIG. 41(*a*) is a block diagram of the configuration of the transmission unit in a line interface unit in ATM exchange. FIG. 41(*b*) is a block diagram of the configuration of the receiving unit therein. In FIG. 41(*a*), item 240 is an input terminal to which line data are input. A line data receiver unit 241 receives line data from the input terminal 240 in the same manner as in the embodiment diagrammed in FIG. 21 and outputs frame data to a payload data/alarm data separator 242.

The payload data/alarm data separator 242 separates the received frame data into alarm data and payload data, respectively. An error detection code selection control circuit 243 selects calculation formulas for the error detection codes added to the alarm data, which formulas differ according to whether the direction of the path is upstream or downstream.

Figure 42:
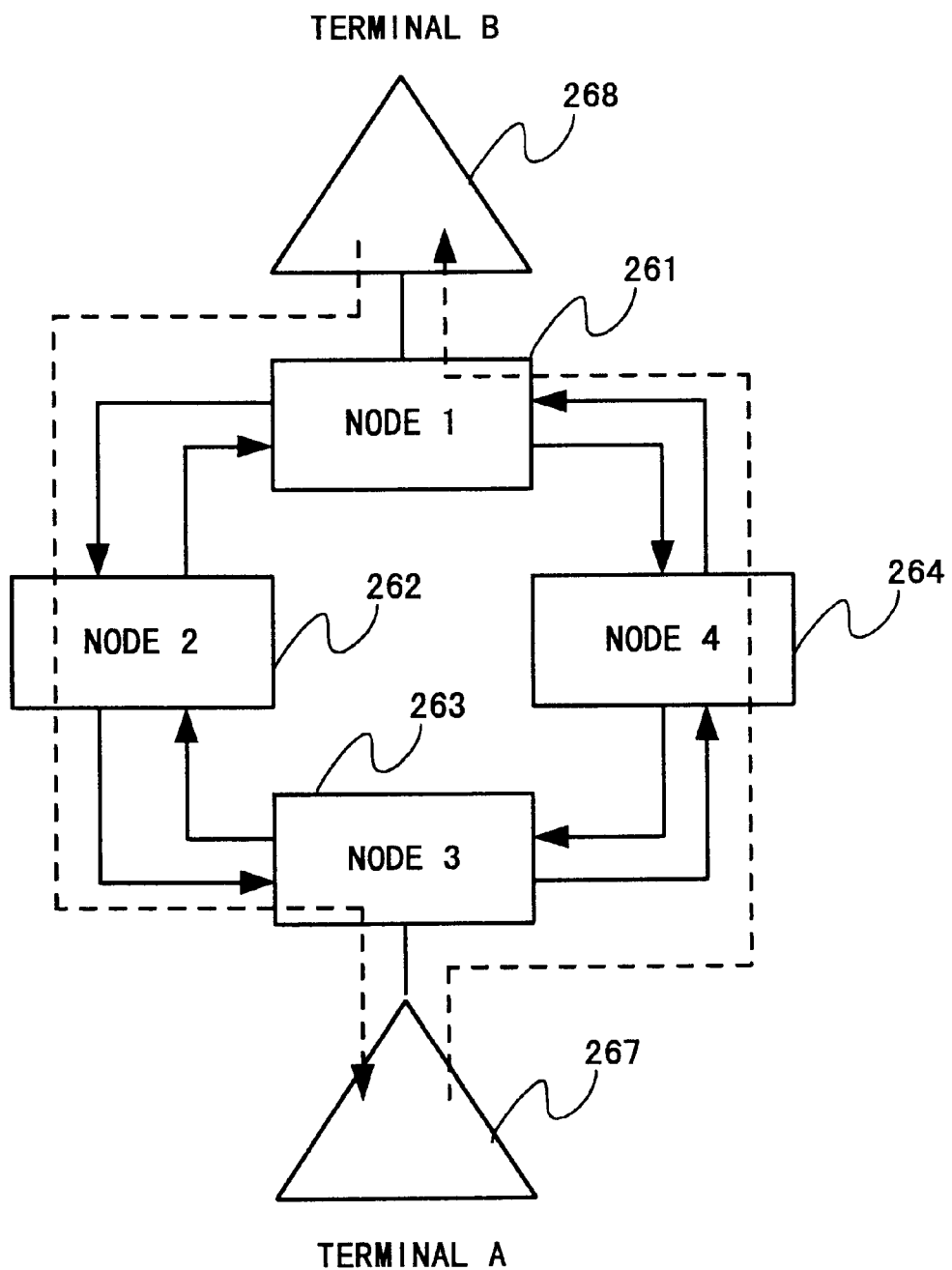
FIG. 42 is a diagram of an example of a ring-shaped path where the transmission of error detection codes is made to be different in the upstream and downstream directions over a bidirectional path.

More specifically, in a ring-shaped path such as diagrammed in FIG. 42, error detection codes are selected that have been calculated with an error code type A calculation formula for the upstream communication path from the terminal A (267) to the terminal B (268). For the downstream communication path from terminal B (268) to terminal A (267), however, error detection codes calculated by an error code type B calculation formula are selected in the ATM exchange at node 261.

By making the error detection codes differ in this manner according as to whether the direction on the bidirectional path is upstream or downstream, the calculation formula for the error detection code will differ, even when a fault occurs at an opposing node and cells transmitted from the originating node are looped back so that they return to the that originating node, wherefore it can be detected that a fault has occurred at the opposing node.

In error detection code calculation units 244*a* and 244*b*, error detection codes are added to alarm data extracted and separated by the payload data/alarm data separator 242, and the results are output to a selector unit 245. Here the error detection code calculation formulas used by the error detection code calculation units 244*a* and 244*b* differ.

In the selector unit 245, the error detection code selected by the error code selection controller 243 is selected and output to a cell/packet assembly unit 246. The cell/packet assembly unit 246 assembles the payload data and the alarm data to which the error detection codes are attached into cells/packets according to the method described below. In this case, cell assembly conforms to AAL1 in ITU-TI.363.1.

Payload data and alarm data are transmitted by one connection as diagrammed in FIGS. 23(a) and 23(b), payload data and alarm data are transmitted by separate connections as diagrammed in FIGS. 24(a)–24(c) and FIGS. 25(a)–25(b), and a cell/packet transmitting unit 247 transfers assembled cells/packets to a receiver unit at an opposing node.

The receiver unit diagrammed in FIG. 41(b) is next described.

First, a line fault detection unit 258 watches for line faults at the entrance to the network to which [data] are transferred over the network from the transmitting unit. When a network fault (such as a line break or frame synchronization error, etc.) occurs, a alarm indication signal output unit 256 is notified of that fact and an alarm is output at the terminal or terminals.

A cell/packet disassembly unit 249 disassembles the received cells/packets. The cell disassembly in this case conforms to AAL1 in ITU-TI.363.1.

An underflow detector 250 monitors the presence and absence of underflows in a buffer memory which stores received cells/packets and, when an underflow continues beyond a set time interval, so informs the alarm indication signal output unit 256.

The disassembled data are separated into payload portions and alarm portions, respectively, in a payload/alarm data separator 251. For the separated alarm data, the presence or absence of errors is calculated by error detection codes attached by the error detection code calculation unit 244a or 244b at an error detector 1 (252a) or 2 (252b).

The error detectors 1 (252a) and 2 (252b) calculate errors using error detection code calculating formulas corresponding to the error detection codes applied by either of the error detection code calculation units 244a or 244b in the transmitting unit. An error detection controller 253 transmits instructions to a selector 254 to select the results of the error detection circuit 252a or 252b, according to whether the set direction of the bidirectional path, whether upstream or downstream, in the same manner as the transmitting unit noted above. The selector 254 outputs the selection results to a payload data/alarm data synthesizer unit 255 and to a line-break output controller 256.

The payload data/alarm data synthesizer unit 255 outputs synthesized data to a alarm indication signal output unit 257. The alarm indication signal output unit 257 operates so as to output the alarm indication signal output and the alarm data from the transmitting end without modification.

A alarm indication signal output operation is performed when there is no underflow error from the underflow detector 250 and a line-break alarm is transmitted from the transmitting end, or when one of the following three notifications is made, namely A) notification of a line fault from the line fault detector 258, B) notification that there is an underflow from the underflow detector 250, or C) notification that there is an error from the error detector 1 (252a) or 2 (252b).

The payload data/alarm data synthesizer unit 255, meanwhile, synthesizes the payload data and alarm data separated by the separator 251 and outputs these data as line data from a line data output unit (not shown) to the line side.

By monitoring for (1) AAL1 underflows, (2) the attachment of an error detection code to the alarm data, and (3) the detection of a line break at the entrance to the network on the receiving side, as described in the foregoing, it is possible to detect line breaks on the receiving end when an anomaly has developed in an inside standing node anywhere between the transmitting end and the receiving end.

In particular, because the error detection code is made different according to whether the direction on the bidirectional path is upstream or downstream, even when, in a network that transmits ATM cells over a ring-shaped transmission path, a fault occurs in an opposing node to create a loop-back so that data output at an originating node are returned to that same originating node, errors at the opposing node can be definitely detected, and it also becomes possible to make the detections described above in response to each connection, wherefore faults in opposing equipment can be output to the proper terminal.

The method of making the error detection code calculation formula different for the upstream and downstream directions can also be applied to the embodiments diagrammed in FIG. 20 and FIG. 26.

When this embodiment is implemented, line faults can be detected without providing complex protocols in the equipment at the transmitting and receiving ends.

It is also possible to detect whether a line is normal or faulting over a broader range that extends so as to include communication path portions prior to cell assembly and subsequent to cell disassembly.

Alarm information can also be transferred while holding declines in user data transmission efficiency down to a minimum.

Even when faults occur in opposing equipment in a ring-shaped network configuration, faults can be detected in opposing equipment at the transmitting node at the ATM connection/packet connection level and the pertinent fault information output to a terminal.

What is claimed is:

1. Transmission equipment installed in an ATM network in a communication network configured by inserting the ATM network between an exchange having an STM line and digital service units, comprising:

line interface means for connecting the STM line;

cell assembly/disassembly means for converting a data string on the STM line to ATM cells and disassembling ATM cells received from the ATM network;

alarm signal detection means for either detecting communication anomalies or extracting maintenance operation information from the data string on the STM line;

transmission means for replacing information resulting from the detected communication anomalies or extracted maintenance operation information with alarm signals, and for transmitting the alarm signals together with information channels in the data string through the cell assembly/disassembly means; and data rearranging means for rearranging the information channels and the alarm signals into a data string for the STM line, and for outputting the data string either to the exchange or to a digital service unit.

2. The ATM transmission equipment according to claim 1, further comprising:

fault detection means for detecting faults in the ATM network; and fault information insertion means for inserting fault information indicating fault detection results in place of data in the data string when rearrangement to the data string is done by the data rearranging means.

3. The ATM transmission equipment according to claim 2, wherein the fault detection means detects faults in the ATM network either by anomalies in the cell disassembly process in the cell assembly/disassembly means or by anomalies in data on channels that transmit the alarm signals received from the STM line.

4. The ATM transmission equipment according to claim 1, wherein the cell assembly/disassembly means merges the alarm signals with the information channels and forms cells using a same virtual connection.

5. The ATM transmission equipment according to claim 1, wherein the cell assembly/disassembly means forms the alarm signals and the information channels, respectively, into cells using different virtual connections.

6. The ATM transmission equipment according to claim 1, wherein the cell assembly/disassembly means performs the cell assembling and the cell disassembling in accordance with provisions of ATM adaptation layer type 1.

7. ATM transmission equipment installed in an ATM network in a communication network configured by inserting the ATM network between an exchange having an STM line and in-home unit having a user-network interface for the STM line, comprising:

line interface means for connecting the STM line;

user-network interface means having a user-network interface corresponding to the STM line;

cell assembly/disassembly means for converting a data string on the STM line to ATM cells and for disassembling ATM cells received from the ATM network;

alarm signal detection means for either detecting communication anomalies or extracting maintenance operation information from the data string on the STM line;

transmission means for replacing information resulting from the detected communication anomalies or extracted maintenance operation information with alarm signals, and for transmitting the alarm signals together with information channels in the data string through the cell assembly/disassembly means; and data rearranging means for rearranging the information channels and the alarm signals into a data string for the STM line, and for outputting the data string either to the exchange or to a digital service unit.

8. The ATM transmission equipment according to claim 7, further comprising:

fault detection means for detecting faults in the ATM network; and fault information insertion means for inserting fault information indicating fault detection results in place of prescribed data in the data strings when rearrangement to the data strings is done by the data rearranging means.

9. The ATM transmission equipment according to claim 8, wherein the fault detection means detects faults in the ATM network either by anomalies in cell disassembly process in the cell assembly/disassembly means or by anomalies in data on channels that transmit the alarm signals received from the STM line.

10. The ATM transmission equipment according to claim 8, wherein the cell assembly/disassembly means merges the alarm signals with the information channels and forms cells using a same virtual connection.

11. The ATM transmission equipment according to claim 7, wherein the cell assembly/disassembly means form the alarm signals and the information channels, respectively, into cells using different virtual connections.

12. The ATM transmission equipment according to claim 7, wherein the cell assembly/disassembly means performs the cell assembly and the cell disassembly in accordance with provisions of ATM adaptation layer type 1.

13. A line fault detection method in a communication system configured by inserting an ATM network between an exchange having an STM line and digital service units, comprising:

separating data input from the STM line into payload portions and alarm data portions;

adding error detection codes to the alarm data portions;

assembling the alarm data portions having the added error detection codes and the payload portions into fixed-length data in a same transmitting unit and transmitting the data thus assembled to the digital service units, separating the fixed-length data or the variable-length data received from the digital service units into payload portions and alarm data portions;

detecting whether errors are contained in the alarm data portions having the added error detection codes;

assembling the received payload portions and the alarm data portions into a frame of the STM line, and transmitting the assembled frame to the STM line, when the alarm data portions contain no errors; and determining that a line fault has developed, and transmitting line-break alarm data to the STM line, if there are errors in the alarm data portions.

14. The line fault detection method according to claim 15, further comprising:

transmitting the line-break alarm data when an error in an alarm data portion continues at or above a preset value.

15. The line fault detection method according to claim 15, further comprising:

detecting underflows in a receiving buffer that sequentially stores the fixed-length data received from the transmitting end, and transmitting the line-break alarm data to the STM line, when at least one of the underflows extends beyond a preset time.

16. The line fault detection method according to claim 13, wherein the alarm data portions and the payload portions are transmitted with different connections.

17. The line fault detection method according to claim 13, wherein the alarm data portions are transmitted to the STM line only when there is a change in alarm data.

18. The line fault detection method according to claim 13, wherein a formula for calculating the error detection codes added to the alarm data portions differs according to whether a direction of a bi-directional path for the payload portions is upstream or downstream.

19. The line fault detection method according to claim 13, wherein an initial value of a formula for calculating the error detection codes added to the alarm data portions differs according to whether a direction of a bidirectional path for the payload portions is upstream or downstream.

* * * * *

UNITED STATES PATENT AND TRADEMARK OFFICE
CERTIFICATE OF CORRECTION

PATENT NO. : 6,614,760 B1
DATED : September 2, 2003
INVENTOR(S) : Suzuki et al.

It is certified that error appears in the above-identified patent and that said Letters Patent is hereby corrected as shown below:

Column 31,
Lines 58-59, change "claim 8," to -- claim 7, --.

Column 32,
Lines 33 and 37, change "claim 15," to -- claim 13, --.
Line 58, change "bidirectional" to -- bi-directional --.

Signed and Sealed this

Twenty-seventh Day of April, 2004

JON W. DUDAS
*Acting Director of the United States Patent and Trademark Office*